(12) United States Patent
Hermandorfer

(10) Patent No.: US 11,083,953 B2
(45) Date of Patent: Aug. 10, 2021

(54) SYSTEM AND METHOD ADAPTED TO ENABLE SIMULTANEOUS PLAY OF ONE OR MORE SPORTS GAMES IN THE SAME FACILITY WITH AUTOMATED BALL DELIVERY, TRACKING AND COLLECTION

(71) Applicant: Home Run Dugout LLC, Austin, TX (US)

(72) Inventor: Nicholas Hermandorfer, Austin, TX (US)

(73) Assignee: Home Run Dugout, LLC, Austin, TX (US)

( * ) Notice: Subject to any disclaimer, the term of this patent is extended or adjusted under 35 U.S.C. 154(b) by 0 days.

(21) Appl. No.: 15/497,207

(22) Filed: Apr. 26, 2017

(65) Prior Publication Data

US 2017/0304705 A1    Oct. 26, 2017

Related U.S. Application Data

(60) Provisional application No. 62/327,979, filed on Apr. 26, 2016.

(51) Int. Cl.
*A63B 71/02* (2006.01)
*A63B 47/02* (2006.01)
(Continued)

(52) U.S. Cl.
CPC ............ *A63B 71/02* (2013.01); *A63B 47/025* (2013.01); *A63B 63/06* (2013.01);
(Continued)

(58) Field of Classification Search
CPC ... A63B 71/02; A63B 69/0002; A63B 69/407; A63B 69/0013; A63B 69/0075;
(Continued)

(56) References Cited

U.S. PATENT DOCUMENTS 3,310,312 A * 3/1967 Peeples ............... A63B 57/405
                                                    473/178
4,074,905 A * 2/1978 High .................... A63B 47/025
                                                    124/51.1

(Continued)

*Primary Examiner* — Basil S Katcheves
*Assistant Examiner* — Omar F Hijaz
(74) *Attorney, Agent, or Firm* — Steven A. Wood, Esq.

(57) ABSTRACT

The present invention comprises a unique system and method for providing adaptable ball delivery and tracking, including appropriate sensor hardware, interactive gameplay user interfaces and point of sales systems. The system and method of the present invention are especially relevant to baseball and softball as, among other components, the system comprises a vertical, ground-up soft toss ball delivery mechanism, automated player and ball-tracking devices, and ball-collection and transport systems. The ball collection and return components eliminate the need for "fielders" and enable the creation of the first "batting range". The vertical, ground-up soft-toss pitch machine further enables the first multi-story batting facility with player batting bays that open onto a sports field. Further, certain embodiments of the present invention integrate hitting screens, augmented reality display and simultaneous coordination of gameplay and communication between players, regardless of the players' physical location.

27 Claims, 43 Drawing Sheets

(51) Int. Cl.
A63B 69/00 (2006.01)
A63B 63/06 (2006.01)
A63B 69/40 (2006.01)
A63F 13/213 (2014.01)
A63F 13/812 (2014.01)
A63F 13/53 (2014.01)
A63B 71/06 (2006.01)
A63F 13/65 (2014.01)
E04H 3/14 (2006.01)
G06Q 30/06 (2012.01)
G06Q 50/12 (2012.01)
G06T 11/60 (2006.01)

(52) U.S. Cl.
CPC ...... *A63B 69/0002* (2013.01); *A63B 69/0013* (2013.01); *A63B 69/0075* (2013.01); *A63B 69/407* (2013.01); *A63B 71/022* (2013.01); *A63B 71/0605* (2013.01); *A63B 71/0616* (2013.01); *A63B 71/0622* (2013.01); *A63B 71/0669* (2013.01); *A63B 71/0697* (2013.01); *A63F 13/213* (2014.09); *A63F 13/53* (2014.09); *A63F 13/65* (2014.09); *A63F 13/812* (2014.09); *E04H 3/14* (2013.01); *G06Q 30/0635* (2013.01); *G06Q 50/12* (2013.01); *G06T 11/60* (2013.01); *A63B 2069/401* (2013.01); *A63B 2069/402* (2013.01); *A63B 2071/0625* (2013.01); *A63B 2071/0647* (2013.01); *A63B 2071/0655* (2013.01); *A63B 2071/0694* (2013.01); *A63B 2220/30* (2013.01); *A63B 2220/35* (2013.01); *A63B 2220/51* (2013.01); *A63B 2220/56* (2013.01); *A63B 2220/803* (2013.01); *A63B 2220/805* (2013.01); *A63B 2220/806* (2013.01); *A63B 2220/807* (2013.01); *A63B 2220/89* (2013.01); *A63B 2225/54* (2013.01)

(58) Field of Classification Search
CPC . A63B 47/025; A63B 2069/401; A63F 13/53; A63F 13/812; E04H 3/14
See application file for complete search history.

(56) References Cited

U.S. PATENT DOCUMENTS

| | | | | |
|---|---|---|---|---|
| 4,915,384 | A * | 4/1990 | Bear | A63B 24/0021 273/454 |
| 5,359,986 | A * | 11/1994 | Magrath, III | A63B 69/406 124/1 |
| 5,401,018 | A * | 3/1995 | Kelly | A63B 63/00 473/140 |
| 5,485,994 | A * | 1/1996 | Underwood | A63B 63/00 473/451 |
| 5,733,209 | A * | 3/1998 | McIntyre, IV | A63B 69/409 473/133 |
| 5,882,204 | A * | 3/1999 | Iannazo | A63B 24/0021 434/247 |
| 7,066,845 | B2* | 6/2006 | Joseph | A63B 69/0071 124/78 |
| 7,736,249 | B2* | 6/2010 | Zhang | A63B 69/406 124/78 |
| 9,555,307 | B1* | 1/2017 | Lewis | A63B 69/409 |
| 2002/0155907 | A1* | 10/2002 | Bewley | A63B 47/002 473/451 |
| 2011/0003653 | A1* | 1/2011 | Stemle | A63B 63/007 473/456 |
| 2012/0075697 | A1* | 3/2012 | Astill | G03B 21/58 359/461 |
| 2012/0319989 | A1* | 12/2012 | Argiro | G06F 3/038 345/174 |

* cited by examiner

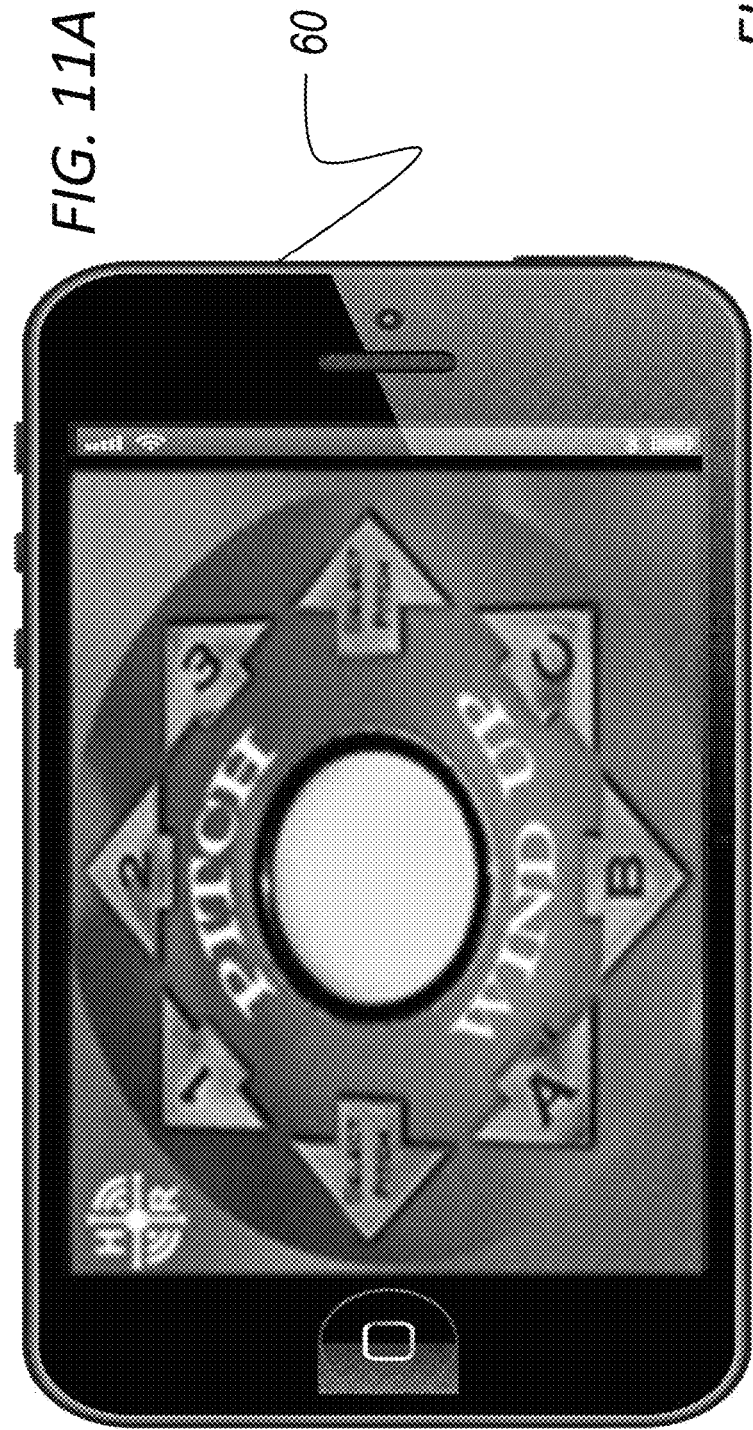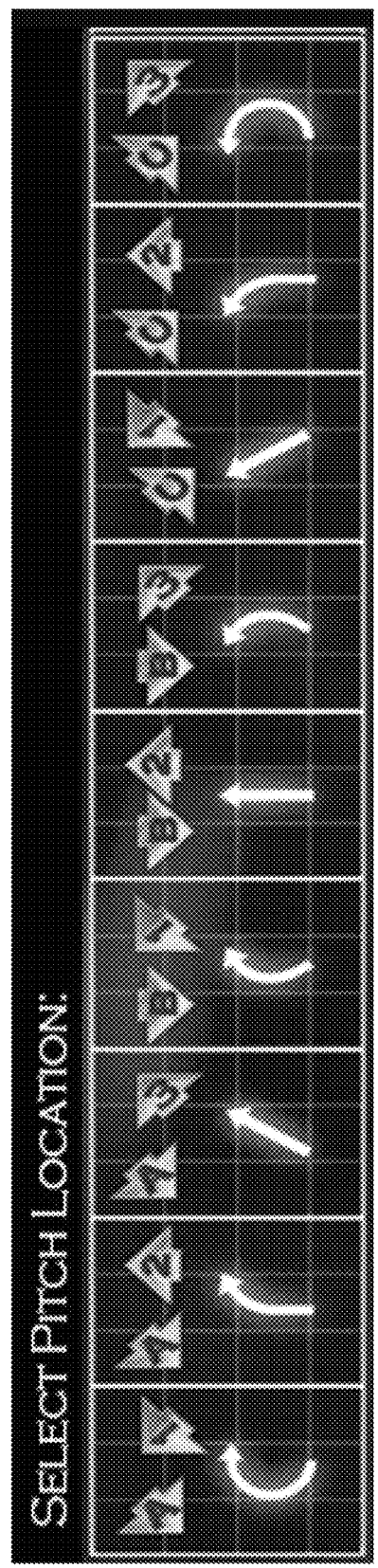

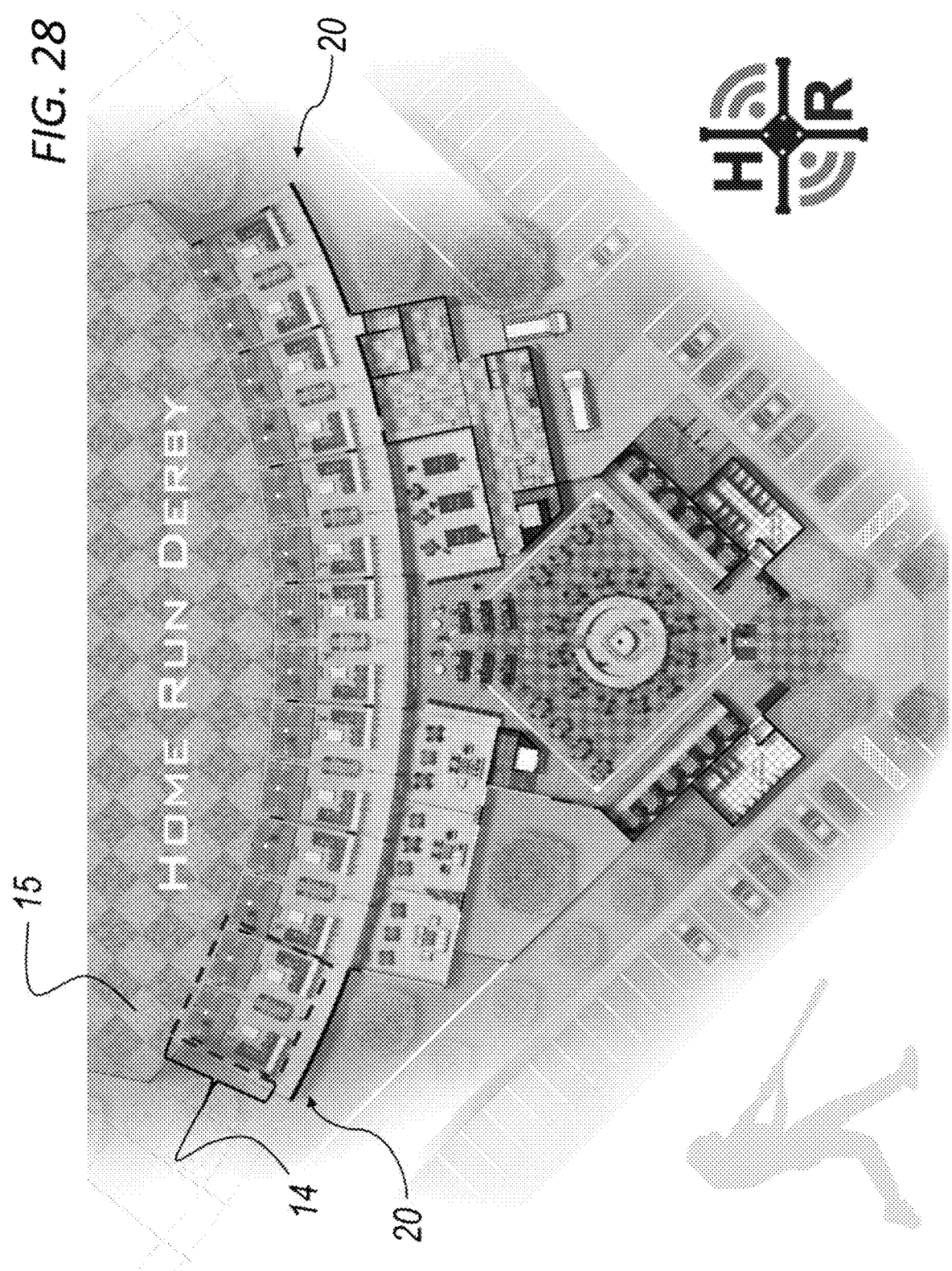

SYSTEM AND METHOD ADAPTED TO ENABLE SIMULTANEOUS PLAY OF ONE OR MORE SPORTS GAMES IN THE SAME FACILITY WITH AUTOMATED BALL DELIVERY, TRACKING AND COLLECTION

CROSS REFERENCE TO RELATED U.S. PATENT APPLICATIONS

This application is a non-provisional of, and claims the benefit under 35 U.S.C. § 119(e) of the earlier filing date of U.S. Provisional Application Ser. No. 62/327,979, filed on Apr. 26, 2016, which is hereby incorporated in entirety by reference.

BACKGROUND

1. Field

The present invention relates to facilities for playing, practicing, and training of sports games, specifically including, without limitation, disc or Frisbee games and ball games, such as for example basketball, football, soccer, kickball and stick-, club- and bat-and-ball games, including baseball, softball, cricket, hurling, lacrosse, golf, field hockey, floor hockey and ice hockey, etc. More specifically, the present invention relates to an improved system for game play, practice and training adapted to enable an increased number of players and trainees to safely and simultaneously participate in training, practice or play of various different sports games in the same facility, including, without limitation, those listed in the immediately preceding sentence.

2. Description of Related Art

Stick-and-ball or stick-and-puck games are generally played by two opposing teams on a field of play. There are many different stick-and-ball games, including hurling, lacrosse, golf, ball hockey, bandy, broomball, floorball, field hockey, floor hockey and ice hockey, among many other games. Offensive and defensive roles are typically determined by possession of the ball or puck, with the team playing offense having possession and offensive and defensive roles changing dynamically in accordance with possession.

As opposed to bat-and-ball games, club-and-ball, stick-and-ball and stick-and-puck games are typically played with the ball or puck primarily in contact with the surface of the ground or field. In contrast, bat-and-ball games are generally played with the ball delivered in the air to a player by a pitch, and when the ball is hit the defense team either catches the ball in the air or throws the ball in the air to other defensive players to get the offensive player "out".

Bat-and-ball games are generally played by two opposing teams on a field of play. There are many different bat-and-ball games, including baseball, rounders, softball, stickball, t-ball, Wiffle Ball®, and cricket. Bat-and-ball game teams typically involve teams alternating between defensive and offensive roles. The team in the offensive role is sometimes referred to as being "at bat", and the team playing defense as "in the field".

A player in the field may put a ball in play by throwing or pitching the ball to a player who is "at bat". The player at bat, or the "batter", attempts to score points by hitting the ball to achieve a particular result, depending on the rules of the particular bat-and-ball game. For example, in some bat-and-ball games, after hitting the ball the batter may attempt to run from the "at bat" position to a scoring position. In baseball, this is accomplished by running through a series of bases, or safe zones, until reaching a scoring location.

While in contact with a base, the runner is "safe" from the fielding team and may attempt to run to additional bases and ultimately to reach a scoring position or base, known as "home plate" in baseball, to score a point or a "run". When not in contact with a base the runner may be at risk of "getting out", or being removed from the field of play by the defensive team.

When the defensive team gets a certain number of batters and runners out, the teams switch offensive and defensive roles. The number of outs required depends on the rules of the particular bat-and-ball game. The duration of a game is typically determined by completing a number of periods, sometimes referred to as innings, in which each team takes turns playing both offense and defense.

In baseball, the objective for the offensive team, or the team "at bat", and for each batter up to bat at home plate, is to hit a pitched ball into the playing field in such a way as to enable the batter to make it safely to base and allow other runners to safely reach the next base, or to hit the ball out of the playing field for a "home run" score. When players successfully round all of the bases to reach home plate, the offensive team scores points, or "runs".

For the defensive team, the objective is to strike out as many players as possible with pitched balls and, if a ball is hit, for the players in the field to catch a fly ball, achieving an out, or to field a ground ball and either to force an out by touching a base, to which a runner must run before that runner touches that base, while holding the ball, or to touch a runner with the ball before the runner is able to make it onto an open base. The team with the most runs at the end of the game wins.

Sports fans have long admired the ability of athletes to hit a round, pitched baseball with a round, wooden bat. And both power hitters, batters who frequently hit home runs and deep into the outfield, and placement hitters, batters who can place a hit ball into specific locations in the field, are both extremely valuable assets for offensive play. Bat-and-ball hitting games may be structured to reward power hitting, the ability to hit long distances, placement hitting, the ability to hit a baseball into specific locations, or other skills.

Many games have been developed that include the ball hitting aspect of baseball. For example, Home Run Derby®, a power hitting game, described by Major League Baseball as "entertainment in the nature of batting and hitting demonstrations featuring a variety of entertainment and sports celebrities."

However, compared to other individual or small team sports, many of the bat-and-ball games currently played typically have several disadvantages. For example, some bat-and-ball games, such as baseball, require a large playing field and a large number of players to cover the playing field (9 players per team in the case of baseball). These inherent constraints of the team size for the conventional bat and ball games limit where and when the game may be played and also makes it difficult for a few players to get together to practice or participate in a "pickup" game.

Moreover, standard playing fields are too large for average players to hit homeruns consistently, so game play is less appealing than it could be. Further, because the baseball playing field is so large, most stadiums are open air—only 6 out of 30 major league baseball stadiums have extendable roofs to protect game play against the elements and prevent game delays due to uncooperative weather.

Further, despite the fact that non-traditional bat-and-ball hitting games such as MLB's Home Run Derby have grown significantly in popularity since their roots in the 1980s, opportunities to participate in these hitting games have been very limited for average individuals (non-celebrities and non-professional sports players). Typically, average individuals may only be able to find a handful of opportunities to play these types of games, such as home run derbies held at local county fairs or at community benefit events.

Also, the playing equipment for many bat-and-ball games may not be compatible with indoor or small space use. While some bat-and-ball games have been adapted to small space play, they often lack sophistication and may easily lose the interest of players or spectators. Furthermore, some bat-and-ball games adapted for small space use may not require substantial athleticism or generate an energetic game pace.

Online multiplayer bat-and-ball games provide opportunities for social interaction and comradery. In addition, video game versions of bat-and-ball games are very popular and create an exciting game play experience, but the extent of the physical activity involved is minimal, involving almost exclusively fine-motor hand-eye coordination. Overindulgence in video games has been attributed to recent trends in increasing obesity, overdependence on technology for entertainment and a general lack of the appropriate social environment to foster teamwork and sportsmanship.

Thus, it is desirable to have an improved sports game facility and system that provides technologically enhanced game play, encourages physical activity, athletic intensity and competition, and which is compatible with different types of spaces, including play in outdoor, indoor and hybrid spaces.

SUMMARY OF THE INVENTION

The following is a summary of the invention in order to provide a basic understanding of some aspects of the invention. This summary is not intended to identify all key or critical elements of the invention or to delineate the entire scope of the invention. Its sole purpose is to present some concepts of the invention in a simplified form as a prelude to the more detailed description that is presented later.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

This invention relates to stick-, club- and bat-and-ball games, including baseball, softball, cricket, hurling, lacrosse, golf, field hockey, floor hockey and ice hockey, etc. More specifically, the present invention relates to an improved system for game play, practice and training adapted to enable an increased number of players and trainees to safely and simultaneously participate in training, practice or play of various different sports games in the same facility, including, without limitation, those listed in the immediately preceding sentence.

It is an object of the present invention to provide an improved game system and facility. The present invention involves a basic aspect of traditional stick-and-ball and bat-and-ball games—hitting a puck or ball. According to one aspect of certain embodiments of the present invention, a game facility and system is provided that is adaptable for modular construction, enabling the easy extension of player hitting bays or batting bays in the lateral direction and stacking of the player hitting bays or batting bays in the vertical direction.

It is also an object of the present invention to create an adaptable facility and playing field capable of being reconfigured to accommodate the different ball and puck hitting games of the present invention, as well as other games, even if not disclosed herein. In accordance with another aspect of the invention, the facility may include a number of hitting bays, configured to accommodate multiple players and teams of players, which may be disposed along a number of levels.

Players may hit pucks or balls from the player hitting bays or batting bays into a playing field or into a screen depicting or displaying a playing field. The puck or ball may be pitched or tossed or the puck or ball may be held stationary, e.g. by a batting tee, or simply set or dropped on the ground. For bat-and-ball sports, balls may be pitched to the players using a vertical or "soft toss" pitching machine.

For bat-and-ball games, a batter's plate and pitcher's mound may be disposed within the batting bay, and the vertical or "soft toss" pitch machine may be located within several feet of the batter's plate, possibly in front of the batter's plate or on the side of the batter's plate opposite to an occupied batter's box. Alternatively, the batter's plate or pitcher's mound may further be configured to house the mouth of the soft toss pitching machine that delivers the vertically pitched ball through the top of the batter's plate. In addition, players who wish to do so may have the pitching mechanism replaced with a batting tee. In a preferred embodiment, the batting tee comprises a telescopic mechanism.

Further, for some bat-and-ball games, the "soft toss" vertically pitched ball may always be a "strike" pitch, meaning that players must swing at every pitch or receive a strike towards a potential out. Alternatively, the pitching mechanism may be configured to alter the pitching speed, height and/or angle to place the ball into different quadrants or sectors of the strike zone or to place the ball outside of the strike zone altogether.

Advantageously, employing a vertical or "soft toss" pitch machine means that no helmet is necessary for the batter and no backstop or batting cage or netting is required for the safety of the other participants in the player batting bay, however helmets, backstops or batting cages may be used as for precautionary measures and for aesthetics. Further, helmets with display visors may be used as a convenient way to display augmented reality overlays to the players.

This invention is especially relevant to baseball and softball, and more particularly provides a system and method of game play for conducting a baseball or softball hitting game. The playing field extends forward out from the batting bays and also laterally, beyond either end of the batting bays. The ground or the pitch of the playing field may comprise a number of demarcated zones, each of increasingly greater distance from the batting bays, and a number of targets within the zones.

In addition, the field includes a back fence, rising to a specified maximum height, and also a back wall extending up to a greater maximum height. Further, the back wall may be divided or sectioned into multiple zones and methods of demarcation may include changes in height, color or shape and size of depicted targets.

A central computer may use one or more mechanisms, or a combination of multiple mechanisms including, without limitation, radar, infrared, optical, high-speed or other type of camera or remote sensing detector, including but not limited to motion sensors, RFID, pressure sensors or smart textiles to determine whether player has made a swing, or an attempt to hit the ball, and whether a ball or strike was committed for a particular pitch, which tracts, segments, zones and/or targets are struck by a hit ball. According to another aspect of the present invention, a scoring board may be displayed on a screen within each individual player batting bay or virtually in an augmented reality display.

The high speed cameras used to track the ball trajectory may also be used to record a video replay of the swing and give individuals the option to replay, save, or share the video through the user interface and mobile application with options to connect to their social media accounts and share with their network.

A hit-ball collection system may include, infield and outfield walls of various heights, collection traps, funnels, channels and piping, through which the balls are designed to roll due to variations in local pitch or angle of the field. The hit-ball collection system then transports the hit-balls to a system that feeds the balls to the pitching devices.

Another aspect of the present invention is that it is inclusive of multiple game modes. Game modes may include single player game modes, such as for example arcade mode, training mode and online gameplay, and multi-player modes, such as on-site competitive gameplay, training mode, scrimmage mode and online gameplay. Further, the present invention includes a method of conducting point of sale transactions, such as "loser pays", as further described below in the detailed description.

In the single player arcade mode, players may select from a series of single player games. In training or scrimmage modes, players can practice batting for distance and accuracy and engage in a variety of other training exercises and "non-league" gameplay. Online gameplay mode allows players to select among various games for online play against other users in other batting bays at the same location or other players at remote geographic locations.

These and other aspects of the present invention are realized in a bat-and-ball game system and method as shown and described in the following FIGS. and related description. Additional features and advantages of the invention will be set forth in the detailed description which follows, taken in conjunction with the accompanying drawings, which together illustrate by way of example, the features of the invention.

BRIEF DESCRIPTION OF THE DRAWINGS

Various embodiments of the present invention are shown and described in reference to the numbered drawings wherein:

FIGS. 11A and 11B depict a pitching app interface for controlling the type and placement of a pitch to be delivered to a player in the player bay.

FIG. 13B depicts precise placement of a pitched ball into different quadrants or sectors of a strike zone.

FIG. 28 depicts a layout for the sports facility and sports field.

Figure 1:
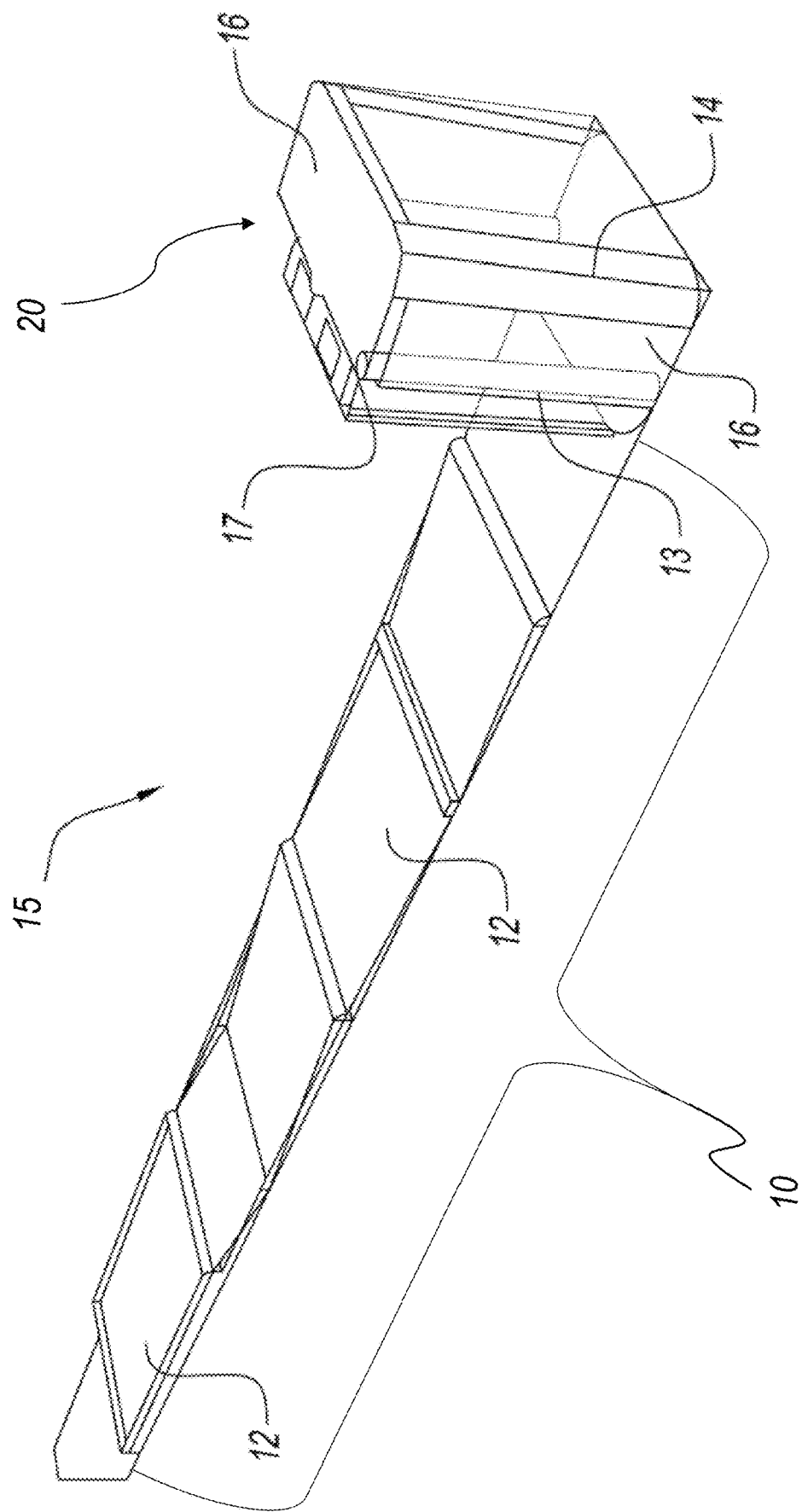
FIG. 1 depicts a single player bay and a modular sports field that extends along a tract of in front of the open side of the modular player bay.
Figure 2:
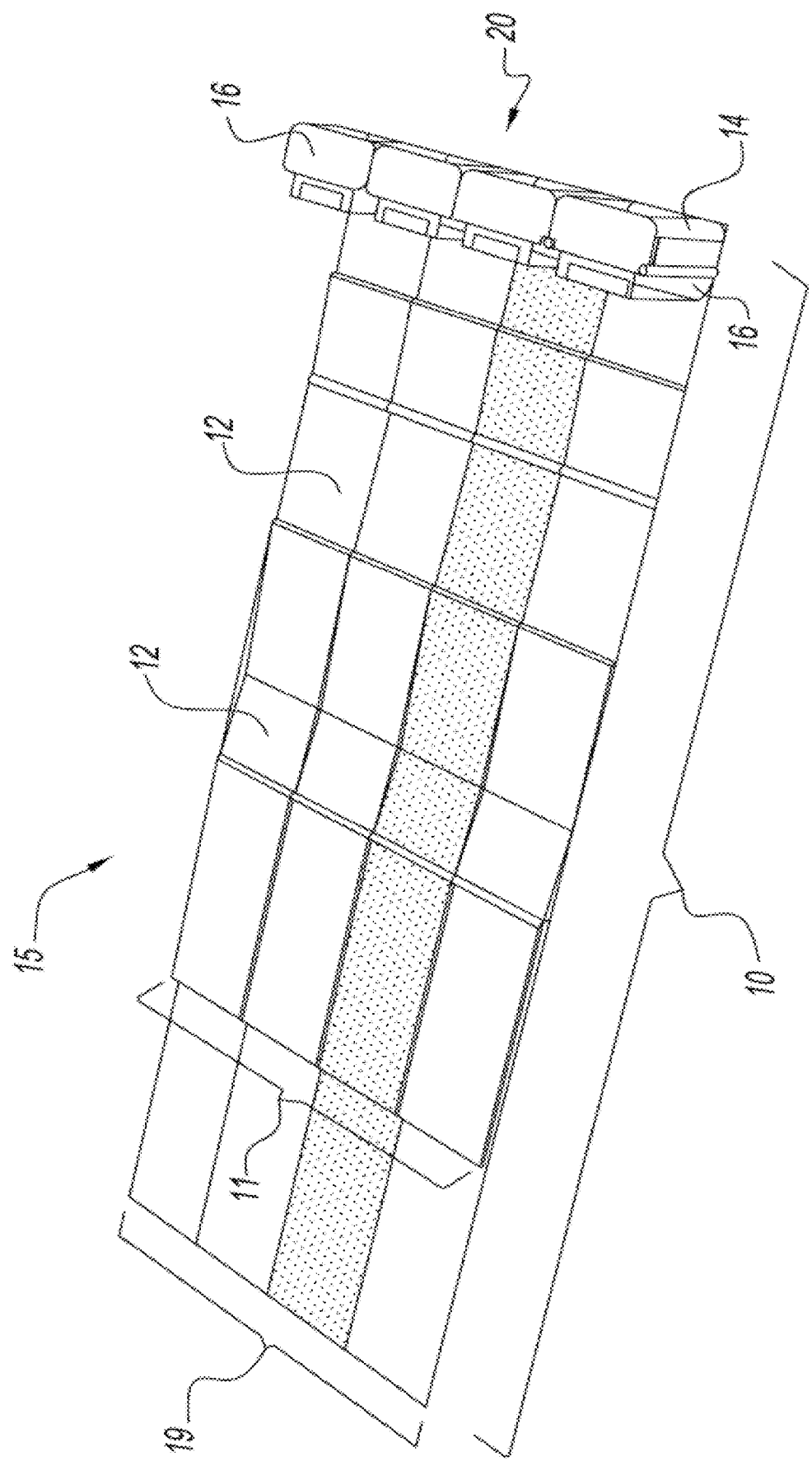
FIG. 2 depicts a single level structure of modular player bays, adjacent to each other in a line, along with their associated tracts of modular sports field.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single FIG, and as such, multiple FIGs are presented to separately illustrate the various details of the invention in greater clarity. Similarly, not every embodiment need accomplish all advantages of the present invention.

DETAILED DESCRIPTION

The invention and accompanying drawings will now be discussed so as to enable one skilled in the art to practice the present invention. These, and other, aspects and objects of the present invention will be better appreciated and understood when considered in conjunction with the following description and the accompanying drawings.

It should be understood, however, that the following description, while indicating preferred embodiments of the present invention and numerous specific details thereof, is given by way of illustration and not of limitation. The drawings and following description are exemplary of various aspects of the invention and are not intended to narrow the scope of the appended claims.

Many changes and modifications may be made within the scope of the present invention without departing from the spirit thereof and the invention includes all such modifications. For instance, although the detailed description deals primarily with bat-and-ball games, the invention is intended to cover many sports games, including without limitation the following: disc or frisbee games and ball games, such as for example basketball, football, soccer, kickball and stick-, club- and bat-and-ball games, including baseball, softball, cricket, hurling, lacrosse, golf, field hockey, floor hockey and ice hockey, etc.

In many cities, there are more teams and players than convenient field locations allow for flexibility and availability of scheduling game play. In addition, in order to get onto the schedule for local sports fields, players must often be members of teams that participate in recreational sports leagues. Recreational sports players typically have to commit to a full season of league game play and might not be able to make it to every game, precluding or dis-incentivizing many would-be infrequent or only sometimes players.

Further, adverse weather can result in unexpected game cancellations for unprotected sports fields, further complicating scheduling efforts. And furthermore, everyone wants to hit but few want to chase balls. One of the primary advantages of this invention, is that it vastly increases the number of people who can safely and simultaneously participate in hitting or shooting practice and club- or bat-and-ball games.

In addition, the present invention comprises a computer and internet connected gamification system, which enables users to combine virtual and physical characteristics of the sports they love most. Further, the present invention provides an improved facility and system that enables technologically enhanced game play, encourages physical activity, athletic intensity and competition, and which is compatible with different types of spaces, including play in outdoor, indoor and hybrid spaces.

Players may hit pucks or balls from the player hitting bays or batting bays into a playing field or into a screen that may depict or display a playing field. Further, the playing field, targets located therein, and the trajectory and full path traveled by the puck or ball may be displayed within an augmented reality system 155. The puck or ball may be pitched or tossed or the puck or ball may be held stationary, e.g. by a batting tee, or simply set or dropped on the ground. For bat-and-ball sports, balls may be pitched to the players using a vertical or "soft toss" pitching machine.

A primary embodiment of the present invention, as shown in FIG. 1, comprises a sports facility 20 including one or more player bays 14, which may have attendant and tracts 10 of sports field 15 composed of multiple field segments 12. The player bays or batting bays may be modular in construction, and may also include one or more conduits 13 comprising a sports equipment transport system that is configured to connect to sports equipment collection and delivery systems and to transport sports equipment back to the modular bays 14.

The conduits 13, may comprise ducts, tubing, piping or other types of channels connected to a sports equipment delivery mechanism located within the player bays 14, as well as to a sports equipment collection repository. Enabling the modular characteristic of the player bays, the conduits 13 may be adapted with an opening 17 at either end of the conduit, that connects to corresponding opening at the bottom of a conduit 13 integrated within a player bay to be stacked on top of the player bay below.

In one embodiment, the present invention provides a sports field 15 (FIG. 2) and a sports facility 20, which may comprise a series of player hitting bays or batting bays 14 (FIGS. 2, 3, 5 & 6). Integration of bat-and-ball sports within the sports facility 20 and vertical stacking of the player bays (FIGS. 3, 5 & 6) is enabled by a vertical, ground-up "soft toss" pitching machine 100 (FIGS. 13B-26).

This ground-up, soft-toss pitching machine enables the unique integration of bat-and-ball sports within the multi-level configuration of the sports facility 20 by compacting the space required for delivery of a mechanical pitch, allowing the player bays 14 (FIGS. 1 and 3-5) to be stacked one on top of each other. Because of the distance (typically 40 ft. to 60 ft.) required to be maintained between the hitter and the pitching machine, horizontal pitching machines are not well suited to vertical stacking of multiple player hitting bays 14 that open onto a sports field.

This is because of the fact that, even with a horizontal pitching machine at the edge of a batter's bay that opens onto the sports field, unless the player hits a line drive or a hard ground ball, the ball will not make it out of the batter's bay into the sports field. Further, it is also not feasible to place the horizontal pitching machine on the sports field and to have the horizontal pitching machine make accurate pitches to batters located in batter's bays that are above the ground floor.

For these reasons, incorporating the ground-up, soft toss pitching machine enables the unique integration of bat-and-ball game batter's bays above ground level in the novel multi-story player bay sports facility of the present invention. Another disadvantage to the horizontal pitching machine is the danger posed to players, observers and equipment, such as augmented reality helmets 150 that incorporate a variety of sensitive computer electronics, sensor and detectors.

Figure 7:
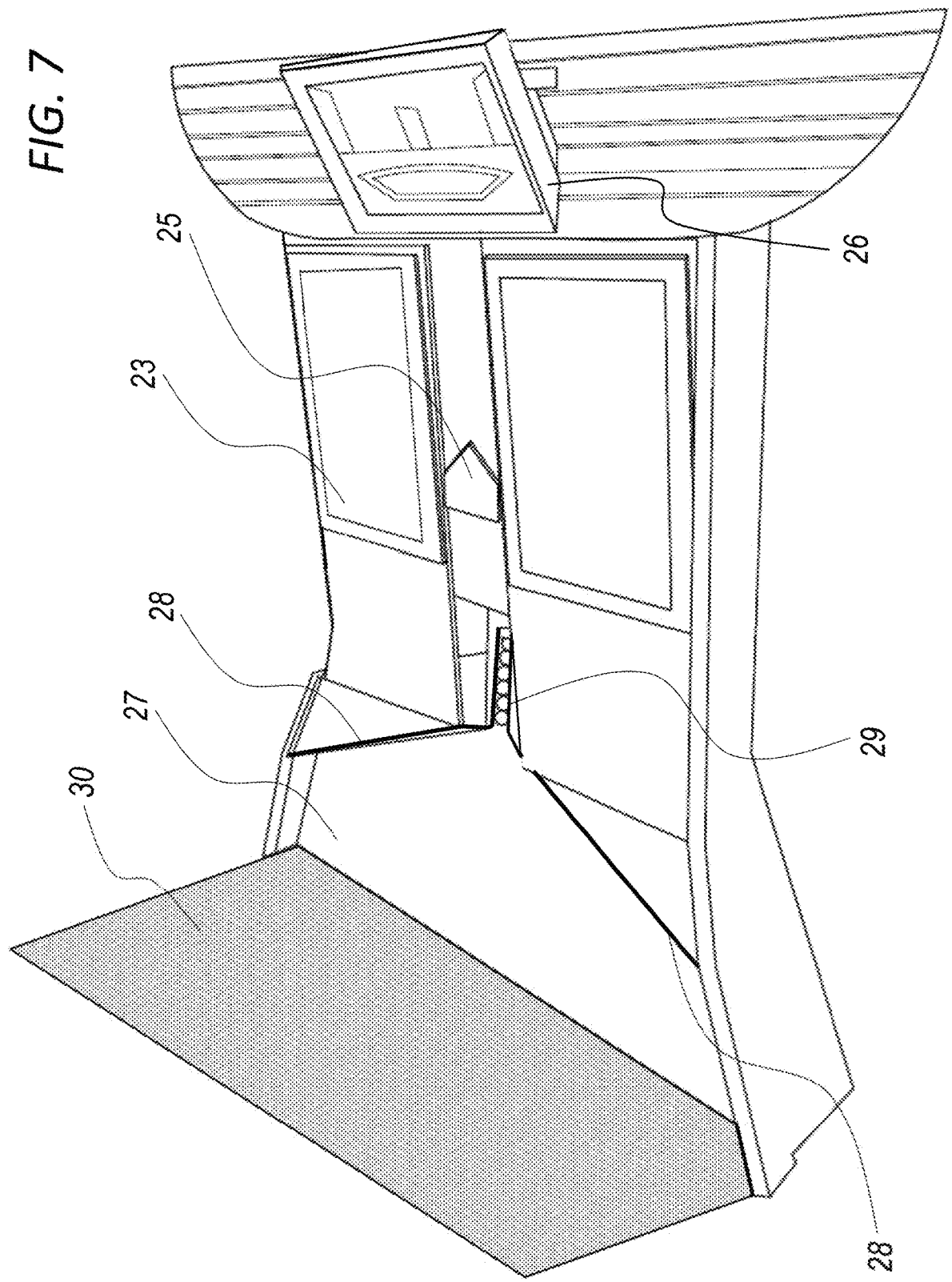
FIG. 7 depicts a single player batting bay, with a hitting screen, ball collection trap, funnel and channel feeding the balls back into a soft toss pitch machine.
Figure 8:
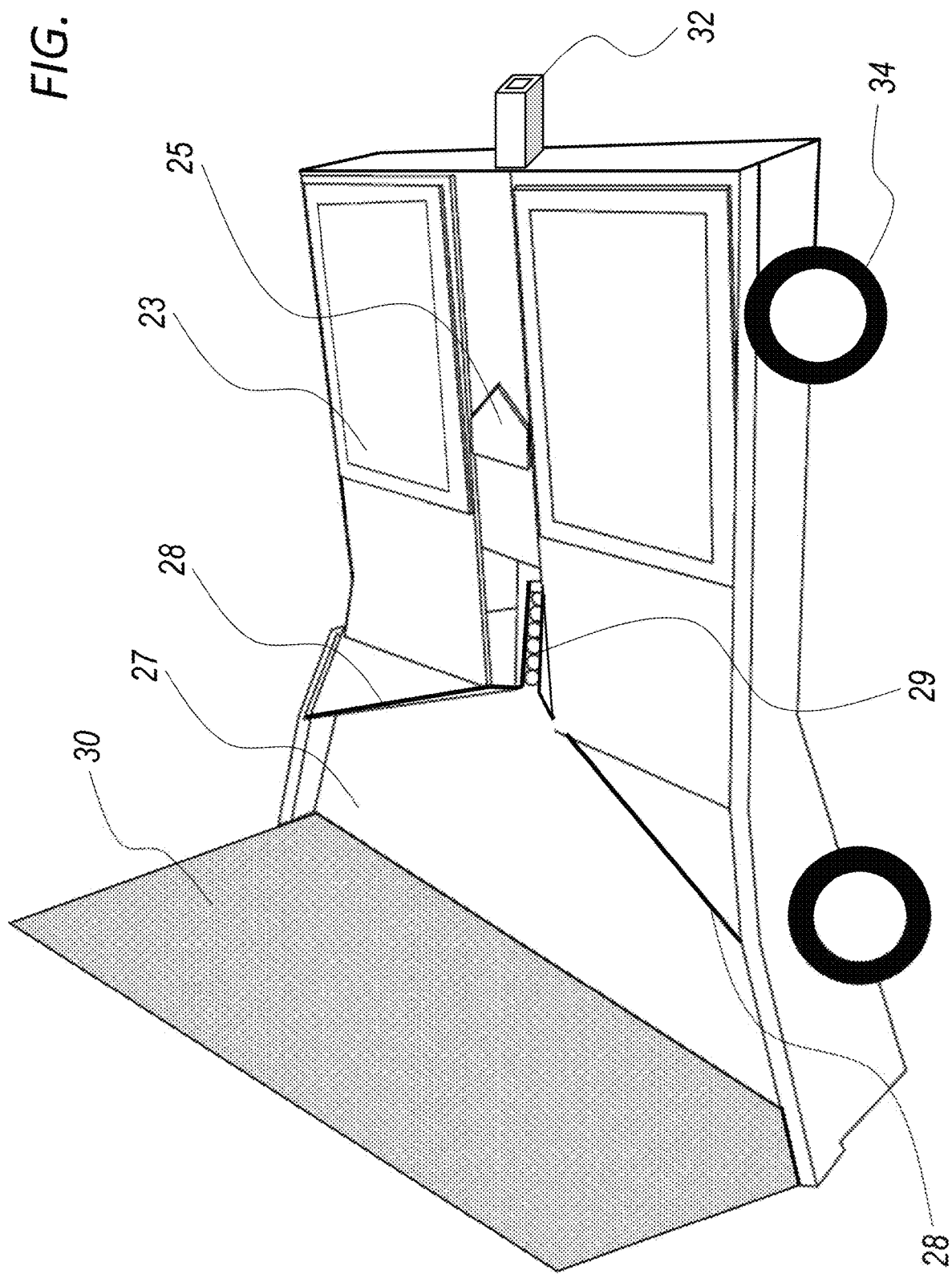
FIG. 8 depicts a mobile version of the single player batting bay shown in FIG. 7, including wheels and a hitch for easy transport to a location where the batting bay may be used or stored.

In other embodiments, the sports facility 20 of the present invention may comprise non-modular or custom constructed player bays 14. In addition, the core, primary embodiment of the present invention may further comprise a single player bay (FIGS. 1, 7 and 8). The player bay 14 may incorporate a "hitting" screen 30, which may be mechanically deployed and retracted, e.g., for storage. In certain embodiments, the player bay 14 may also comprise a mobile or portable player bay (FIG. 8). Such a mobile or portable player bay may be integrated within a vehicle trailer, with wheels 34 and a hitch 32, capable of being driven to a location where the player bay will be used for practice or play of a particular sport. Furthermore, in alternative embodiments, the components of an individual player may be disassembled for easy transport and reassembled on location where the player bay is to be utilized.

Figure 3:
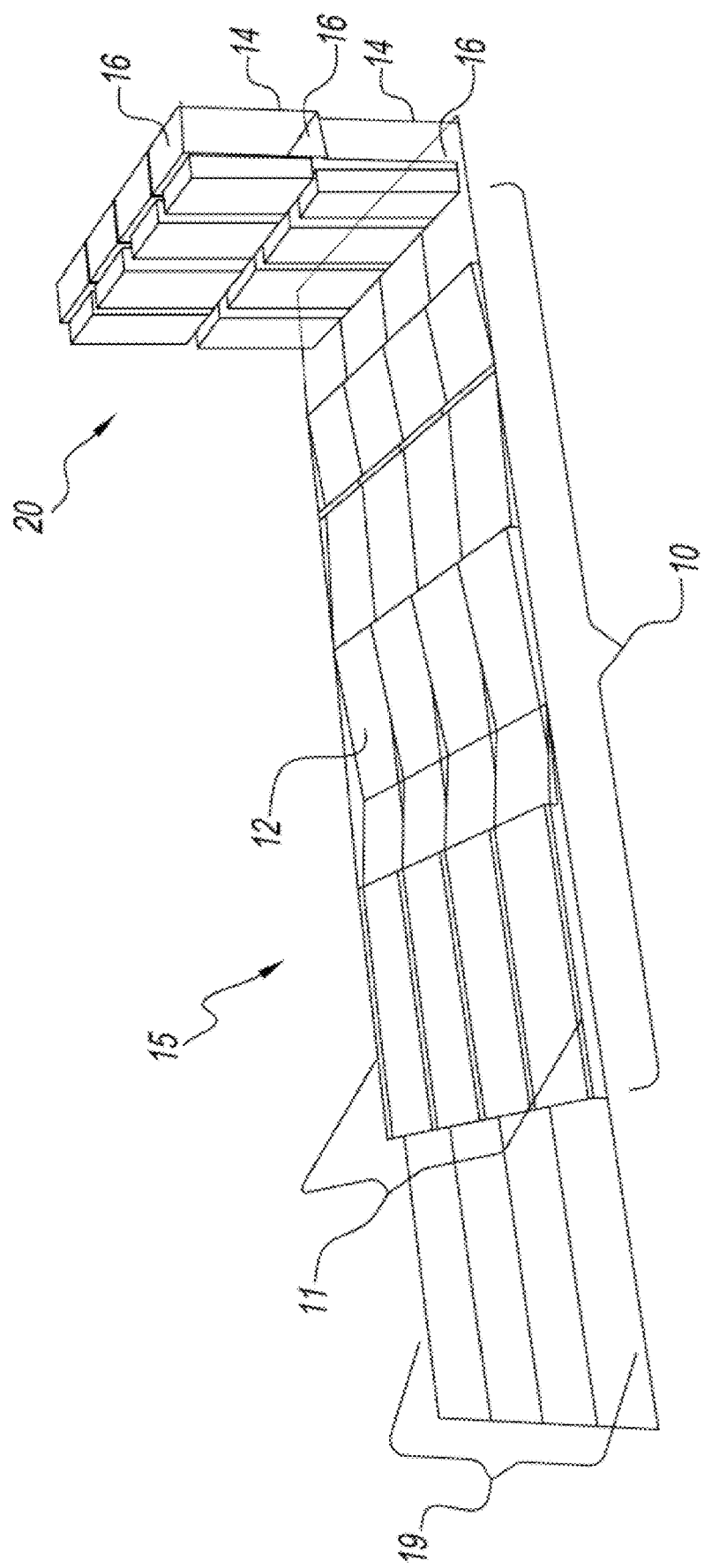
FIG. 3 depicts a multilevel structure of modular player bays, adjacent to each other in a line, along with their associated tracts of modular sports field.
Figure 5:
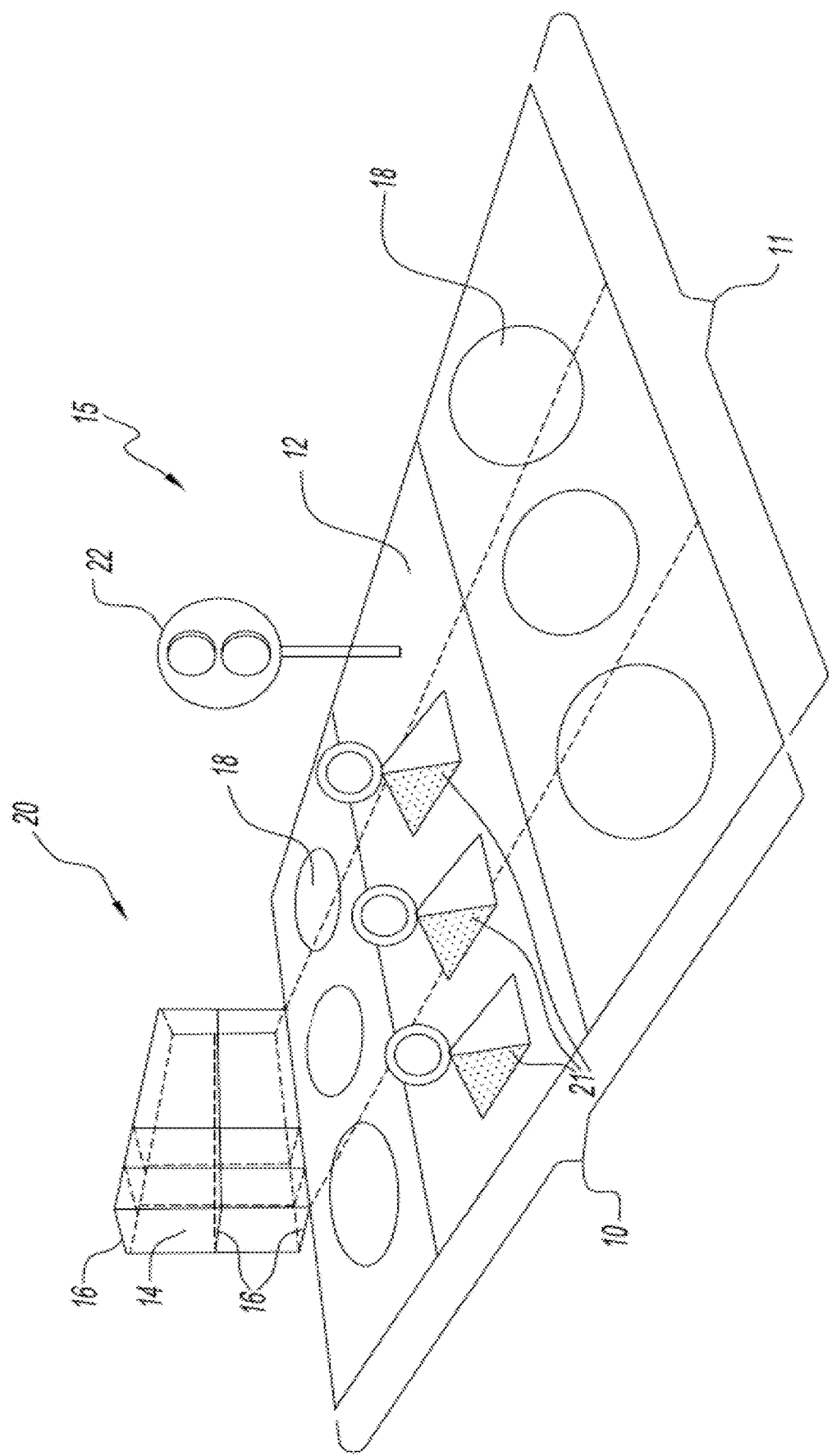
FIG. 5 depicts a two-story line of modular batting bays with exemplary target zones placed or projected onto the modular sports field segments.
Figure 6C:
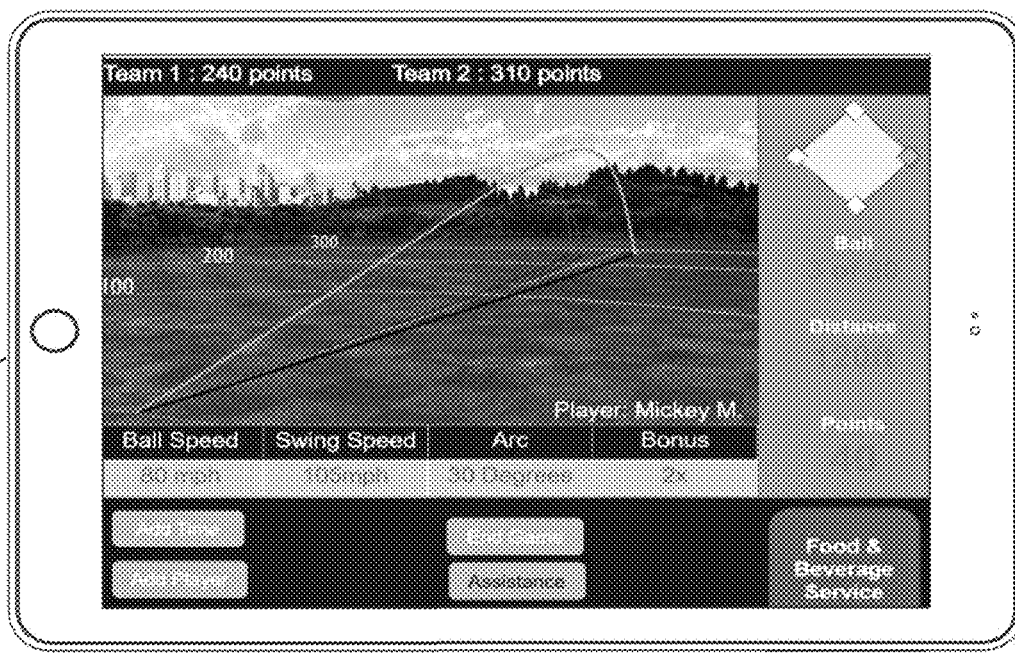
FIG. 6C is an interactive scoreboard with connectivity to the pitching machine and batter identification cameras and sensors, as well as the ball and gameplay tracking technology.
Figure 6A:
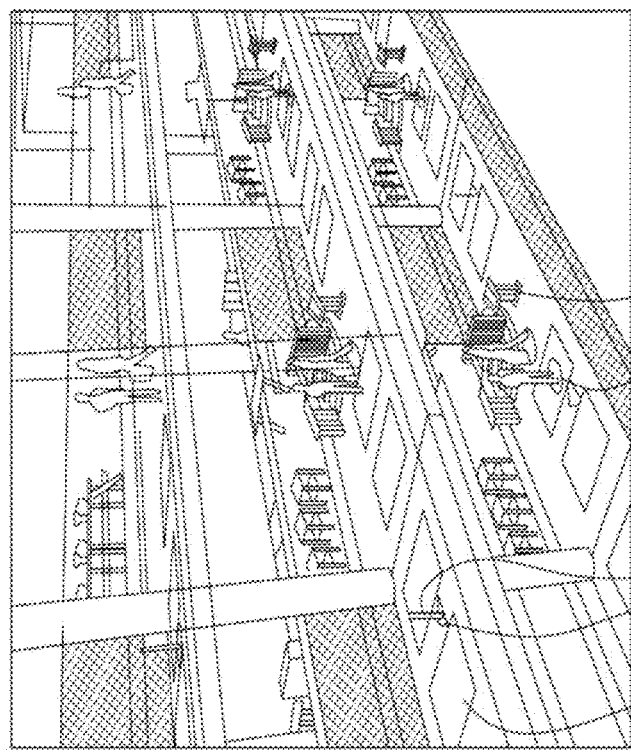
FIGS. 6A and 6B respectively depict a potential floor layout for adjacent player bays and a multilevel section of adjacent player bays.
Figure 6B:
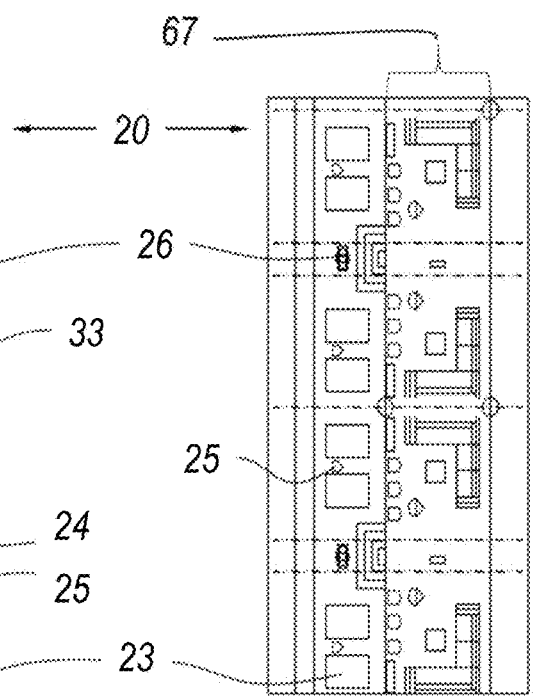

Further, in embodiments with modular player bays, the hitting bays or batting bays 14 may include modular shared floor-ceiling component 16 (FIGS. 1-3 and 5) that facilitates the stacking of player hitting bays or batting bays, side by side and one on top of another. FIGS. 3, 5 and 6A depict a multi-level assembly of modular player bays. FIG. 6B shows a top-down view of a floor plan for an assembly of modular player bays, including a lounge area 67 behind the hitting area or batter's box 23. In certain embodiments, a shield, which may vary in height, such as a transparent screen 68, e.g., made of plexiglass, lucite or other transparent material, may be used for aesthetic purposes or for additional safety precaution.

Novel aspects of the vertical, ground-up pitching machine component of the present invention may include without limitation 1) the ability to vertically project the ball into distinct areas of the strike zone 62 and even outside of the strike zone altogether (FIGS. 12, 13A and 13B); 2) connectivity to a gameplay graphical user interface (FIG. 6C); 3) a pitch trigger mechanism; 4) a pitch placement selection application operating within the kiosk graphical user interface or on a connected smart device 60 (FIG. 11A); 5) connectivity to player and ball identification and tracking technologies, including but not limited to pressure sensors (to recognize presence of a batter in the batter's box 23 or when a pitched ball is not hit), motion sensors, cameras or microphones (to determine when a player is "ready" for a pitch, whether a player has made a swing, or an attempt to hit the ball, and whether a ball or strike was committed for a particular pitch), Doppler radar, infrared, cameras, RFID and other sensors 45 (FIGS. 10C and 31) to track the location, speed, trajectory of a hit ball.

An ideal embodiment of the present invention may include the ability to identify and vertically project balls of varying weight, size, color, and texture; such as softballs, baseballs, or even custom balls with a solid rubber core. An example of a custom ball would be a rubber core ball (lacrosse ball) wrapped in a leather baseball cover. This custom ball is designed to mimic the feel of hitting a baseball as well as to maximize trajectory through elastic rebound of the rubber core to compensate for loss of forward momentum typically gained from a traditional pitch.

One embodiment of the present invention may further include, but is not limited to, 1) a sports field which may be composed of modular sports field segments 12, with distinct tracts 10, zones 11 (FIGS. 1-5 and 9) and targets 18 (FIGS. 4, 5 and 9), which may be located both on or above the ground and used for game scoring; 2) a ball collection, transport and delivery system, including a ball reservoir for holding a store of balls that have been collected; 3) a ball feeder and identification system (e.g., RFID tags in balls and RFID readers included at various locations within the ball collection, transport and delivery system); 4) a ground-up, vertical or soft toss pitching machine 100 capable of projecting the pitched ball into selected quadrants or sectors of the strike zone (e.g., as directed by an app interface); 5) a system for tracking pitched and hit balls (RFID, Doppler radar, infrared, video cameras, motion and pressure sensors, smart fabrics etc.); 6) a smart device mobile application interface (FIGS. 6C, 11A and 11B) for personal devices 60 (FIG. 11A) or a touchscreen kiosk 26 (providing a graphical user interface, enabling selection of gameplay options, finding new opponents, display of membership info, scoreboard and point-of-sale (POS) for purchases of memorabilia and/or refreshments); and 7) a lounge area 67 in the batting bay for spectators or teammates to safely watch the competition, order food and beverages, or wait comfortably for their next at-bat or interact as designated pitcher via the mobile application.

Further, using the mobile app (FIGS. 6C, 11A and 11B) operating on a personal connected smart device 60 or the touchscreen kiosk 26, players 33 may select from among various games to play, select pitch location for oneself, a teammate or an opposing player, order purchases of memorabilia or refreshments such as food and beverages, track and receive notifications regarding next at-bat, and control various other aspects of gameplay, scoreboard and TV displays, as well as temperature and local climate controls.

Figure 10C:
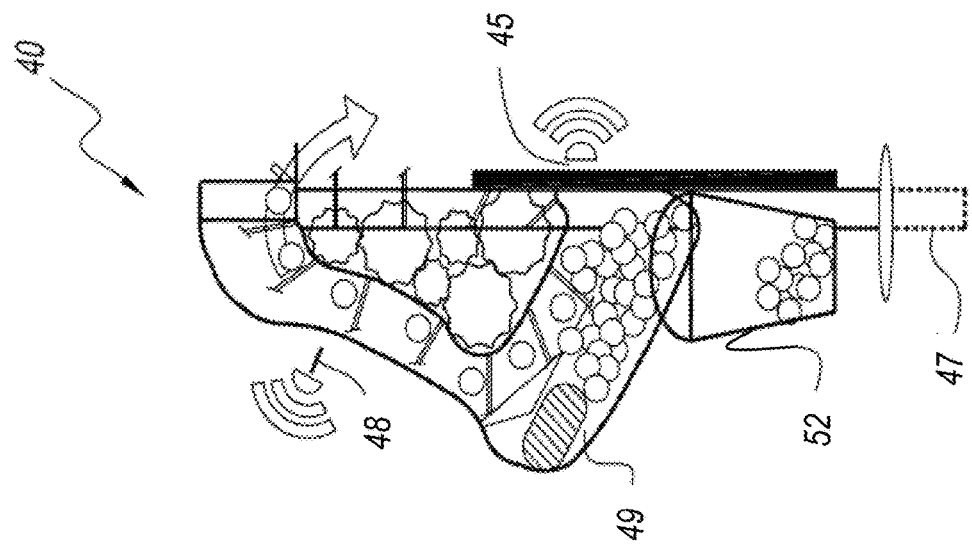
FIGS. 10A-10C depict different variations of a ball collection and feeding mechanism, for feeding balls collected from the sports field into a ball delivery machine for delivery to players within the player bay.
Figure 31:
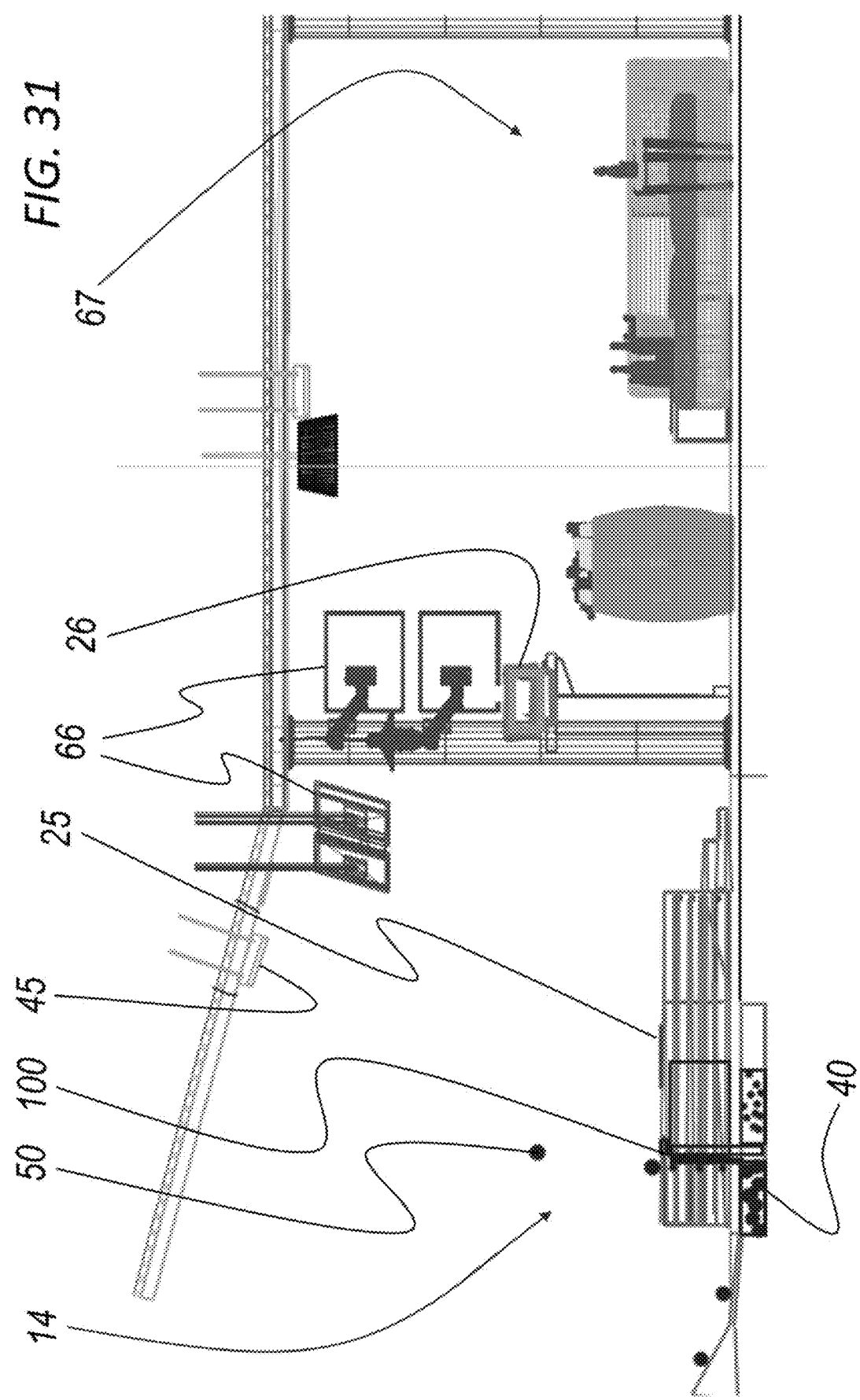
FIG. 31 depicts a close-up, side view of a player bay and spectator lounge area.
Figure 32:
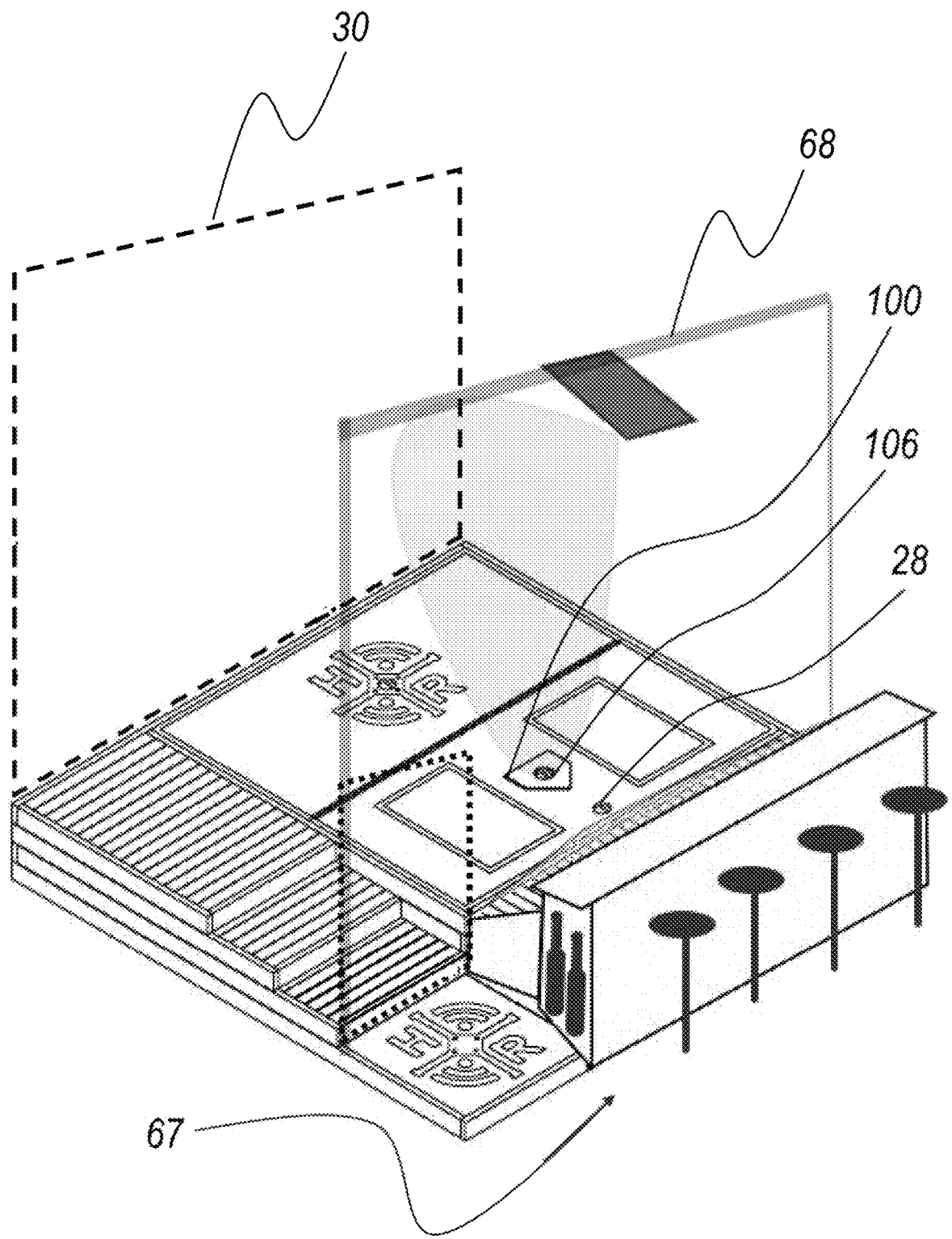
FIG. 32 depicts a batting bay with a hitting screen and transparent protective shield between the batting bay and the spectator lounge area.
Figure 33:
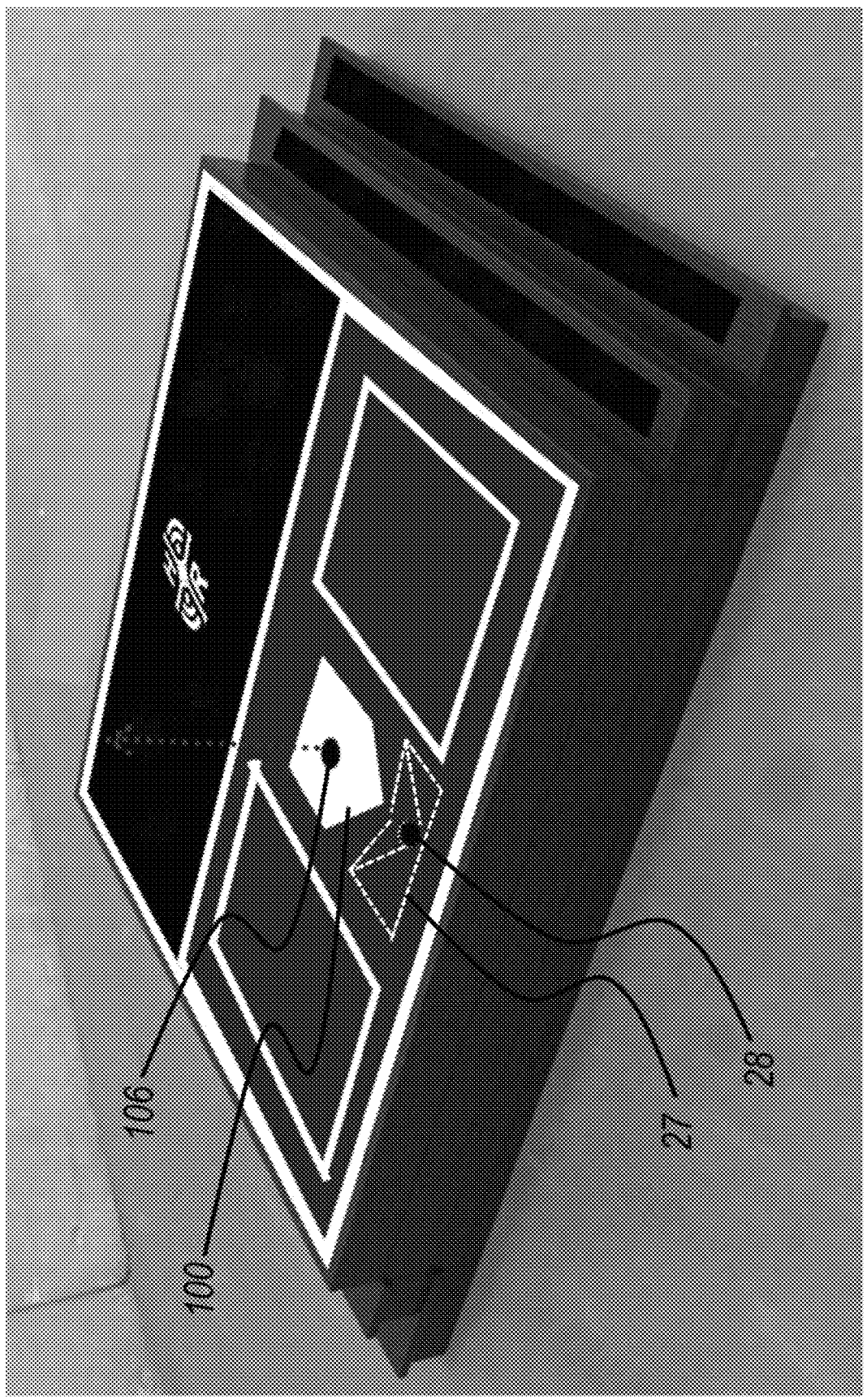
FIG. 33 depicts a batting bay with the ground-up, soft toss pitching machine located under home plate.
Figure 34:
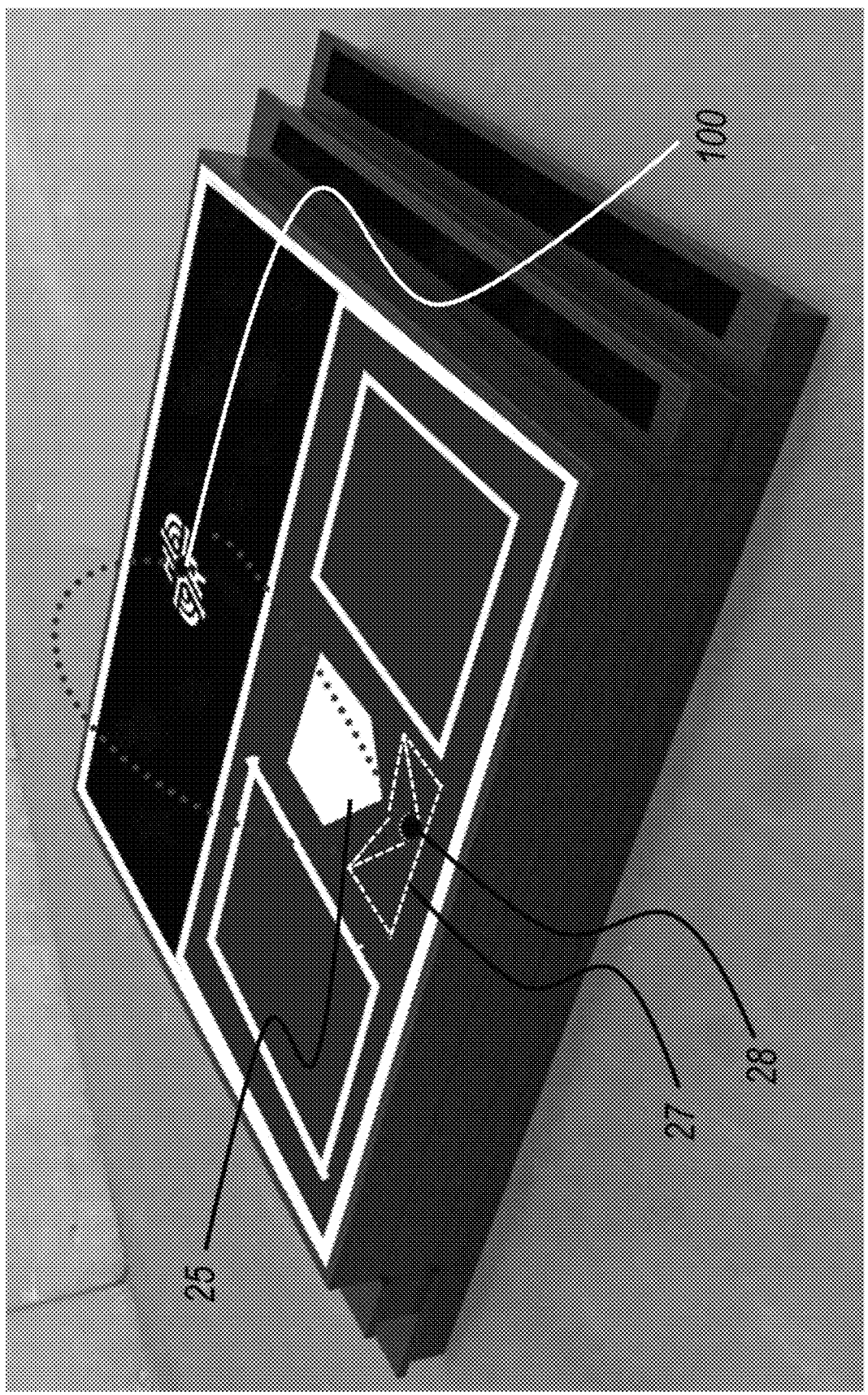
FIG. 34 depicts a batting bay with the ground-up, soft toss pitching machine located in front of home plate and the batter's box.
Figure 35:
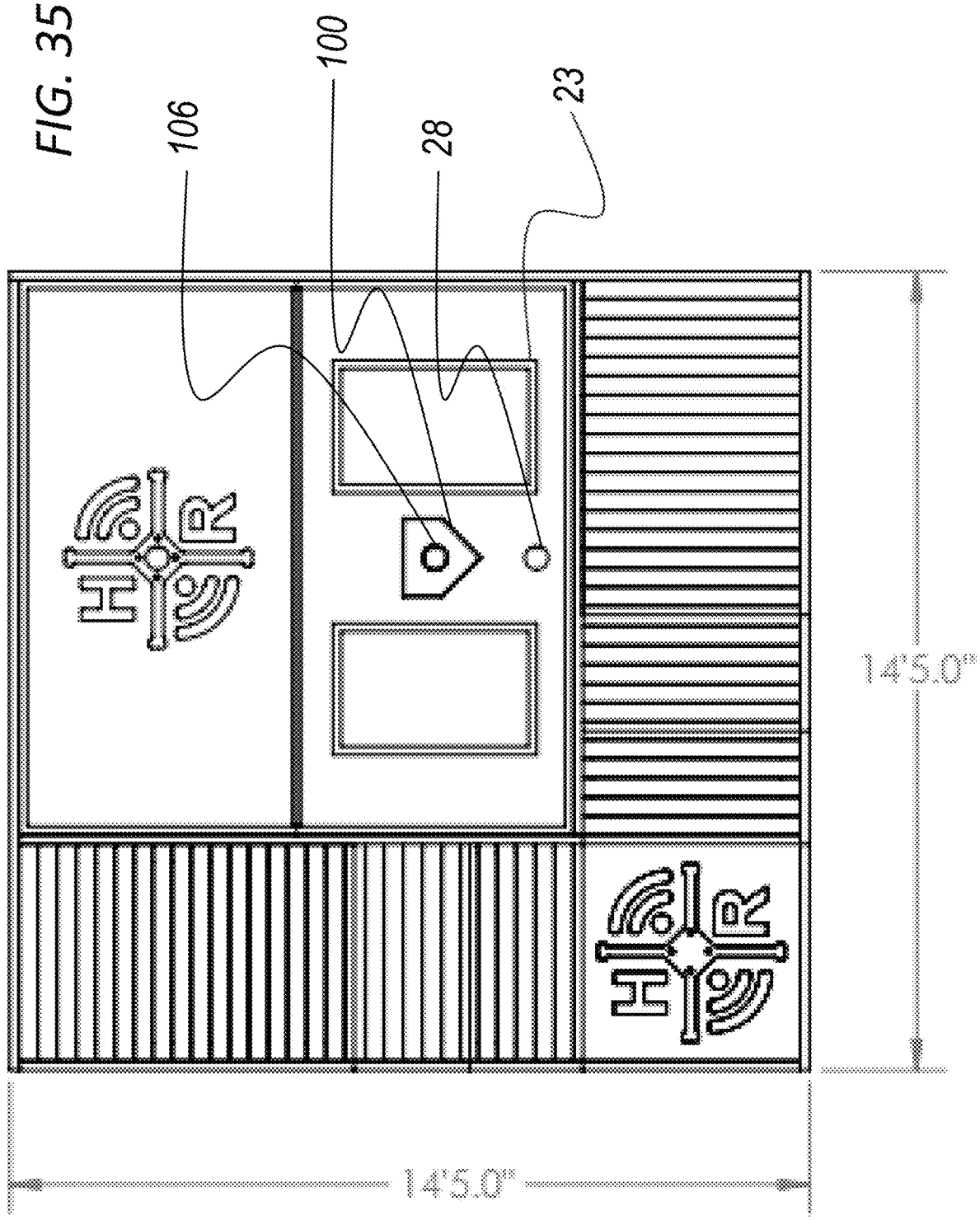
FIG. 35 depicts a top-down view of a potential layout and dimensions for a batting bay.
Figure 36:
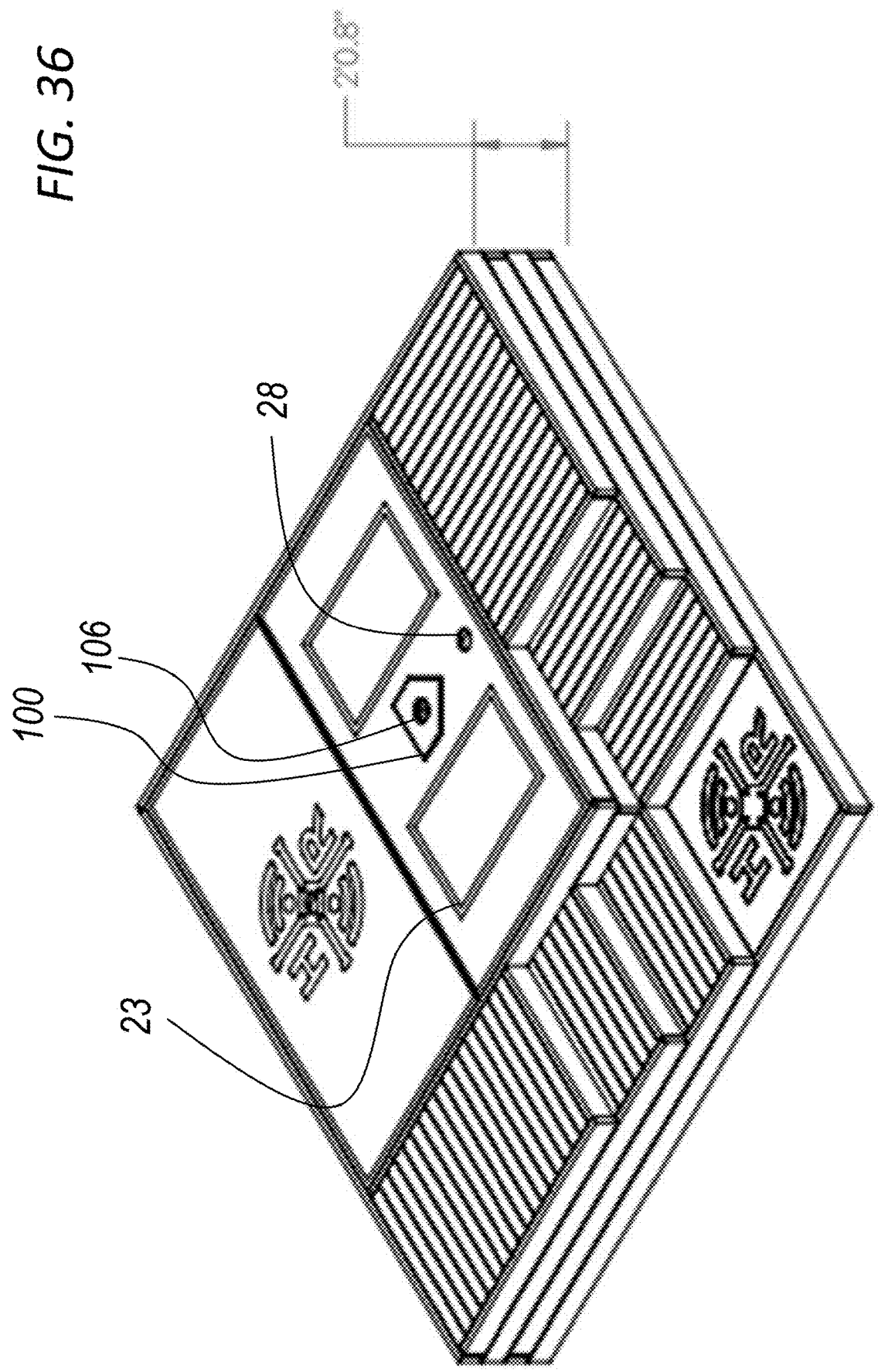
FIG. 36 depicts a side perspective view of a potential layout and dimensions for a batting bay.

As shown in FIGS. 10C and 31, Doppler radar, infrared, cameras or other sensor devices 45 may be used to monitor and determine the speed and trajectories and other parameters of pitches as well as hit pucks, balls or other sports equipment. This data, including visual representations of the puck or ball trajectory and pathway, may then be depicted on mobile devices or fixed screens 66 within the player bay 14. In the case of remote competition, player hits, strikes and other activities and actions are preferably displayed on screens 66 at the competitors' respective locations. Connectivity to the point of sale system enables players to compete for prizes or determine who is responsible for payment of an invoice based on the outcome of their selected games (further explained in "loser pays" gameplay section).

Balls or pucks may be placed in a convenient location of the hitting bay or batting bays. For bat-and-ball games, FIGS. 13-26 show that balls may be pitched or projected vertically upwards from the ground, placed on or suspended above a batting tee (e.g., via air pressure 64, electromagnetics, etc.), or dropped down from above, e.g., the pitching machine may be integrated into the ceiling.

In a preferred embodiment for bat-and-ball games, a batter's plate 25 may be disposed within the batting bay, and the vertical or soft toss pitch machine may be located within several feet of the batter's plate, possibly in front of the batter's plate or on the side of the batter's plate opposite to an occupied batter's box. In a preferred embodiment, the ball is delivered to the batter via a soft toss pitch that pops the ball up from one to several feet in front of home plate and the ball arcs back over home plate 25.

Soft toss is a method of pitching typically used by coaches for practicing ball hitting in baseball and softball. Because the soft toss pitch is a low-momentum underhand toss, it needs to be delivered in close proximity to the hitter and therefore also, for the protection of the pitcher, from off to the side of the hitter. Similarly, current soft toss pitching machines must be located off to the side of the batter in order to prevent damage to the machine because they are not protected by an enclosure 70 the way contemplated by the present invention.

Figure 42:
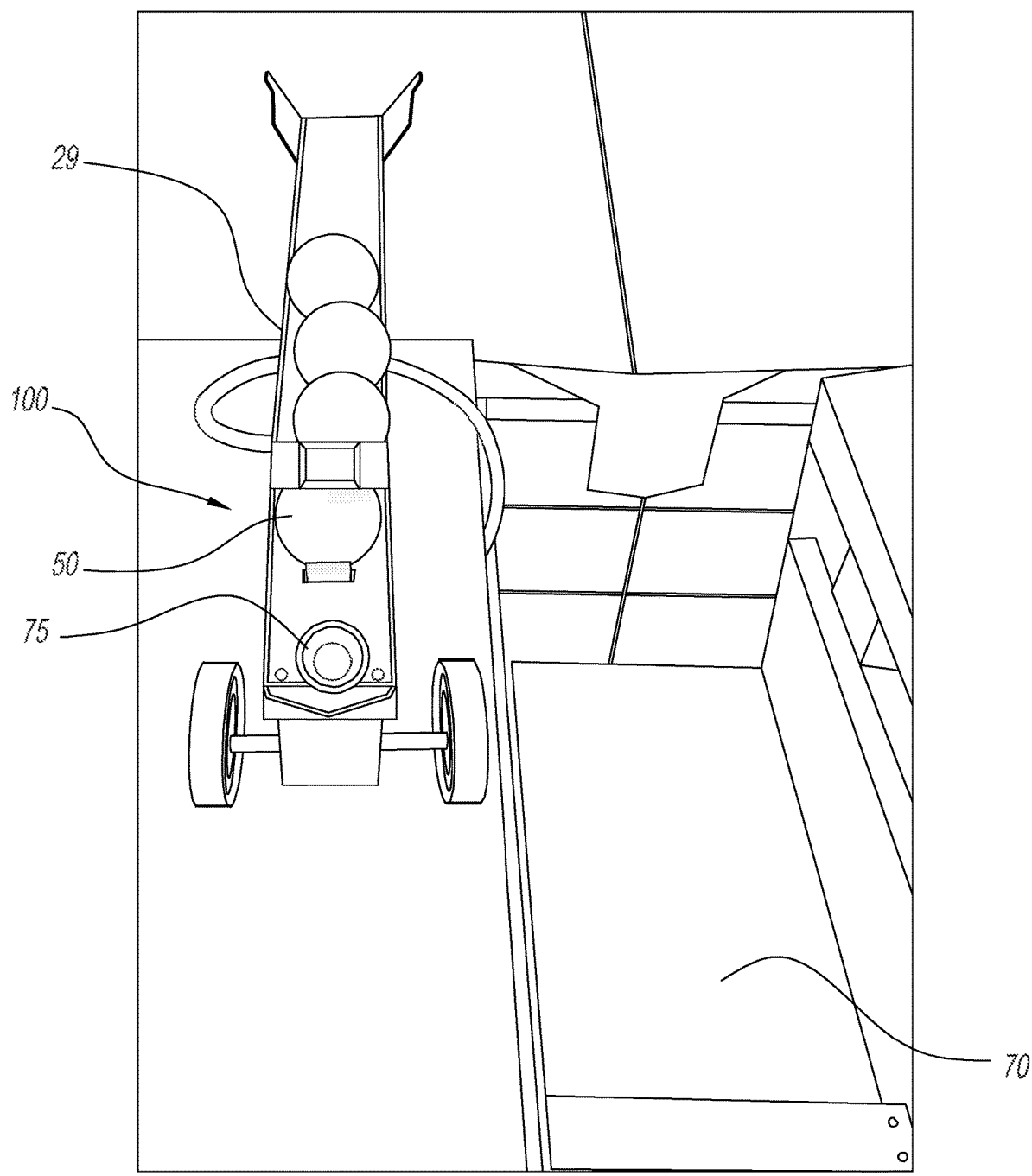
FIG. 42 depicts a close-up, top-down perspective view of the ball transport channel and the ground-up, soft toss pitch mechanism, as well as the trap and funnel of the batting bay and the area under the batting bay where the ground-up, soft toss pitching machine is housed.
Figure 43:
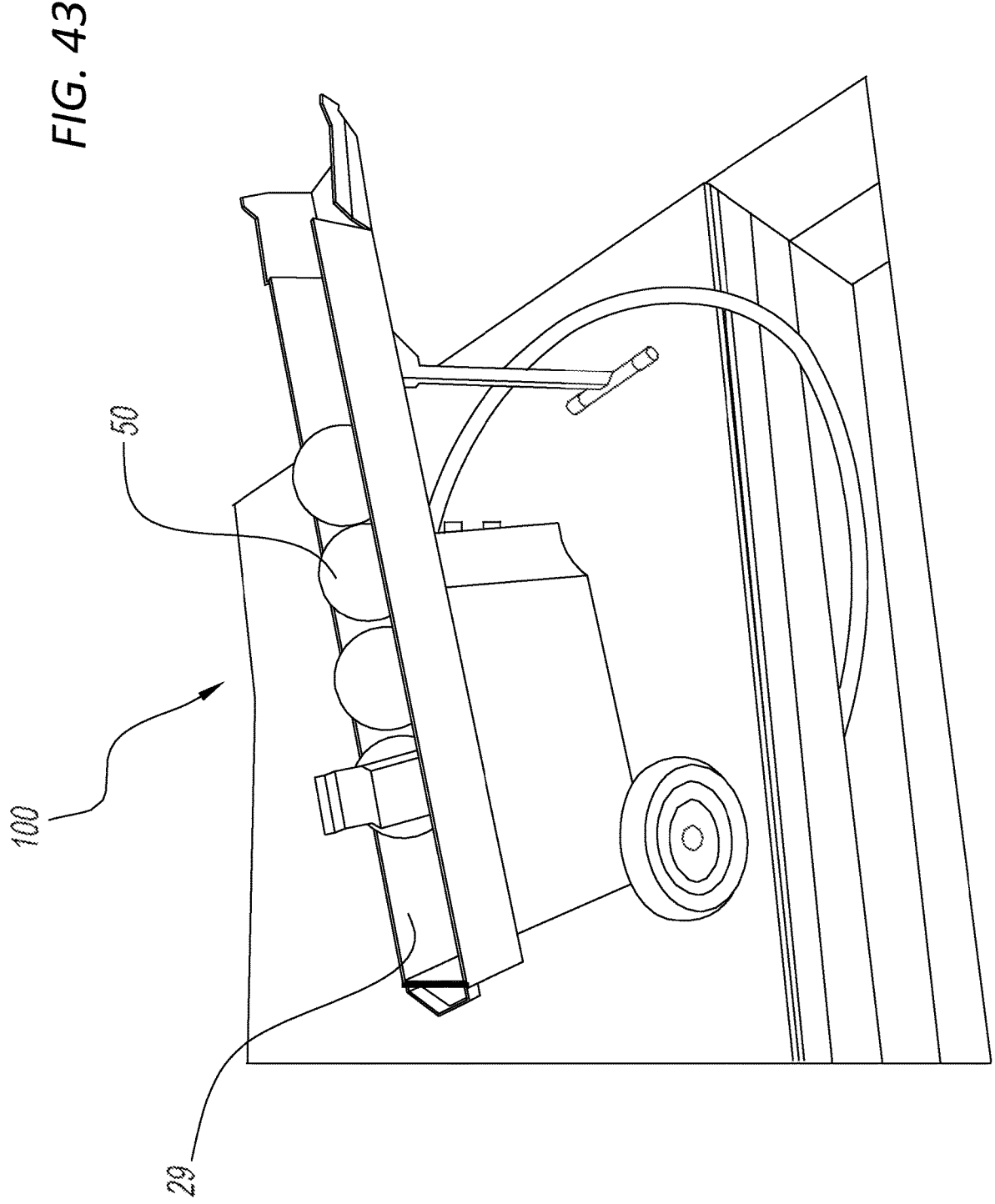
FIG. 43 depicts a close-up, side perspective view of the ground-up, soft toss pitching machine.

As shown in FIGS. 13B-15 and 32-36, the vertical or soft toss pitching machine 100 has an opening 106 through which the ball 50 passes. In the present invention, the soft toss pitch machine is located in an enclosure 70 (FIGS. 37 and 42) below the surface of the field or ground, which provides the pitch machine with protection from hit pitches and bats that may come loose from players' grips. This feature enables the soft toss pitch machine to be placed in front of home plate 25 and the hitter, which is not an available option with competing devices and systems. In additional embodiments, the soft toss pitch machine may be disposed within a ground-level or just-above-ground-level enclosure 70 inside of a pitching mound, which also provides protection necessary when placing the soft toss pitch machine in front of the batting box. Alternatively, the home plate 25 may further be configured to house the mouth of the soft toss pitching machine that delivers the vertically pitched ball. In addition, players who wish to do so may have the pitching mechanism replaced with a batting tee.

Figure 27A:
FIG. 27A depicts a player wearing a helmet with an augmented reality visor and 27B and 27C depict close-up views of a helmet with an augmented reality visor.
Figure 27B:
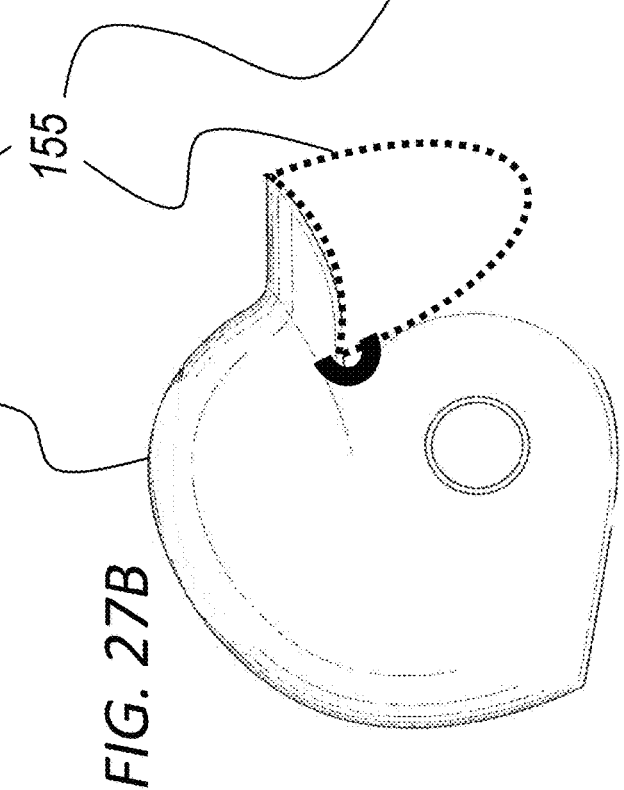
Figure 27C:
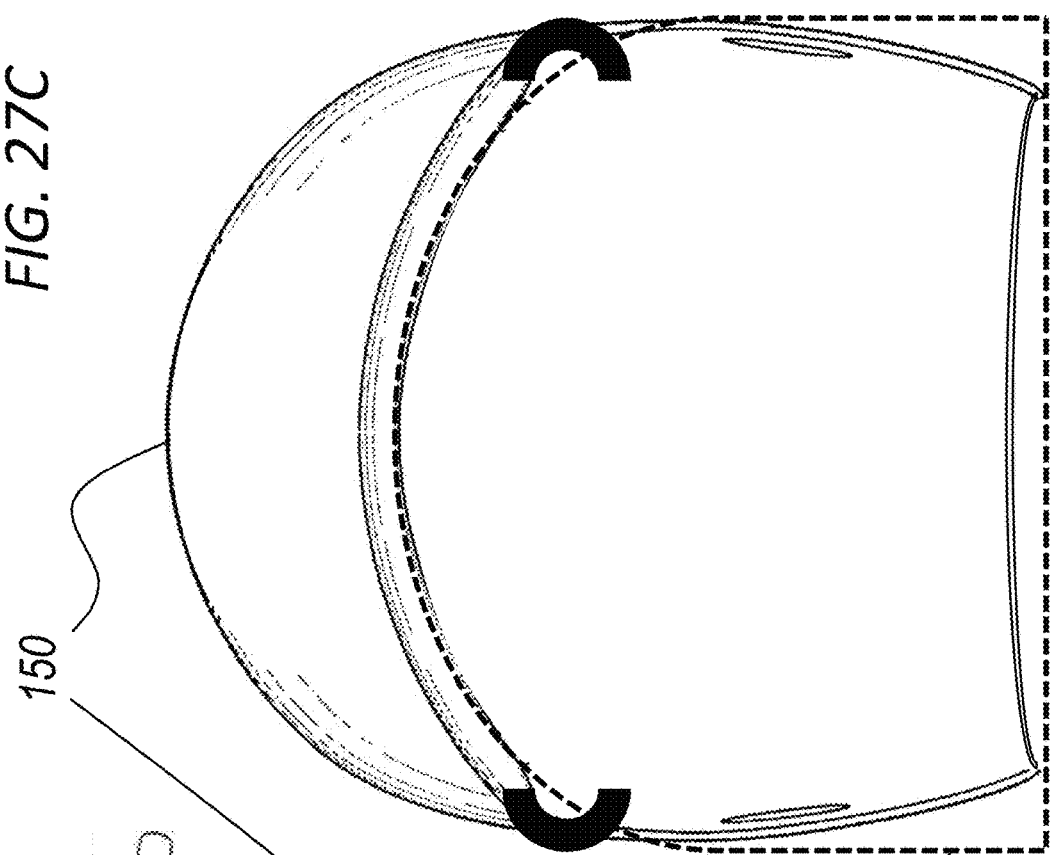
Figure 29:
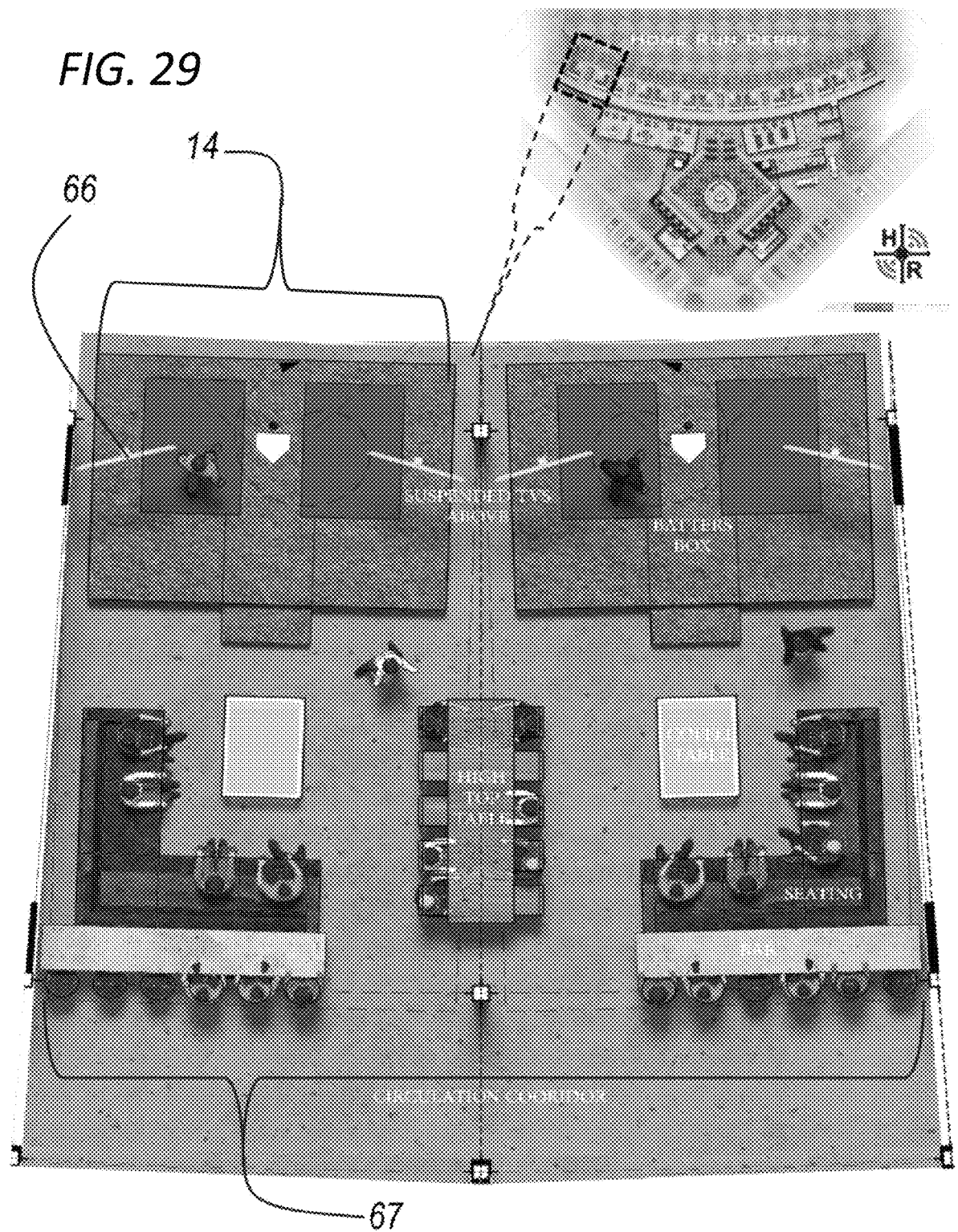
FIG. 29 depicts a close-up, top-down layout view of a batting bay and spectator lounge area.
Figure 30:
FIG. 30 depicts a close-up, perspective view of a player bay spectator lounge area.

Advantageously, employing a vertical or soft toss pitch machine means that no helmets or backstop or batting cage or netting is required for the safety of the participants in the batting bay 14. However, a helmet or backstop or batting cage may be used as a precaution and/or for aesthetics. Alternatively, as shown in FIGS. 27A-27C, helmets 150 may be used as a platform to provide an augmented reality visor 155. Further, the vertical soft toss pitch machine 100 also lowers the risk and consequences of injury to players 33 (FIG. 6A) of being hit by a pitch.

And, a ground-up vertical or soft toss pitch may be less intimidating to individuals who are new to the sport and the speed, height, angle and spin of the pitch delivered by the vertical or soft toss pitching machine may be adjusted to accommodate players of different heights and skill-levels. In addition, a batting tee may be substituted in place of the batter's plate 25. In embodiments where the batter's plate 25 comprises the mouth of the vertical soft toss pitching machine 100, it may be configured to receive a section of vertical post 24 (FIGS. 6A, 23 and 24) to convert the pitching machine into a conventional batting tee for players 33 who lack the skill to hit a moving ball or simply desire to have the batting tee option.

In addition, the pitching machine may further include, but is not limited or required to include, a tray or other receptacle for holding multiple balls. Further, in a preferred embodiment the pitching machine may also include, a pitch trigger mechanism (not displayed in the FIGs) to activate pitched ball release, allowing the user to exercise greater control over the precise timing of pitch release and control over the frequency of pitches.

The pitch trigger mechanism empowers a player 33 to determine manually when pitching commences and at what time each individual pitch is made. Activating the trigger may commence a sequence of pitches delivered at set time intervals (e.g., every 5 or 10 seconds) or it may deliver a single pitch on command. In addition, pressure or weight sensors implemented within the floor or ground of the batter's box may be employed as safety sensors, disabling the pitching machine when there is no weight registered by the pressure sensors.

Furthermore, the pitch trigger mechanism may include one or more of a foot pedal mechanism, a trigger mechanism or motion sensor embedded within the player's bat, a player motion tracking device (such as a Fitbit® or an Apple® Watch), tracking mechanisms such as RFID, radar, infrared, optical, high-speed or other types of cameras or motion sensors, or even an application operating on a smart device. For motion sensor triggers, players may set or select specific bat or arm motions to serve as a trigger of the delivery of individual pitches on command, e.g., a wave of the bat or the hand.

For embodiments employing a foot pedal pitch trigger mechanism, the foot may also be configured to flip up, switching off the ground-up pitching machine, and providing a mechanism of attachment for the batting tee post 24. For batting tee play, users may manually load a ball onto the batting tee from the available tray of balls.

Moreover, a pitch application (FIGS. 11A and 11B) may be configured to enable players 33 (e.g., the batter or opposing team members) to use the kiosk 26 graphical user interface or a connected smart device 60 to trigger delivery of individual pitches on command and to select specific placement for pitches delivered to a player at bat (FIGS. 11A-13B).

During gameplay, players 33 hit pitched balls from the batting bays 14 (FIGS. 1 and 3-5) into the playing field 15 (FIGS. 1-5), and balls may be pitched to the players using the vertical or soft toss pitching machine 100. Further, a batter's plate 25 may be disposed within the batting bay 14, and the batter's plate 25 may furthermore be configured to house the pitching machine 100 (FIGS. 13B-15 and 32-36) and to deliver vertically pitched balls of different weights and sizes or multiple ball launchpads 110 (FIG. 19) integrated within the pitching machine 100.

Figure 12:
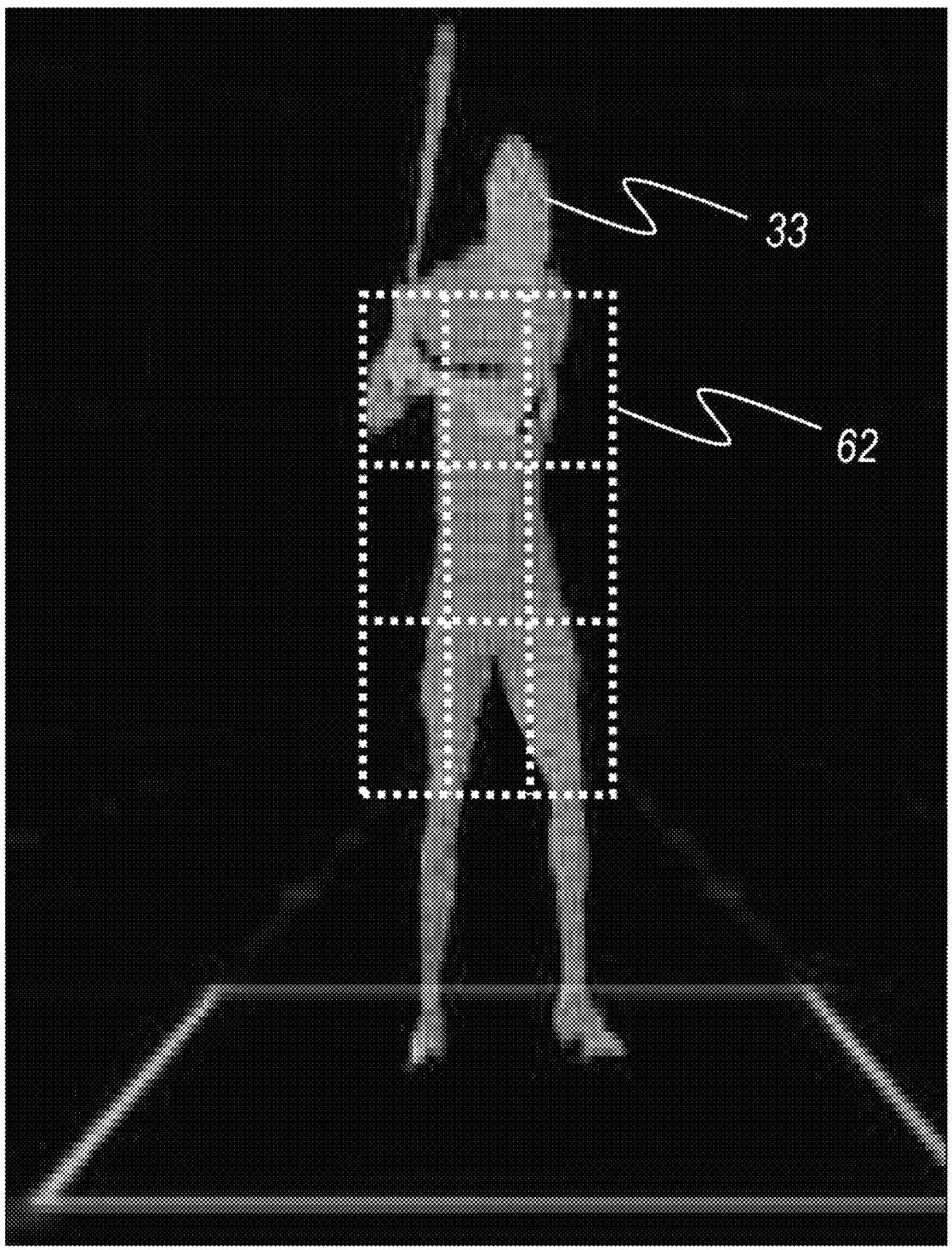
FIG. 12 depicts a strike zone determined based on player height, size and posture (e.g., using Doppler radar, cameras and other sensors).
Figure 13B:
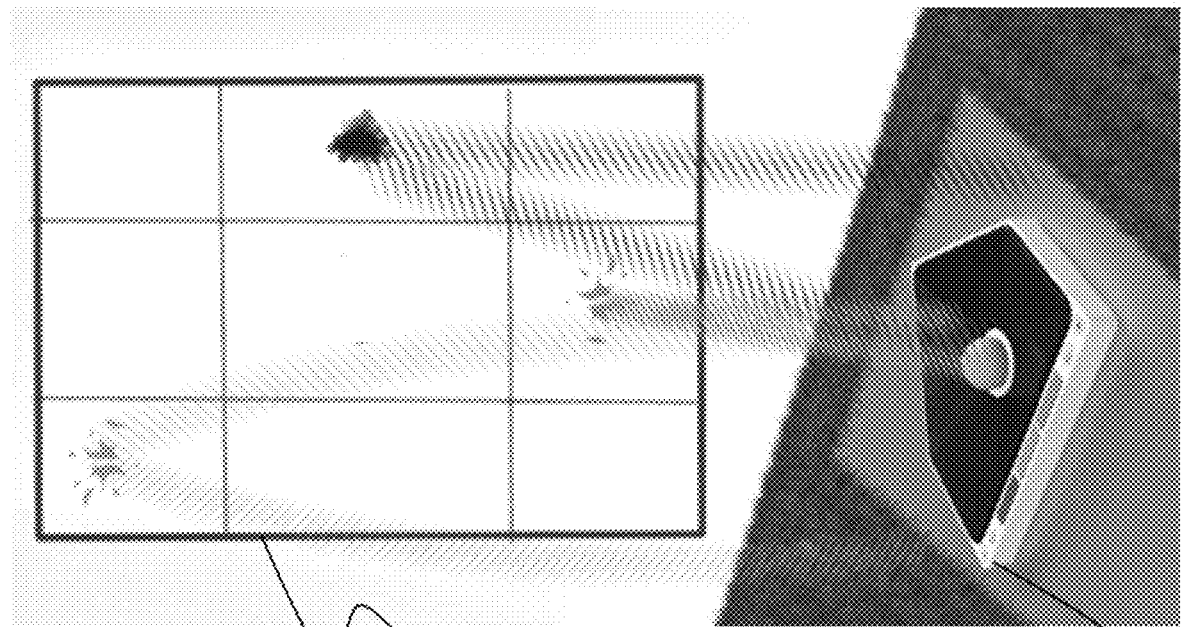
FIGS. 13A and 13B depict a strike zone determined based on player height, size and posture (e.g., using Doppler radar, cameras and other sensors)
Figure 13A:
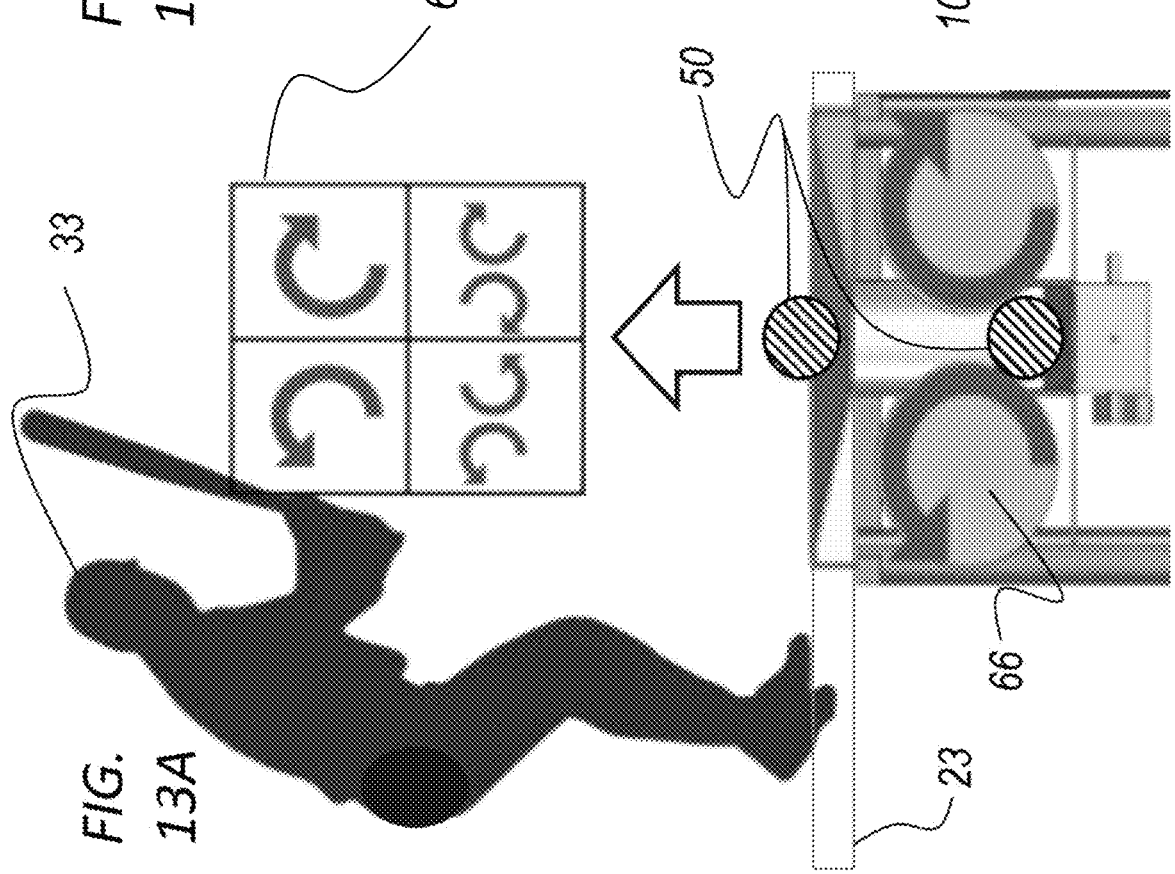
Figure 14C:
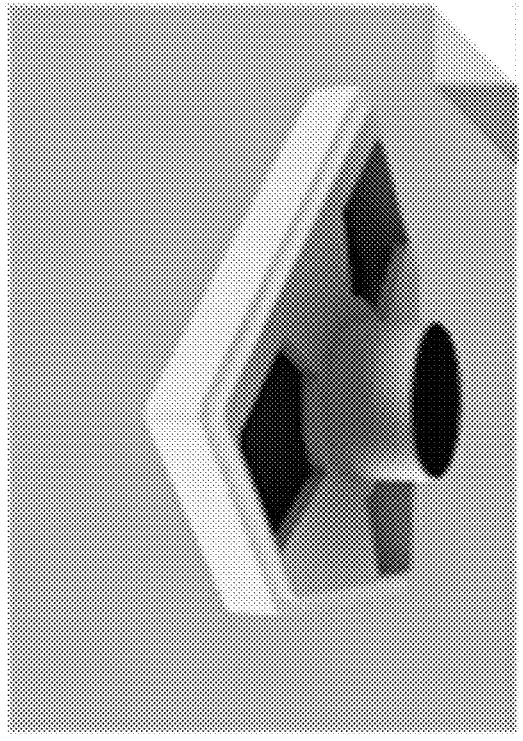
FIGS. 14A-14D depict various views of a vertical or "soft toss" pitching machine integrated within a home plate-shaped delivery mechanism.
Figure 14D:
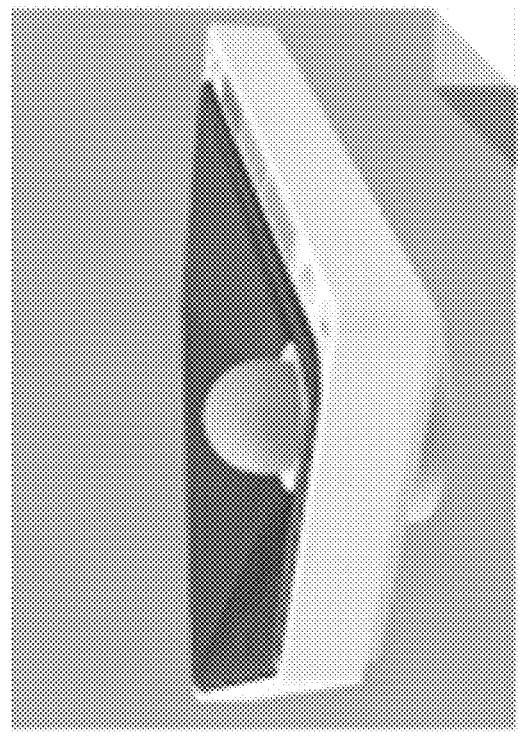
Figure 14A:
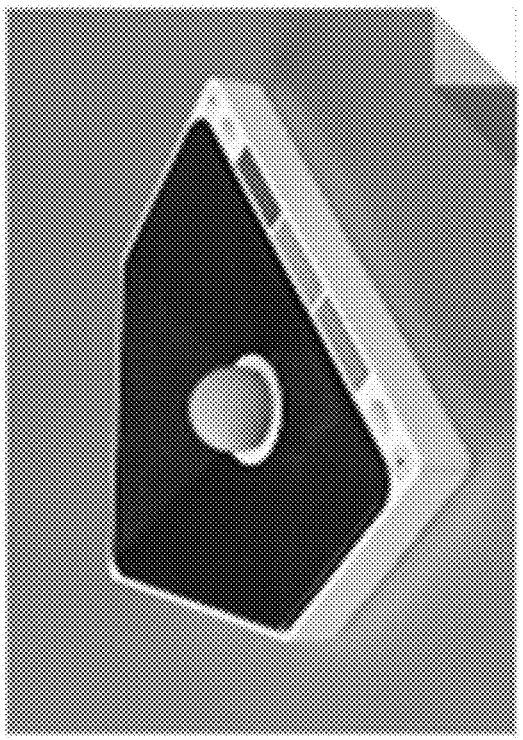
Figure 14B:
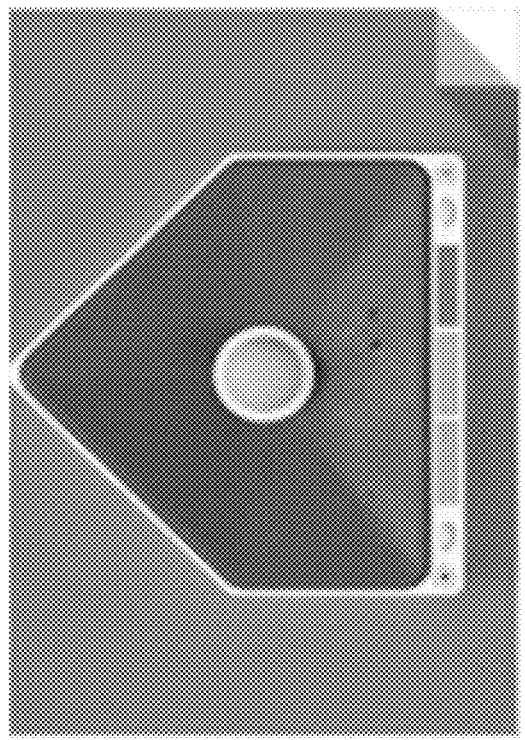

During gameplay, the "soft toss" vertically pitched ball may be selected and placed to always be a "strike" pitch, which would mean that players must swing at every pitch or receive a strike towards a potential out. As shown in FIGS. 12, 13A and 13B, the pitching mechanism may alternatively be configured to alter the pitching speed, height or angle to place the ball into specific quadrants or sectors of the strike zone 62 or to place the ball outside of the strike zone altogether.

Further, a pivoting piston mechanism 75 (FIGS. 21 and 22) placed beneath the ball in the vertical "ground-up" pitching machine may be employed to control ball velocity and angle, as well as strike-zone quadrant or sector at pitch apex. Furthermore, as shown in FIG. 13A, rotating wheels 66 may propel the pitched ball. Differential rates of rotation between the rotating wheels may be used to control pitch velocity, angle, trajectory and apex, as well as to confer directional spin onto the pitched ball so as to effectuate a curve-ball type trajectory.

In certain embodiments, players 33 may hit the ball or puck into a screen 30 depicting or displaying a sports field. In other embodiments, players may hit the ball or puck into a sports field 15, which may be an indoor, outdoor or a hybrid field, a combination of both indoor and outdoor fields, meaning the field is partially enclosed. The ideal field design allows players to see the full trajectory of the puck or ball hit, kicked, tossed or thrown by them (unlike traditional batting cages which are enclosed in nets).

In practice, tracking systems in open outdoor fields may be limited by uncooperative weather. Therefore, an ideal embodiment of the present invention includes a pressure sensitive screen depicting or displaying an image of a sports field deployable in front of the hitting bays. The pressure sensitive "hitting" screen may be disposed on the back side of a "garage door" mechanism configured to deploy in front of the hitting bays to keep out inclement weather.

In embodiments including a pressure sensitive hitting screen a central computer is configured to detect the speed, angle of impact, trajectory, force of impact, momentum and spin and to use these parameters to calculate a full trajectory and landing place of a hit or thrown ball or other piece of sport equipment. In addition, the central computer is configured to place and operate digital or virtual targets within a virtual playing field and also to use calculations of hit ball trajectories and landing places to determine whether or not a player has scored a target hit. This function is also useful in versions of the invention implemented via augmented reality as such digital or virtual targets can be depicted within an augmented reality or virtual reality platform.

Further, the field may be specifically designed to facilitate collection and return of hit balls to a central location so that players or field staff do not waste time and effort to chase and recover balls in the field. Balls may be stored in a central repository or ball collection reservoir (not pictured) where they are sorted and identified according to features such as size, color, weight, or material.

In accordance with the present invention, the sports facility may include a number of hitting bays or batting bays 14, ideally between ten (10) and forty (40) bays per level and between one (1) and four (4) levels. In a preferred embodiment, the invention includes two levels and twenty (20) batting bays per level. Each player bay 14 may be configured to accommodate multiple players and teams of players. According to another aspect of the present invention, a scoring board may be displayed on a screen 66 within each individual player bay 14 or virtually in an augmented reality display 155. Team Score and next player, as well as game and player progress may be displayed during multi-player scenarios.

In accordance with another aspect of the present invention, a graphical user interface may be provided, either via the touchscreen kiosk 26 located in the player bay 14 or via a mobile app operating on a user's personal device 60, to enable the players to login and establish their identity, update player profile information, and purchase time in the player bay as well as memorabilia and concessions.

Player profile may include statistics from previous rounds including number of rounds played, average score per round, top score, team scores, average swing speed and distance travelled, among other statistics related to gameplay and preferred or non-preferred pitch location. Skill level may be assigned to a player profile based on past performance, including without limitation "rookie", "amateur", "minor", "double a", "major leaguer" and "all-star". Further, player rank within a ranking system may be displayed for players who elect to be ranked by territory. These rankings could be by city, state, or country and could be overall, by team or by individual game.

As shown in FIG. 6B, in a preferred embodiment a graphical user interface is provided on the touchscreen kiosk 26, which may be located adjacent to the batting area or on a personal device 60. A membership card reader and credit card reader may be included on each touchscreen kiosk, allowing players to login to their player bay 14, update their player profile information, purchase food and beverages, and purchase additional time at the player bay.

The playing field 15 extends forward out from the player bays of the sports facility 20 and also laterally, beyond either end of the sports facility 20. In a preferred embodiment, the playing field is two-hundred-fifty feet (250 ft.) long (from the edge of the player bays) and three-hundred-sixty feet (360 ft.) wide, allowing for twenty (20) player bays, each fourteen feet (14 ft.) wide, per level, and an additional forty feet (40 ft.) of open field on either side of the player bay structure.

The ground or the pitch of the playing field may include demarcated field tracts 10 and field zones 11, each of increasingly greater distance from the player hitting bays or batting bays, and a number of targets 18 within the zones. Tracts, zones and targets 18 may be displayed within an augmented reality display 155, or alternatively projected, painted or printed onto the sports field 15. Further, displayed, projected, printed or painted lines may be provided to demarcate the zones 11, tracts 10 and targets 18. In addition, there may be tracts 10, zones 11, targets 18, or other demarcations in or on the ground of the sports field 15 that may either trigger reward or penalty to the player for having the projectile land in that specific location, depending on the specific game.

Figure 4:
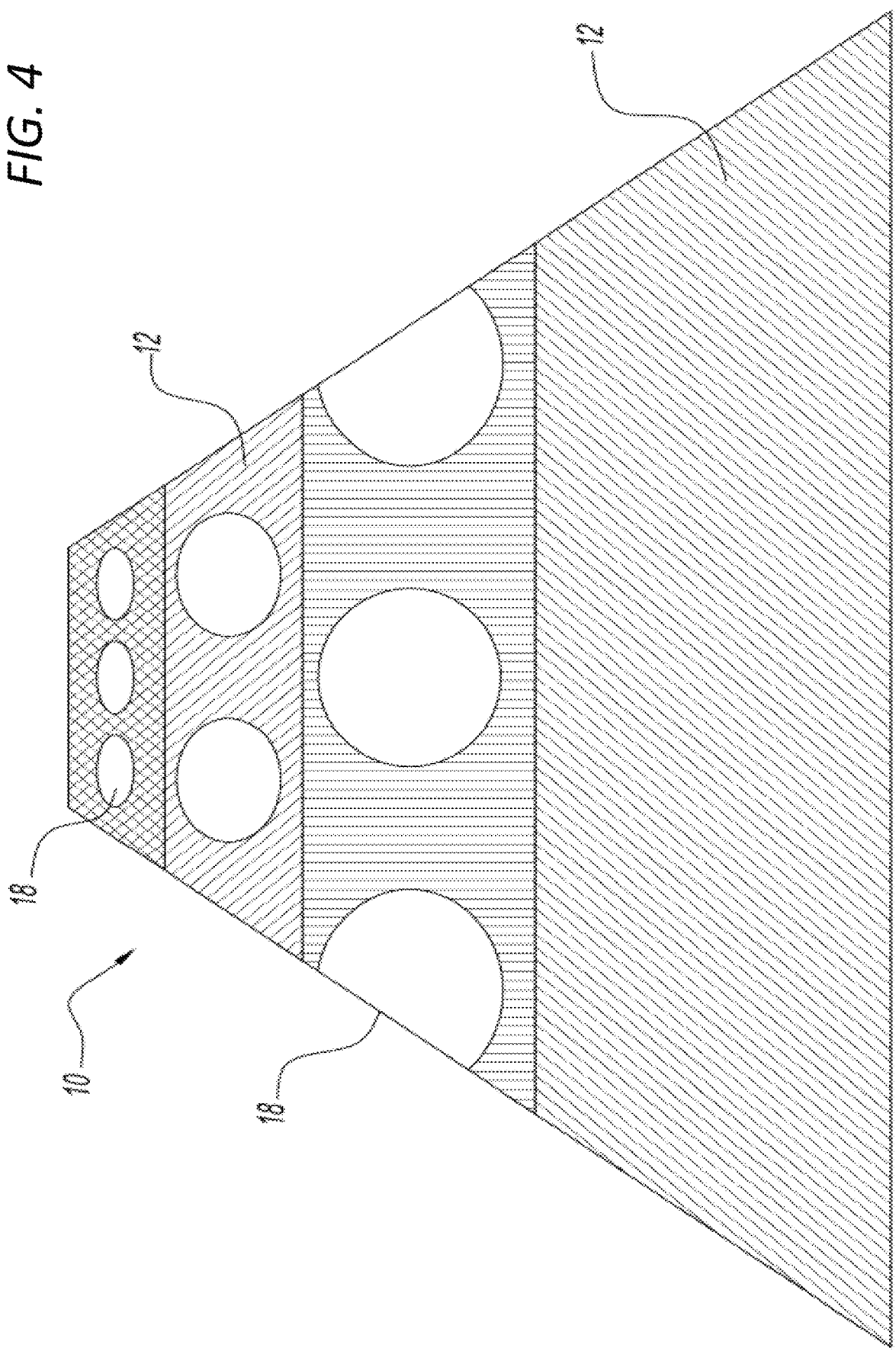
FIG. 4 depicts examples of target zones that may be placed or projected onto the modular segments of the sports field.
Figure 9:
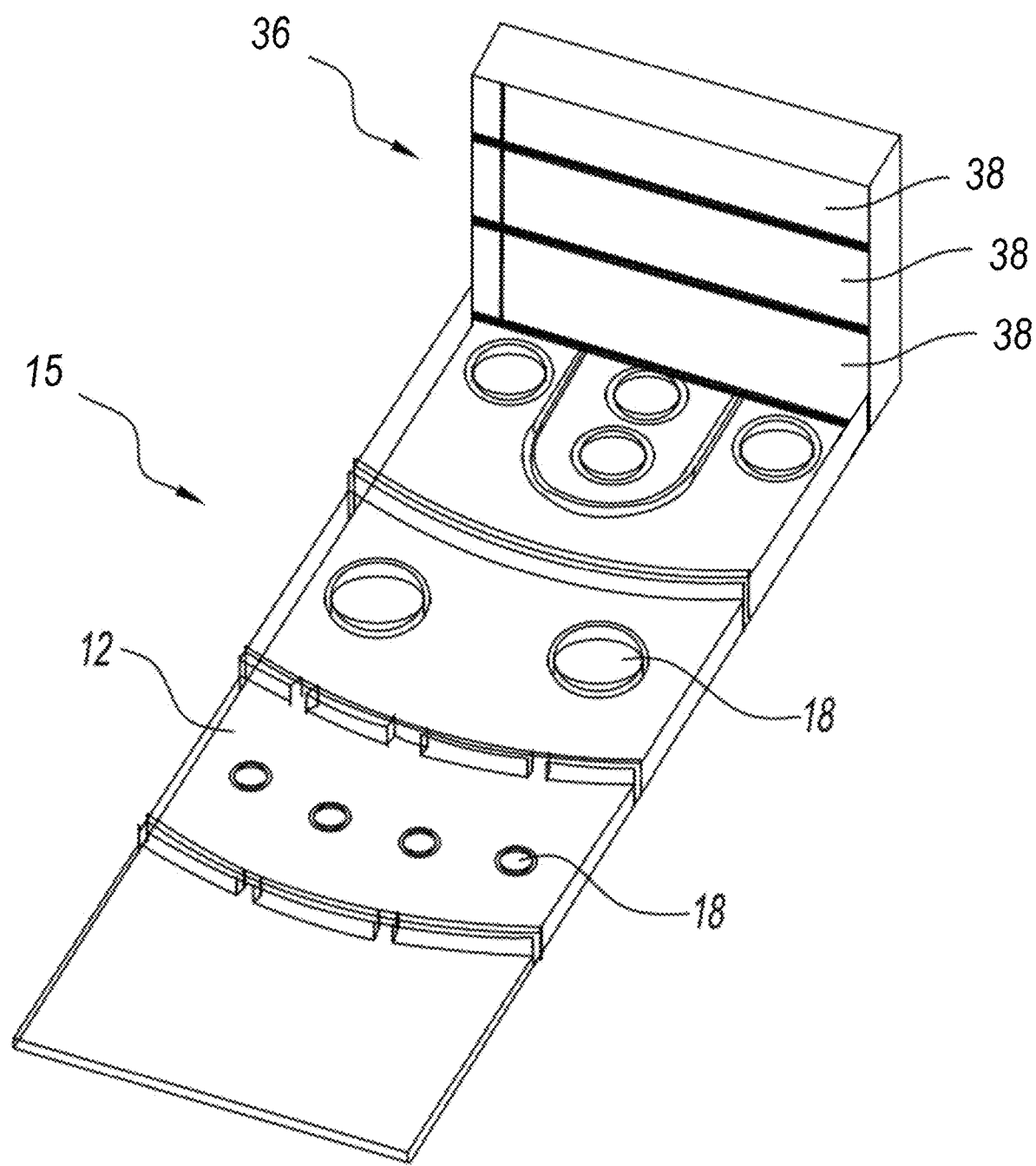
FIG. 9 depicts a section of sports field with targets placed, projected onto or displayed over the modular sports field segments.

As shown in FIGS. 4, 5 and 9, in one embodiment, the field may be divided into five distance-based zones 11, separated by in-ground nets and/or channels that may run the entire width of the field. Targets 18 may include but are not limited to ground targets (typically increasing in point value and height as they move further from the player bay) aerial targets 22, stationary, portable/moveable or mobile/moving targets 21 (FIG. 5). Further, the sports field may comprise a number of modular sports field segments 12, and the demarcated tracts, zones and targets may be integrated within the modular sports field segments.

Moreover, targets may be implemented as virtual or digital targets within an augmented reality display system 155 and in such case a central computer would use data regarding speed, momentum, angle, trajectory and spin to calculate a full trajectory and determine whether a target hit has been scored. Targets may be used to award or subtract points depending on the rules of the particular game.

As shown in FIGS. 4 & 5, individual field segments 12, tracts 10 and zones 11 can have one or more targets 18 included therein, or may even include portions or fractions of targets, which may create full targets when multiple segments having partial targets are linked together. As shown in FIG. 3, multiple tracts 10 or rows of field segments can be integrated to form a large sports field area 15. FIG. 3 also depicts a warning track 19, which may have a different color, texture and/or pattern demarcating that zone. In an ideal embodiment, the warning track may be sand or have a sand color and/or texture.

In an ideal embodiment, the playing field tracts 10, zones 11 and targets 18 may be implemented as reconfigurable demarcations of the particular markings required by the specific game being played by display on one or more screens employed as a field surface or by using a projector or an array of projectors to illuminate the field 15. Alternatively, the reconfigurable playing field demarcations can be implemented via augmented reality, whereby the players wear display devices that project a virtual layover depicting playing field demarcations and any targets required for the particular game being played.

The playing field may include tracts 10, zones 11 and targets 18 on the ground, as well as zones 38 on a back wall 36 (FIG. 9) or fences, ramps, and surfaces of different textures and different coefficients of friction (sand, grass, gravel, brick) to alter the speed and trajectory of a ball. FIG. 9 also shows sections of the sports field at different heights and which may include ramps or obstacles, and a wall with segments, all of which may represent different point values.

And further, the field may include a back fence, rising to a specified maximum height, and also a back wall extending up to a greater maximum height. In a preferred embodiment, the playing field may include nets on either side and along a back fence, rising to a minimum height of 90 ft (the height of foul ball poles in Major League Baseball stadiums).

Further the back wall may be up to 150 ft tall and also may be sectioned into multiple zones. In one preferred embodiment, the zone and other playing field demarcations may be projected or displayed onto the playing field and onto the back wall. In another preferred embodiment, zone, target and other playing field demarcations may be displayed within an augmented reality system 155. Alternatively, the playing field and back wall zones may be demarcated using painted lines and also may be further subdivided into target areas. In addition, the back wall may be sectioned into four equally sized zones.

Furthermore, a central computer may use mechanisms such as Doppler radar, infrared, optical, high-speed or other type of camera or remote sensing detector 45 (FIGS. 10C and 31), including but not limited to motion sensors, RFID, pressure sensors or smart textiles, or some combination thereof, to determine a player's strike zone 62 (FIGS. 12, 13A and 13B) whether player has made a swing, or an attempt to hit the ball, and whether a ball or strike was committed for a particular pitch, which segments, tracts, zones or targets are struck by a hit ball. Depending on which game is being played, the player may receive specific point values based on which segments, tracts, zones or targets the ball strikes.

Figure 37:
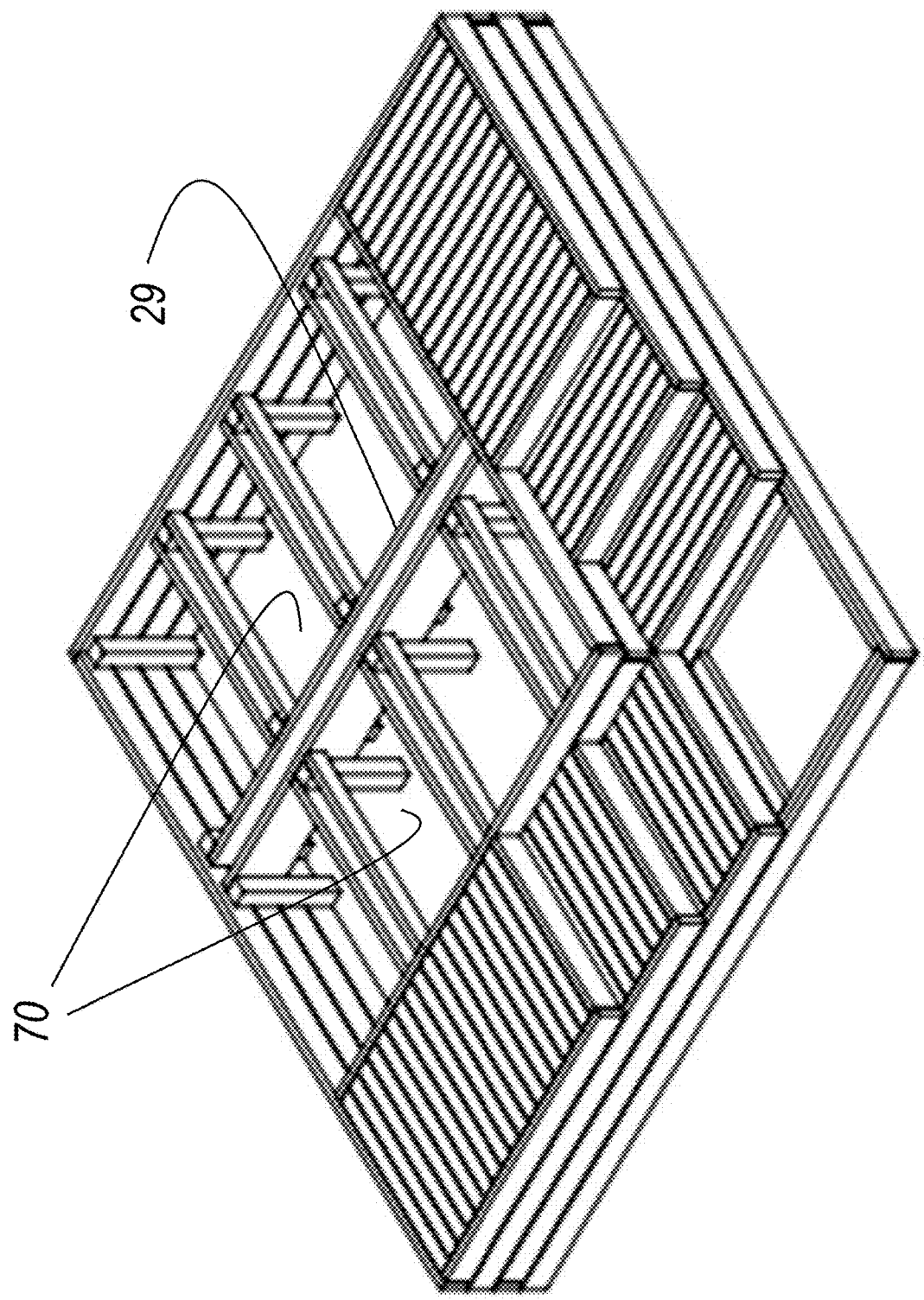
FIG. 37 depicts a view of the internal structure of a player bay, including channels for transport of balls, pucks and other sports equipment.

In accordance with another aspect of the present invention, a hit-ball collection system may include gravity-fed collection traps 27, funnels 28, channels 29 and piping (FIGS. 7, 8 and 32-36), through which the balls are designed to roll due to variations in local pitch or angle of the field. In addition, as shown in FIGS. 32-36, traps 27 and funnels 28 may be included behind the player 33 or behind home plate 25, so that balls or pucks that are not successfully hit are directed into the sports equipment collection, transport and delivery systems. Further, as shown in FIG. 37, channels 29 may be integrated below the surface of the player bay to transport balls, pucks or other types of sports equipment to the sport equipment delivery mechanism, e.g., a pitching machine 100.

In alternative embodiments of the present invention, the balls may be moved through the various components of the collection system by an active mode of transfer or transportation, such as conveyor belts or suction. The ball and sports equipment collection, transport and delivery system may include an integrated sports equipment delivery or feed machine 40 (FIGS. 10A-10C), compatible with sports equipment of various sizes and weights.

Figure 10B:
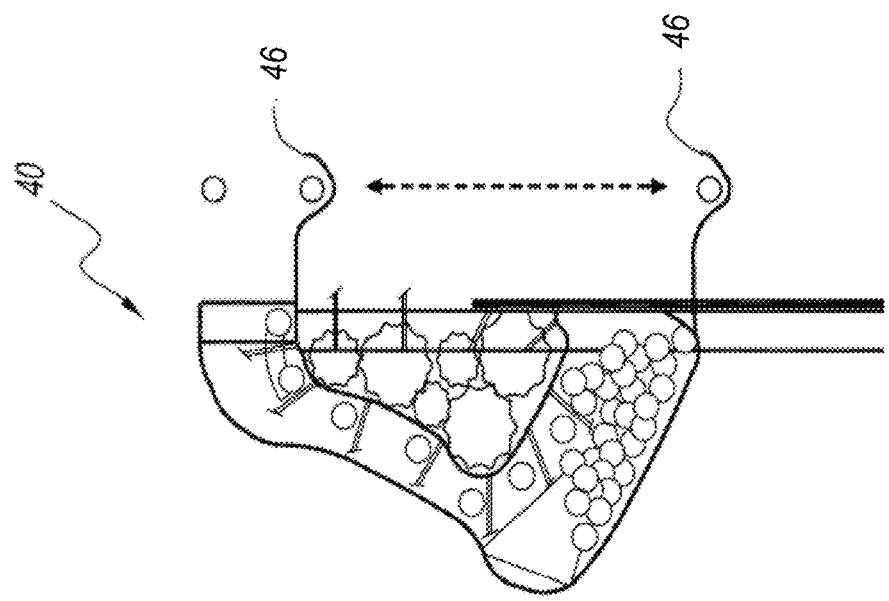
Figure 10A:
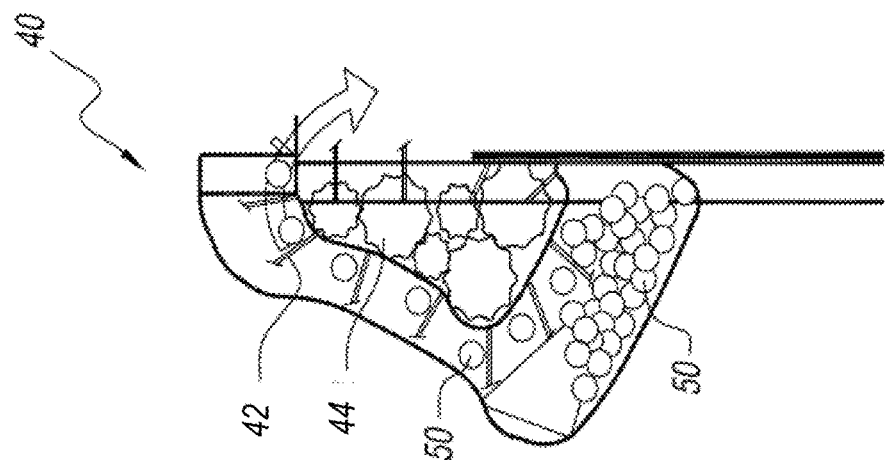

In a preferred embodiment, shown in FIGS. 10A-10C, after collection of the sports equipment, the sports equipment collection, delivery and transport system transports collected balls to a central collected ball reservoir, sorting and identification machine, following which sorted balls are transported via a feeder pipe 47 to the ball delivery machine 40 that delivers the collected balls to the pitching device 100. In certain embodiments, feeder pipe 47 may be connected directly or indirectly to conduit 13 to receive balls from the sports equipment collection and transport systems.

Alternatively, a ball collection method could be implemented using manual ball collection or by employing a remote controlled or an autonomous cart specifically designed to pick up balls 50 of various sizes and weights, for temporary storage in a mobile collection bin and easy transfer to central collection point (collected sports equipment reservoir) and sports equipment delivery machine 40.

The ball delivery machine 40 receives balls 50 from the ball collection reservoir and the sorting and identification machine, and holds the balls in a local ball reservoir, where individual balls are captured from the local reservoir and entrained in a conveyor system by a plurality of conveyor blades 42. A gear system 44 may drive the conveyor and in some embodiments the balls 50 may be fed to drop into a tray or channel 29 which feeds the pitching machine 100.

In other embodiments, the balls 50 might be fed into a moveable ball dispense arm or ball elevator mechanism 46, with a curved cup shaped receptacle for holding the balls 50. The ball dispense arm 46 may feed a ball directly into the vertical or soft toss pitching machine or to a player for manual placement of the ball on a batting tee. The ball elevator mechanism 46 may be lowered at a precise speed to a precise location for feeding the ball 50 into the pitching machine 100. The elevator mechanism can also be raised to make the process of putting a ball on a tee more convenient. Further, the ball dispense arm may be employed to accurately control timing of ball placement on a batting tee or within a pitching machine.

In further embodiments, Doppler radar, infrared, cameras or other sensors devices 45 may be placed in convenient locations, for example such as those shown in FIGS. 10A-10C. These Doppler, infrared, cameras or other sensor devices 45 may be wirelessly connected to the touchscreen kiosk 26 and display mechanism. In addition, a convenient mount and wireless access point 48 may be provided for the touchscreen kiosk 26.

Furthermore, in certain embodiments, as shown in FIG. 10C the ball feeding system may be configured to provide an attachment for a bucket 52 of collected balls, enabling balls to feed directly from the bucket 52 into the ball reservoir. In such embodiments, the balls may be automatically loaded from the bucket 52 or manually loaded into a reservoir access opening 49.

FIGS. 14A-14D depict various perspective views of the ball pitching machine 100 and, as shown in FIGS. 12, 13A and 13B, Doppler radar, infrared, cameras or other sensor devices 45 may be used to determine player strike zones 62 and placement of pitched balls within specific sectors or quadrants of the strike zone. And, as shown in FIGS. 12, 13A and 13B, the pitching machine may then use the player strike zone as determined by the Doppler radar, infrared, cameras or other sensor devices 45 to place a pitch in a precise quadrant or sector of the strike zone 62 and to track the pitched ball to determine if the attempted placement correctly achieved the specific desired quadrant or sector.

Additionally, the Doppler radar, infrared, cameras or other sensor devices 45 and other tracking sensors may be used to determine whether the player has attempted a swing or made a successful hit. A system application program interface converts data points measured by the Doppler radar, infrared, cameras or other sensors and detectors into gameplay scores and sends these scores to the scoreboard interface.

Figure 15:
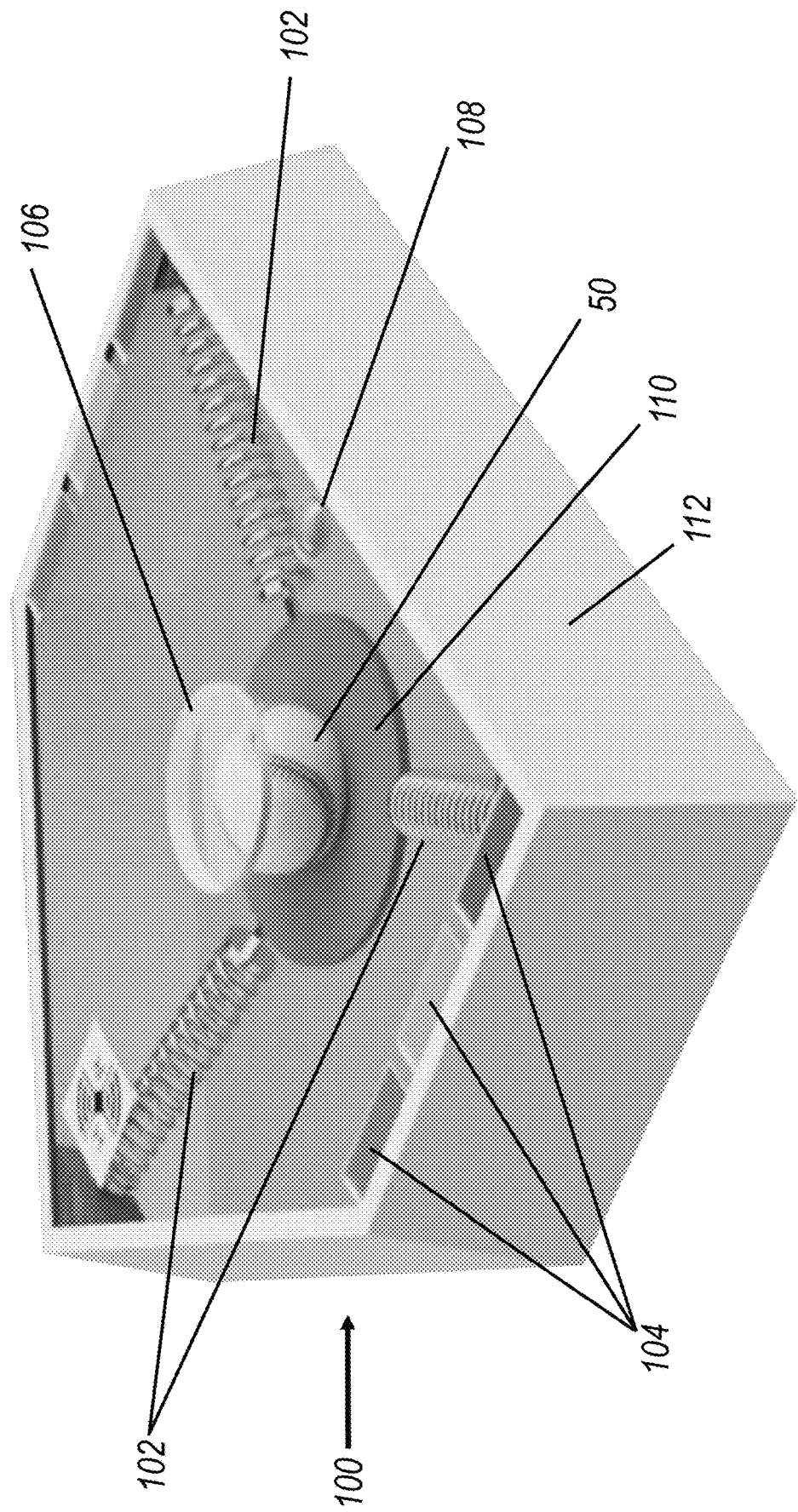
FIG. 15 depicts a vertical or soft toss pitching machine integrated within a home plate-shaped ball delivery mechanism.
Figure 16:
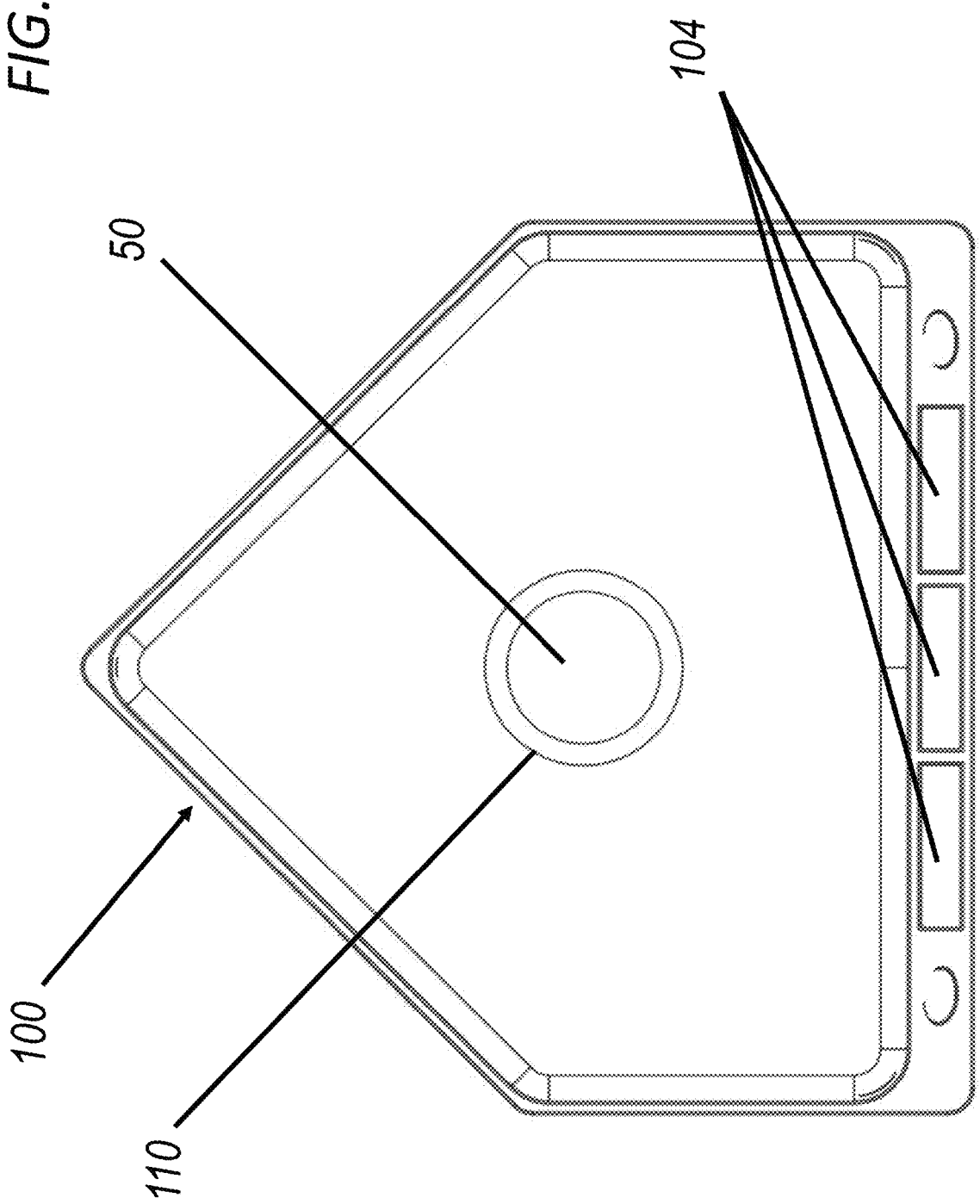
FIG. 16 depicts a top-down view of the vertical or soft toss pitching machine mouth or protective enclosure.

In a preferred embodiment, the soft toss pitch machine system may further comprise one or more sensory indicators, including one or more of lights, sounds and vibrations, configured to indicate one or more of pitch readiness, pitch difficulty, pitch apex location, location or direction of targets and a player's current status. FIG. 15 depicts a vertical or soft toss pitching machine, including a machine housing 112 and various LEDs 104 which can be employed to indicate which of several color coded targets the player should aim for, a players status (e.g., hot or cold), and when a player should expect to receive a pitched ball.

In certain embodiments, the pitching machine includes energy storage and release mechanisms 102 to impart energy to projecting a ball 50 and in some preferred embodiments these energy storage and release mechanisms may comprise springs and/or pistons.

A ball launchpad 110 may be connected to the energy storage and release mechanisms to hold the ball 50 in place and to impart the energy released by the energy storage and release mechanisms to the ball 50. Further, the vertical or soft toss pitching machine may also include a motion sensor 108, so that it may sense when a player has stepped up to bat. In certain embodiments, there may be a cover over the inner mechanism of the vertical or soft toss pitching machine, with an opening 106 through which the pitched ball must pass.

Figure 17:
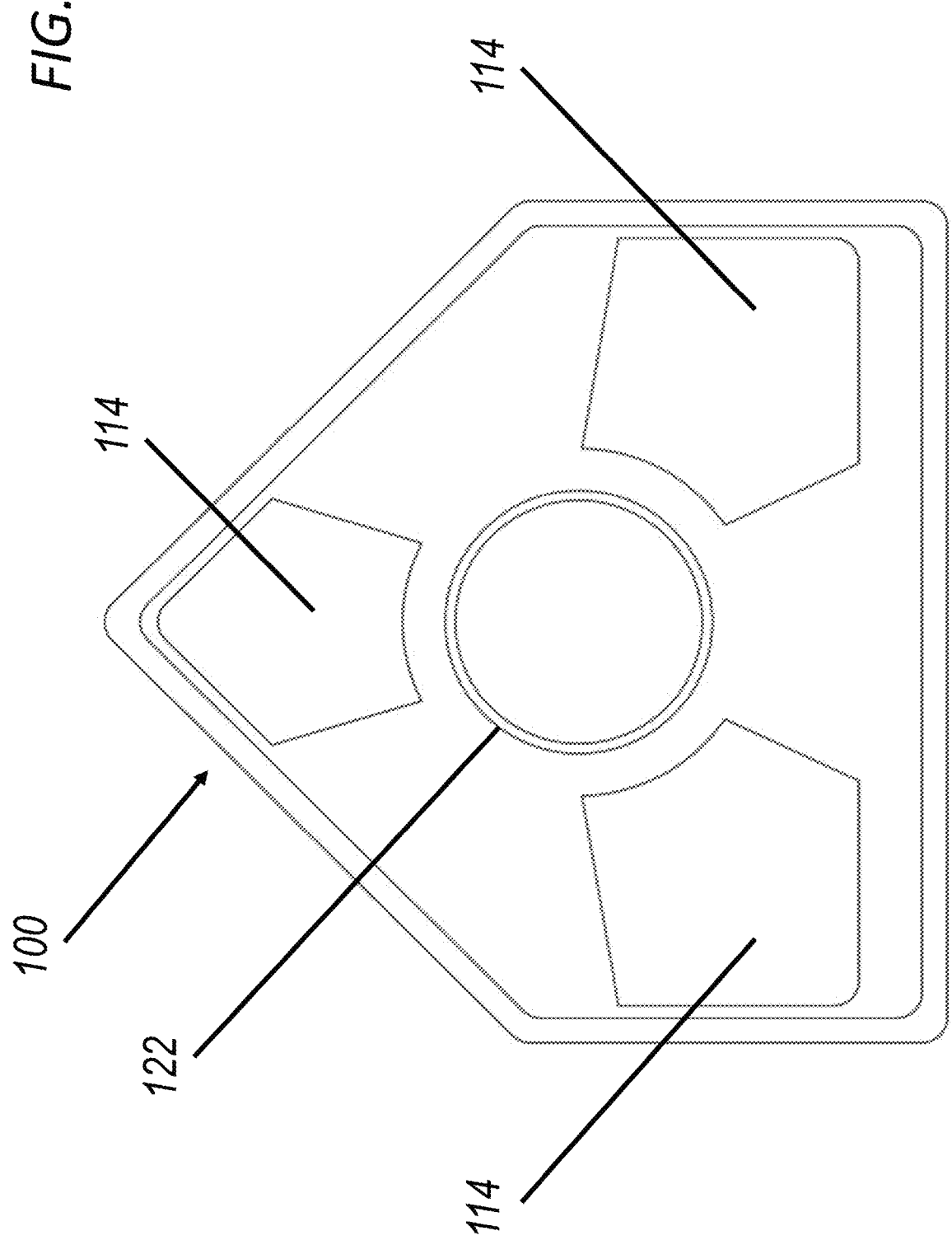
FIG. 17 depicts an underside view of the vertical or soft toss pitching machine protective enclosure.
Figure 18:
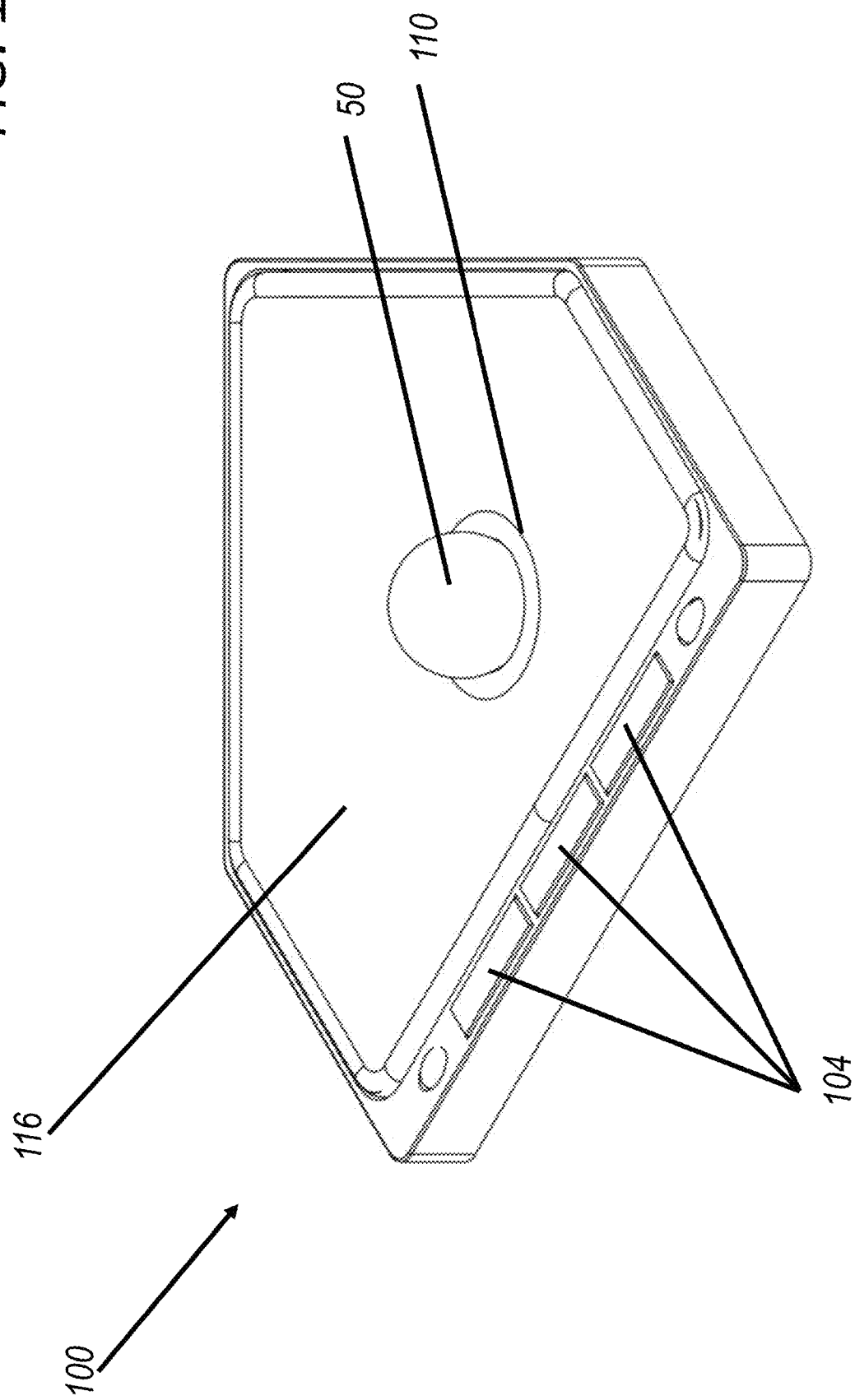
FIG. 18 depicts a perspective view of the vertical or soft toss pitching machine mouth or protective enclosure.

FIG. 17 depicts an underside view of the vertical or soft toss pitching machine, with drainage openings 114 and a hollow cylindrical portion 122 which acts as a housing for one or more pivoting pistons 75 and as a pipe feed connector 122 for receiving balls from the ball delivery machine 40. FIG. 18 shows a top perspective view of the pitching machine, which may also include an elastic rubberized flooring 116 that surrounds the launchpad 110 and covers the energy storage and release mechanisms 102.

Figure 19:
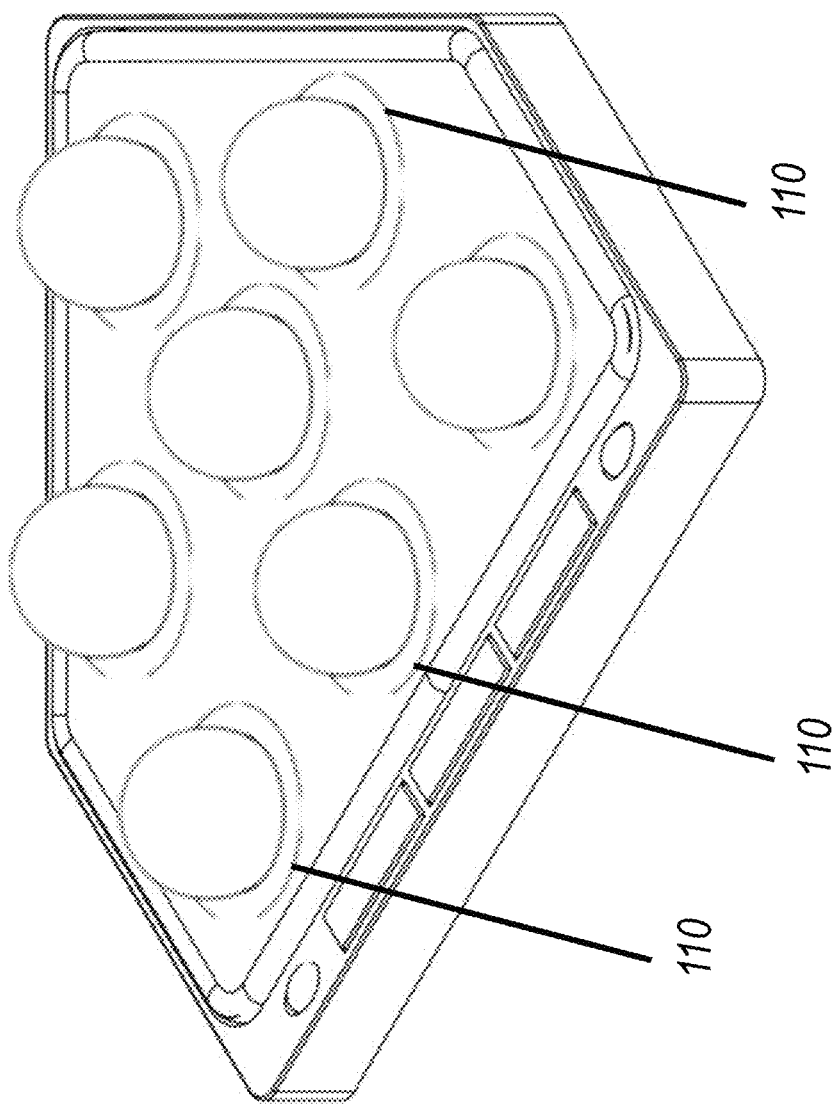
FIG. 19 depicts an embodiment of the vertical or soft toss pitching machine with two or more launchpads for projecting balls into different quadrants or sectors of the strike-zone.
Figure 20:
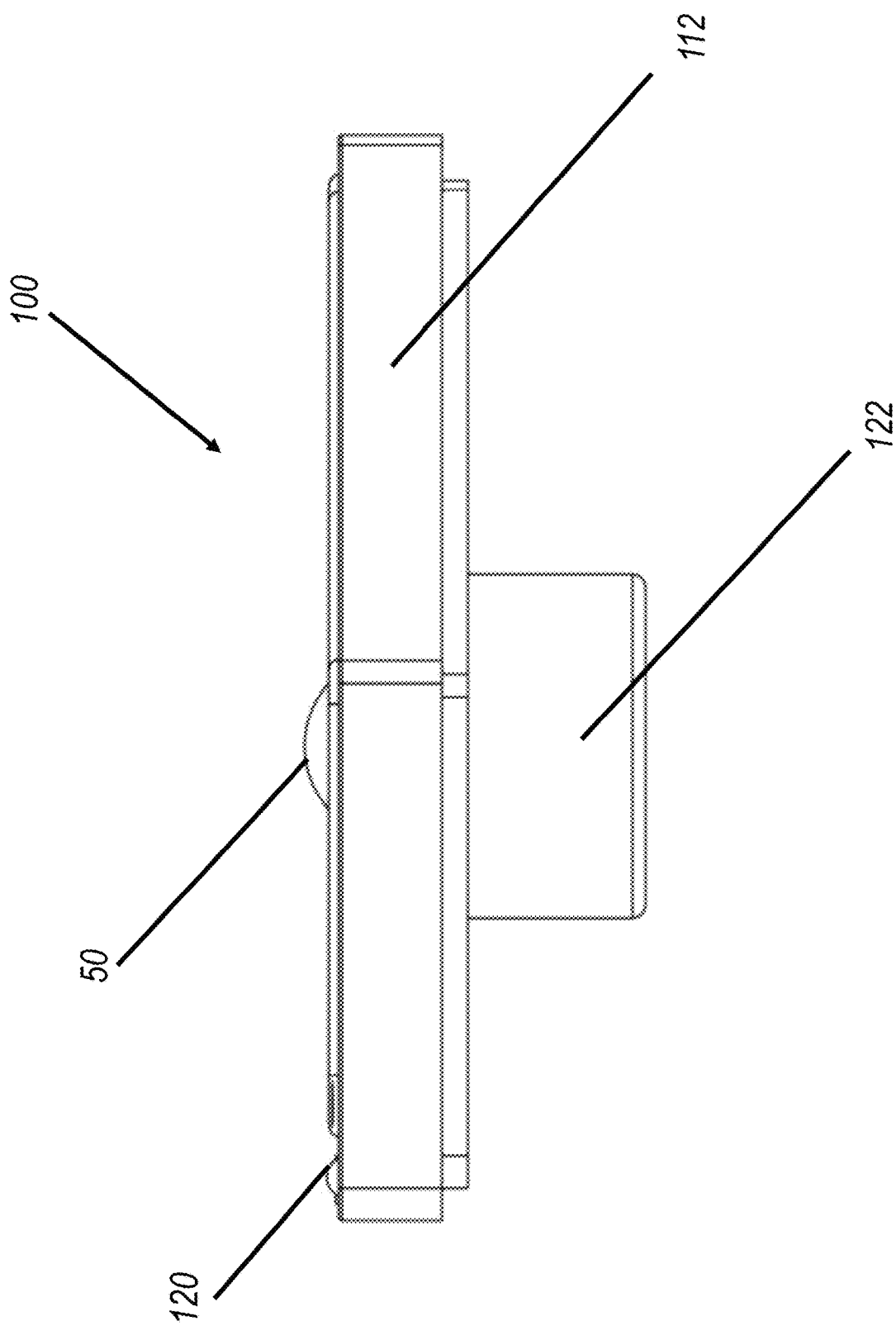
FIG. 20 depicts a side-view of the vertical or soft toss pitching machine.
Figure 21:
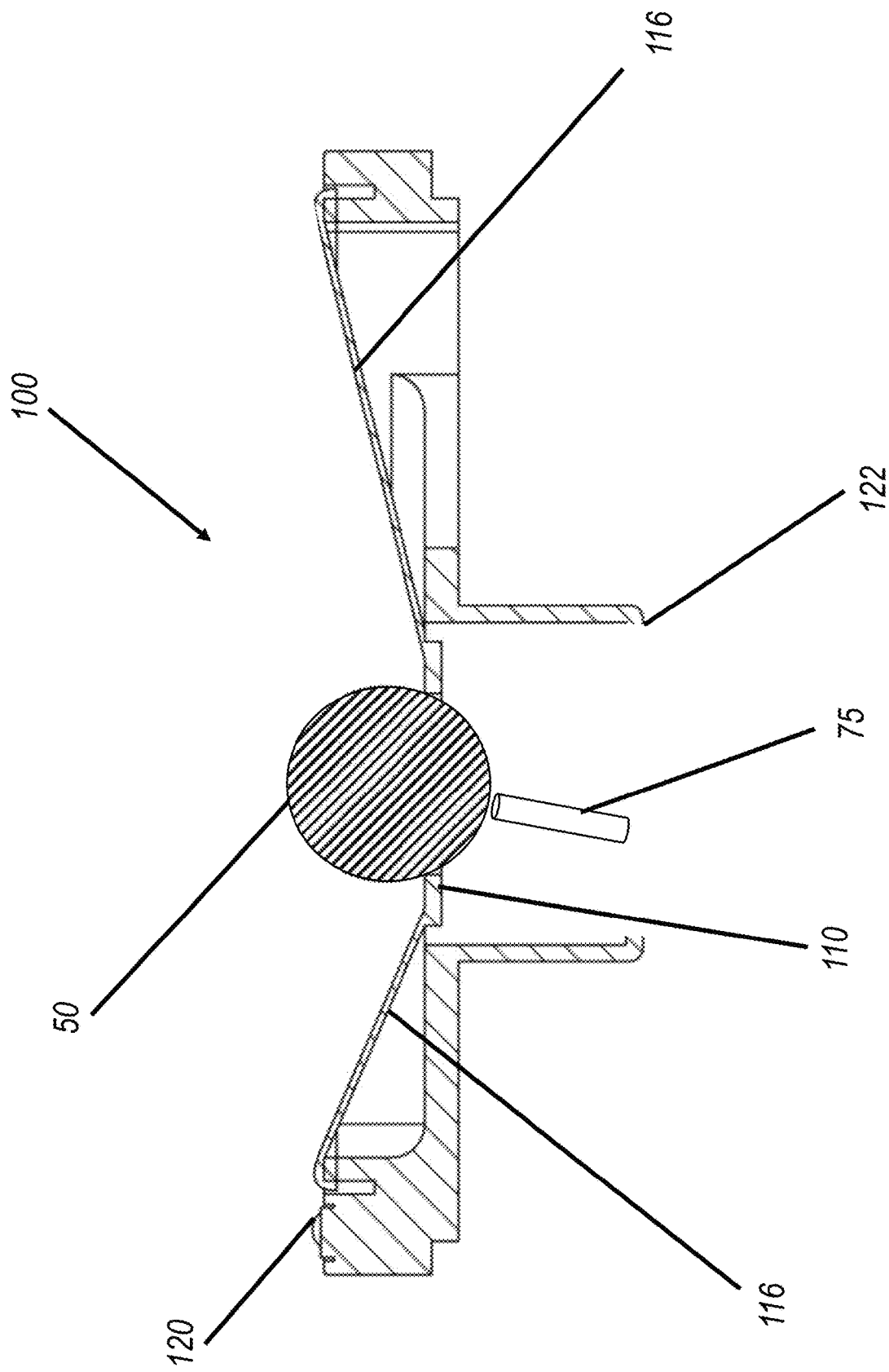
FIG. 21 depicts a side-to-side cross-sectional view of the vertical or soft toss pitching machine.
Figure 22:
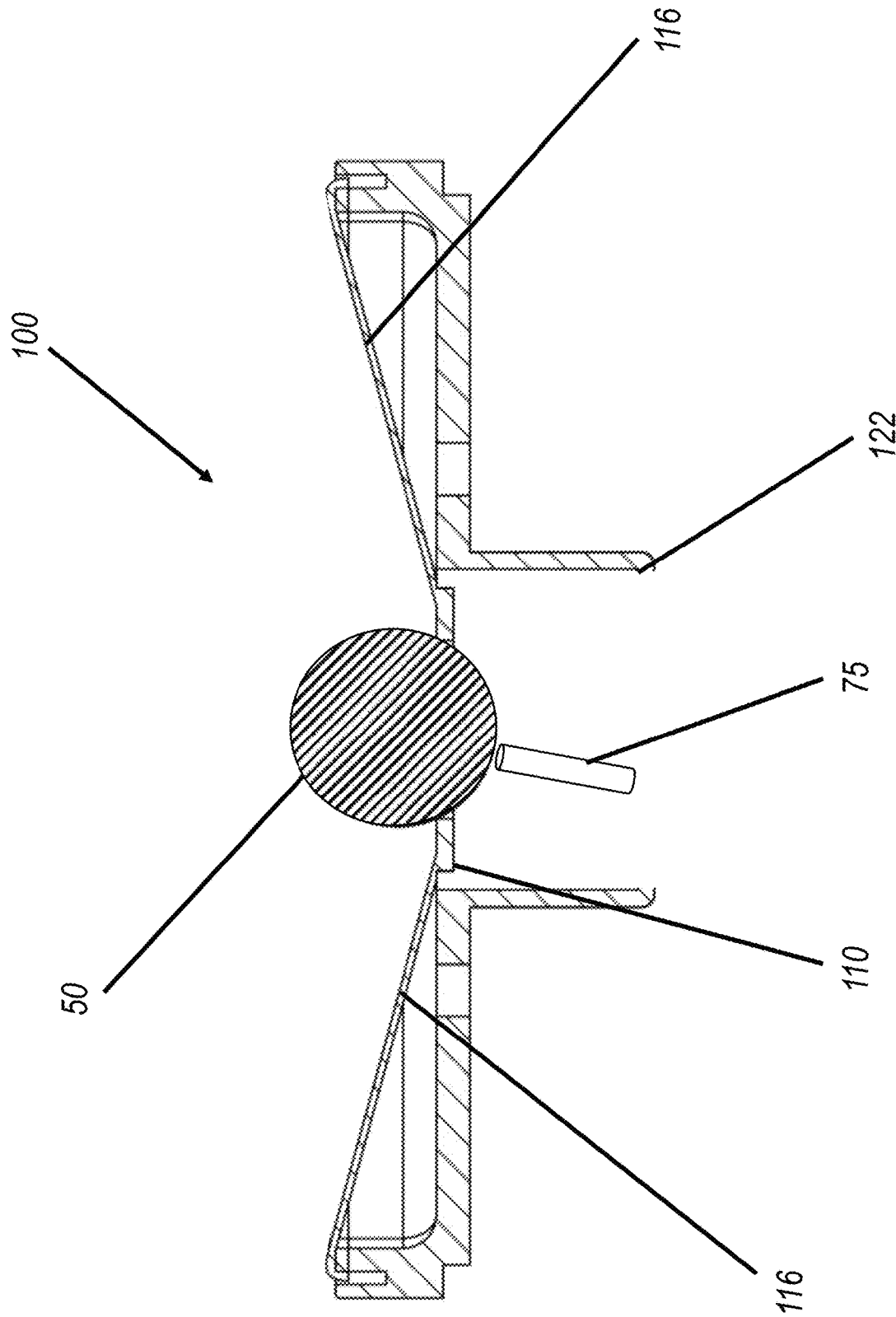
FIG. 22 depicts a front-to-back cross-sectional view of the vertical or soft toss pitching machine.

FIG. 18 depicts a topside perspective view of the pitching machine. FIG. 19 depicts an embodiment of the vertical or soft toss pitching machine with two or more launchpads for projecting balls into different quadrants or sectors of the strike-zone. FIG. 20 depicts a side view of the pitching machine. FIGS. 21 and 22 depict cross-sectional views of the vertical or soft toss pitching machine, side-to-side and front-to-back, respectively.

Figure 23:
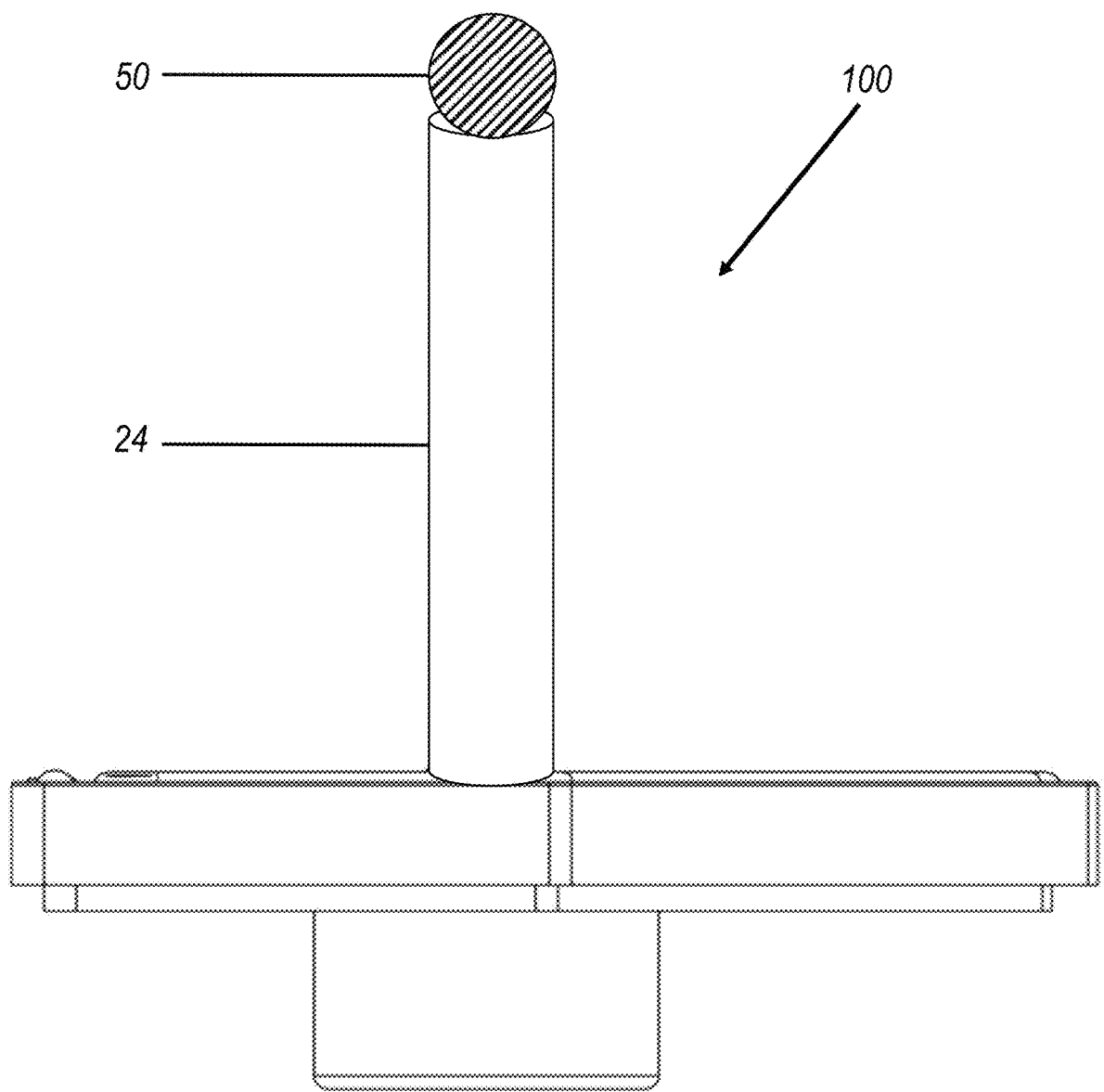
FIG. 23 depicts a side-view of the vertical or soft toss pitching machine with a conversion post inserted to transform the pitching machine into a batting tee.
Figure 24:
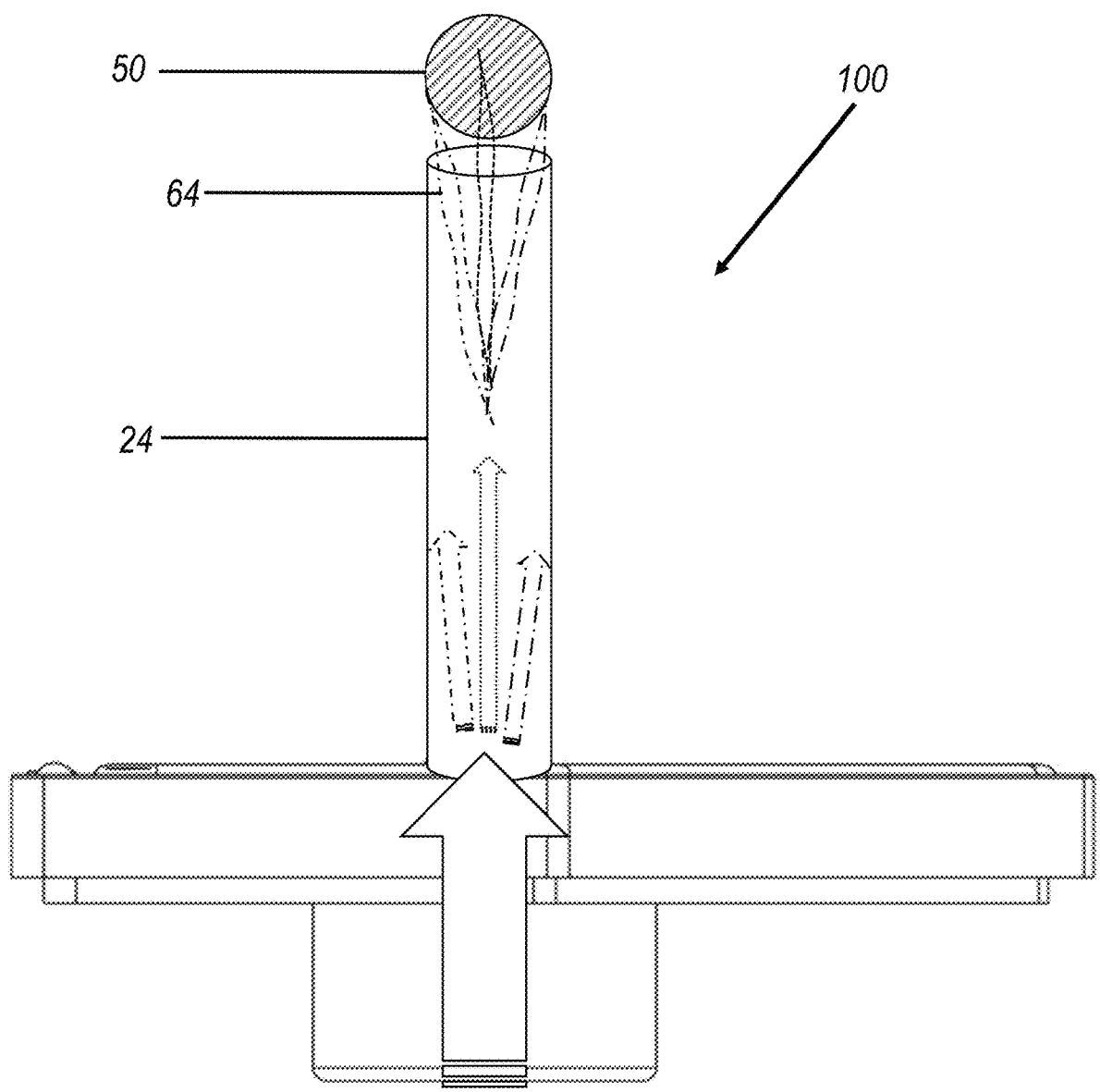
FIG. 24 depicts a side-view of the vertical or soft toss pitching machine with a conversion post inserted to transform the pitching machine into a batting tee that projects or suspends the ball using directed air pressure.

FIG. 23 depicts a side-view of the vertical or soft toss pitching machine with a conversion post 24 inserted to transform the pitching machine into a batting tee. FIG. 24 depicts a side-view of the vertical or soft toss pitching machine with a batting tee conversion from which the ball 50 is projected or suspended using directed air pressure 64. Alternatively, electromagnetic forces, such as magnetic levitation may be used to suspend the ball above the batting tee.

Figure 25:
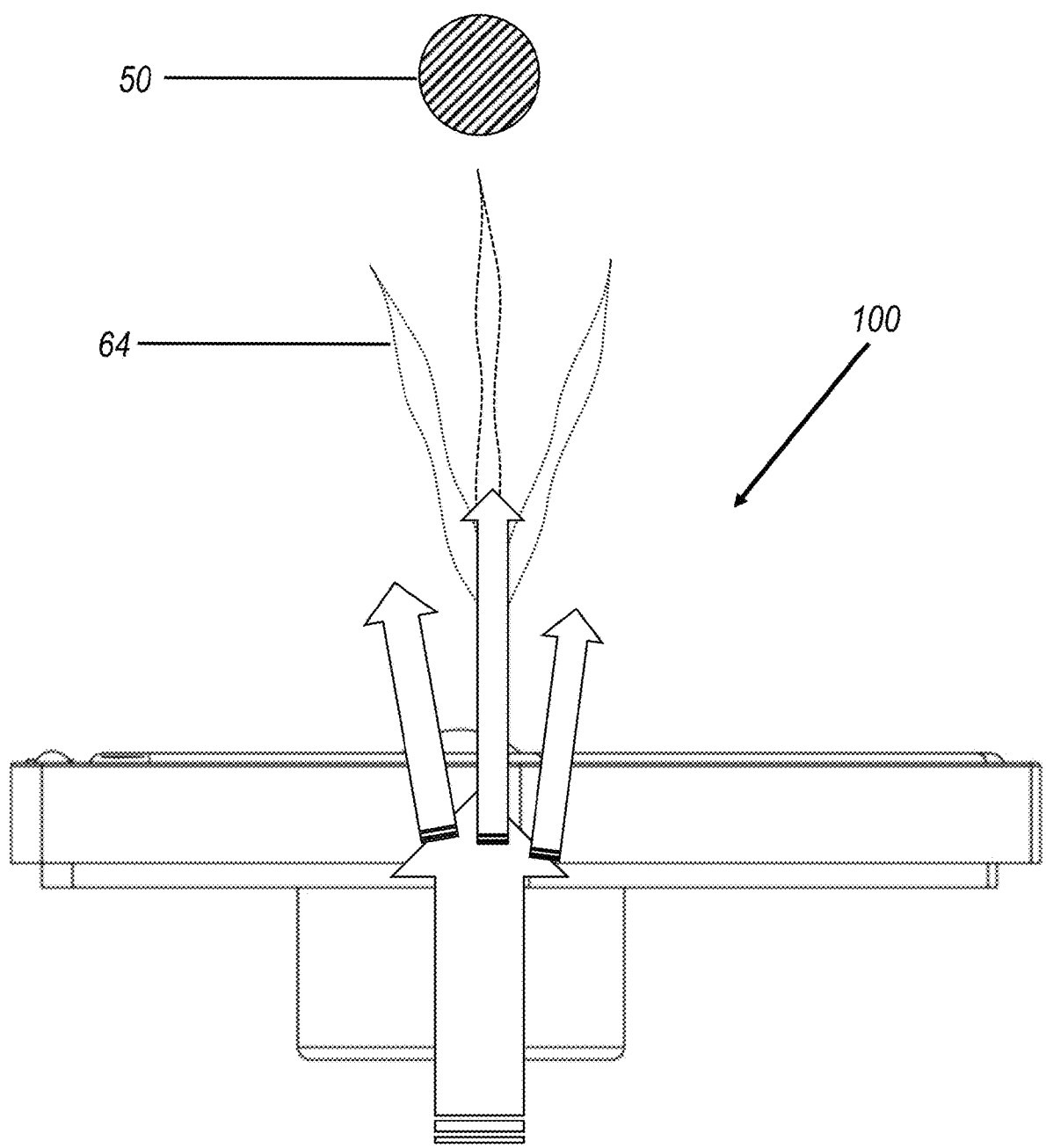
FIG. 25 depicts a side-view of an embodiment vertical or soft toss pitching machine that projects or suspends the ball using directed air pressure.
Figure 26:
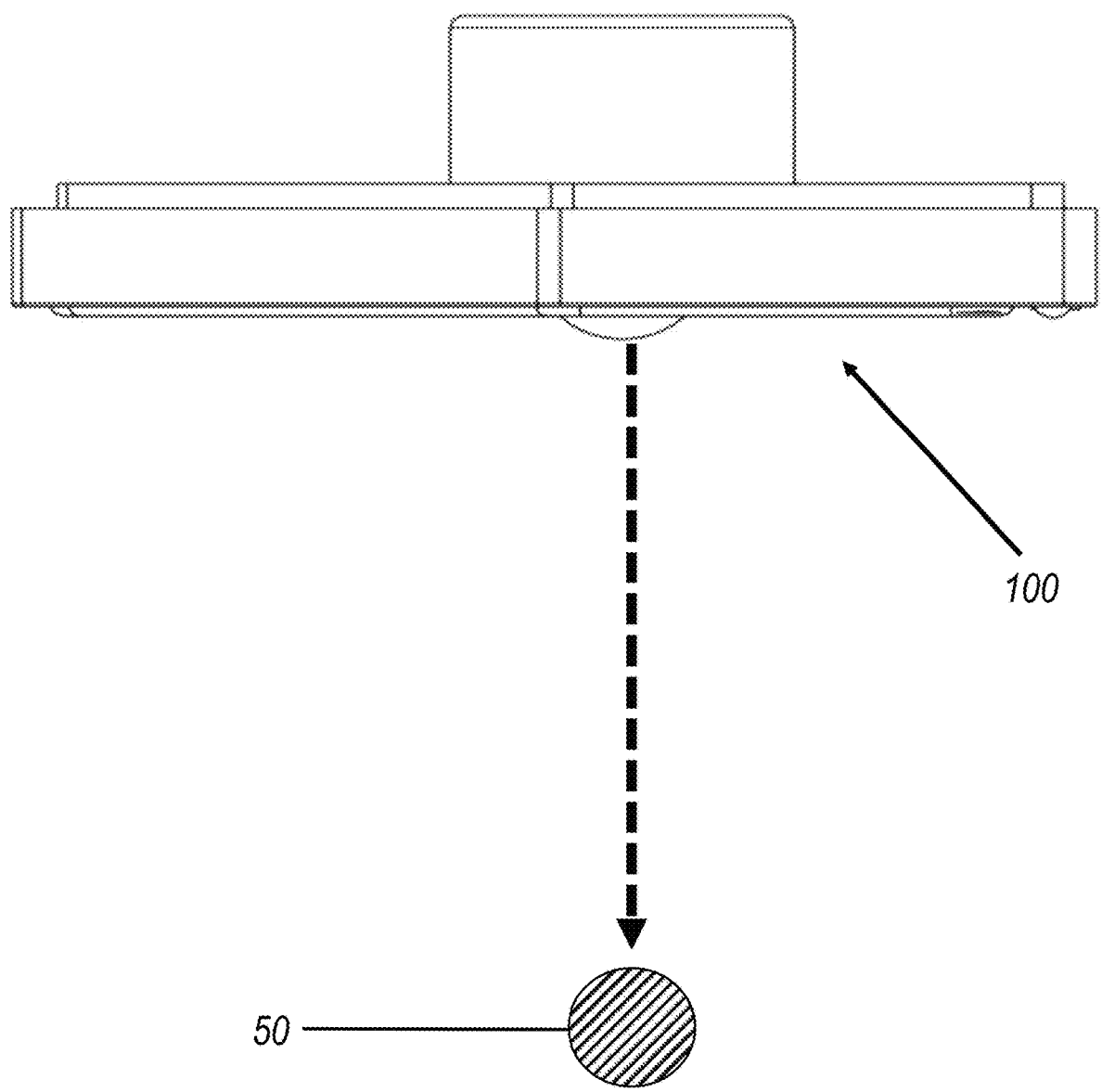
FIG. 26 depicts an embodiment of the vertical or soft toss pitching machine, suspended from the ceiling and using dropping or project the ball from above into the strike zone.

FIG. 25 depicts a side-view of an embodiment vertical or soft toss pitching machine that projects or suspends the ball 50 using directed air pressure 64. FIG. 26 depicts an embodiment of the vertical or soft toss pitching machine, suspended from the ceiling and dropping or projecting the ball from above into the strike zone.

FIG. 27A depicts a player wearing a helmet 150 with an augmented reality visor 155 and 27B and 27C depict close-up views of a helmet 150 with an augmented reality visor 155.

Gameplay

After entering player information via the mobile application or swiping their membership cards, players may select from among various different game modes. Game modes may include single player game modes, such as for example arcade mode, training mode and online gameplay, and multi-player modes, such as on-site competitive gameplay, training mode, scrimmage mode and online gameplay.

In the single player arcade mode, players may select from a series of single player games. In training or scrimmage modes, players can practice batting for distance and accuracy and engage in a variety of other training exercises and "non-league" gameplay. In the multi-player mode, players may select from head-to-head gameplay (player 1 vs player 2), team play (for two or more players on each team), and online "league" play.

And the online gameplay mode allows players to select among various games for online play against other players in other player bays at the same location or other players at remote geographic locations. In the online gameplay mode, players' opponents may be selected in one of several ways including, but not limited to, manually (based on the entry of a specific player ID), by a "league" gameplay schedule, and by a software algorithm (e.g., random or parameters-based opponent selection).

In online league and multi-player gameplay, players may be selected as team members for ad-hoc team play or as members of established teams as part of a pre-organized league, tournament or bracket gameplay. Teams may create their own leagues or tournaments with other players, or may choose to join a regularly schedule league or tournament.

Prizes for winning teams or individuals may be made available, such as free food and beverages. League or tournament games could be scheduled regularly or be one off elimination style. Leagues or tournaments could be either local or global, with the ability to play against other teams within a specified schedule regulated through the gaming software.

The object of a simple game may be to achieve the highest score after some set number of "at bats", e.g., ten (10) at bats per player. A player "at bat" may be given an opportunity to hit some number of balls, e.g., three (3) balls, either from the batting tee or from the toss up machine. The best score of each at bat, based on distance travelled and target accuracy (which may provide multipliers of the base distance score), will be kept for each player and the team with the most points at the end of the ten (10) "innings" will be the winning team. Similar to "frames" in bowling, each individuals' performance in an inning may be used to determine score multiples in subsequent innings based on their past performance.

The present invention uses tracking technology to gather performance data on a variety of both ball and bat swing measurements. Ball data gathered includes but is not limited to: ball speed; vertical launch angle; horizontal launch angle; vertical decent angle; spin rate; spin axis; total distance; lateral landing; apex height; hang-time; and ball dispersion patterns. Likewise, measurable bat and swing data may include bat speed; bat speed profile, bat acceleration, bat angle (angle of attack and angle of impact); bat path; wrist rotation; vertical swing plane; horizontal swing plane.

These previously mentioned measurements can then be converted to a score via the connected user interface using an application program interface (API). The API specifies how software components should interact and APIs are used when programming graphical user interface (GUI) components. As such, the present invention is designed to support the play of several unique games including but not limited to: 1) Traditional HR Derby 2) Homerun Hero; 3) Small Ball; 4) Batter Battle, (4a) Distance Battle (4b) Timed Battle; 5) Bottom of the $9^{th}$; 6) Bases Loaded; 7) Pitcher Battle; and 8) D-E-R-B-Y.

"Traditional HR Derby" This bracket style competition enables any number of players to compete in a game to see who can hit the most "homeruns" before they reach a predetermined number of "outs" (default number being 10 outs). A player scores a homerun by hitting a ball over a fence they've identify as the "target fence." A player earns an "out" by swinging and missing, or hitting the ball short of the "target fence."

"Home Run Hero" is a game designed for individual or small team play, with points awarded for both total number of home runs and a cumulative team score based on advancing digital "base-runners." Batter performance will be scored based on which of five zones the ball hits, with more points awarded to a central target area than to target areas farther out from the central target area. Game enables players to earn both an individual and cumulative team score based on their ability to hit a ball into different "zones." Zones determine the number of points a player receives and they also determine the number of bases team runners advance.

Similar to bowling, each player on the team has a predetermined number of "frames" or "innings" and every player on the team gets an opportunity to take three swings each inning. (Unlike traditional baseball/softball, in which the inning ends after 3 outs.) Each player gets 3 swings per inning, and the best score of the three swings is then recorded. This new team sport requires teams to work together to advance runners around the bases while individually competing to earn the highest score. Bonus and multiplier scores can be added to reward distance, consistency, accuracy, and/or power.

"Small Ball" is another game designed for individual or small team play, with points awarded solely for hitting the ball into infield and midfield target areas. Unlike Homerun Hero, which rewards players for power hitting, "Small Ball" is a more inclusive game for some players who prefer to be scored on accuracy and consistency.

"Batter Battle" is a multi-player, head-to-head competition that challenges players to reach a pre-determined cumulative distance (Distance Battle) or accumulate more "home runs" than their competitor before time expires (Timed Battle). Each ball is pitched simultaneously so the competitors have the opportunity to take the same number of swings each, and the distance each ball travels is recorded as players attempt to reach a predetermined total as fast as possible.

"Bottom of the $9^{th}$" is a competition to challenge players to perform under pressure. Each player only gets one swing at a time, the first player to hit a homerun wins.

"Bases Loaded" or "RBI King" is an individual or multi-player practice mode which challenges players to earn as many "Runs Batted In" (RBIs) as possible. Players will be introduced to hypothetical situations via the digital user interface displaying "base runners" in a variety of locations. Batters will attempt to hit the ball into pre-determined zones as they practice baseball fundamentals in an effort to earn more runs. The game can be used to teach batters the optimal location to hit a ball in an effort to advance as many runners as possible. Points may be deducted if players hit into "double-play" zones, pop-out, or strike-out.

"Pitcher Battle" is a unique multi-player game that allows individuals to participate in the competitive aspects of the bat and ball games whether or not they are not present at the facility. Using a mobile application and API connected to the ground-up pitching machine, a player, coach, or parent can be designated as the "pitcher" for a particular game and may use the mobile application downloaded on their phone to make real-time selections of different pitch variables such as the ball type, pitch height, location and difficulty for a particular batter or team of batters.

In accordance with another aspect of the present invention, the playing field, system and method are configured to implement a hitting accuracy game for two or more players, whereby the objective is to avoid receiving a pre-set number of "strikes". A first player calls the specific zone or target for his or her upcoming hit and is given one or more attempts to make the called hit.

The first player steps up to bat and a ball is fed to the batting tee or fed through the vertical or soft toss pitch machine. If the first player makes the called hit in the allotted number of attempts, then the next player must make the same called hit and is given the same number of allotted attempts to make the called hit.

If the next player fails to hit the ball into the called zone or target and does not make the called hit within the allotted number of attempts, then such next player receives a "strike". If the next player does make the called hit, then they do not receive a strike.

After all payers have attempted to make the initial called hit, the first player calls another specific zone or target for his or her upcoming hit. If the first player does not make the called hit, then the next player is given the opportunity to call the specific zone or target for his or her upcoming hit, and the game proceeds as previously described.

Once a player receives the pre-set number of strikes, that player is removed from gameplay, and the other players continue the game until all players, except the winner, have received the pre-set number of strikes and have been removed from gameplay. The winner of the game is the last player to avoid receiving the full number of pre-set strikes.

In a preferred embodiment, this game of hitting accuracy is stylized as "D-E-R-B-Y", with each strike counting against a letter in the word DERBY, the first strike counted as a "D", the second strike counted as an "E", and so on, with the winner being the last player to avoid getting all five letters in the word DERBY.

The game starts with Player 1 selecting a zone or target (as depicted in FIGS. 1-5) on a display, e.g., a touch screen, such as the kiosk 26 or personal mobile device 60, e.g., a tablet or smartphone, or augmented reality display 155, which corresponds to the playing field. Next, Player 1 steps up to bat, and the display screen indicates player 1, with the word DERBY below Player 1's name. For example, the letters of DERBY may be shown in white, with the letters converting to the color red as players gain letters or receive "strikes".

In this preferred embodiment, Player 1 has three (3) attempts to hit the ball into the pre-selected zone or target. If a player is able to hit the ball into the pre-selected zone or target, then that player has succeeded and it immediately becomes the next player's turn, (i.e., if the player successfully hits the ball into the pre-selected zone or target on their first ball, they do not hit the next two balls). If the player that selected the zone or target is unable to hit the ball into the pre-selected zone or target after 3 attempts, then it becomes the next player's turn, with the right to select a zone or target and attempt to hit the ball into that zone or target in 3 attempts.

If the player that selected the zone or target successfully hits the ball into the pre-selected zone or target within three (3) attempts, then it immediately becomes the next player's turn, with the obligation to also hit the ball into the same pre-selected zone or target within three (3) attempts. If after three (3) attempts Player 2 has not successfully hit a ball into that zone, Player 2 will receive a letter in the word Derby. If it is their first letter, they will receive the letter D, and so on.

If Player 2 is successful in hitting a ball into the zone that Player 1 hit into, then it will be Player 3's turn to hit into the same target in three (3) attempts. If Player 3 is unsuccessful, then they will receive a letter. If Player 3 is successful, then it moves onto the next player. If all players are able to hit the ball into the target, then the sequence begins again with Player 1 who selects a new target, and the round begins again.

Figure 38:
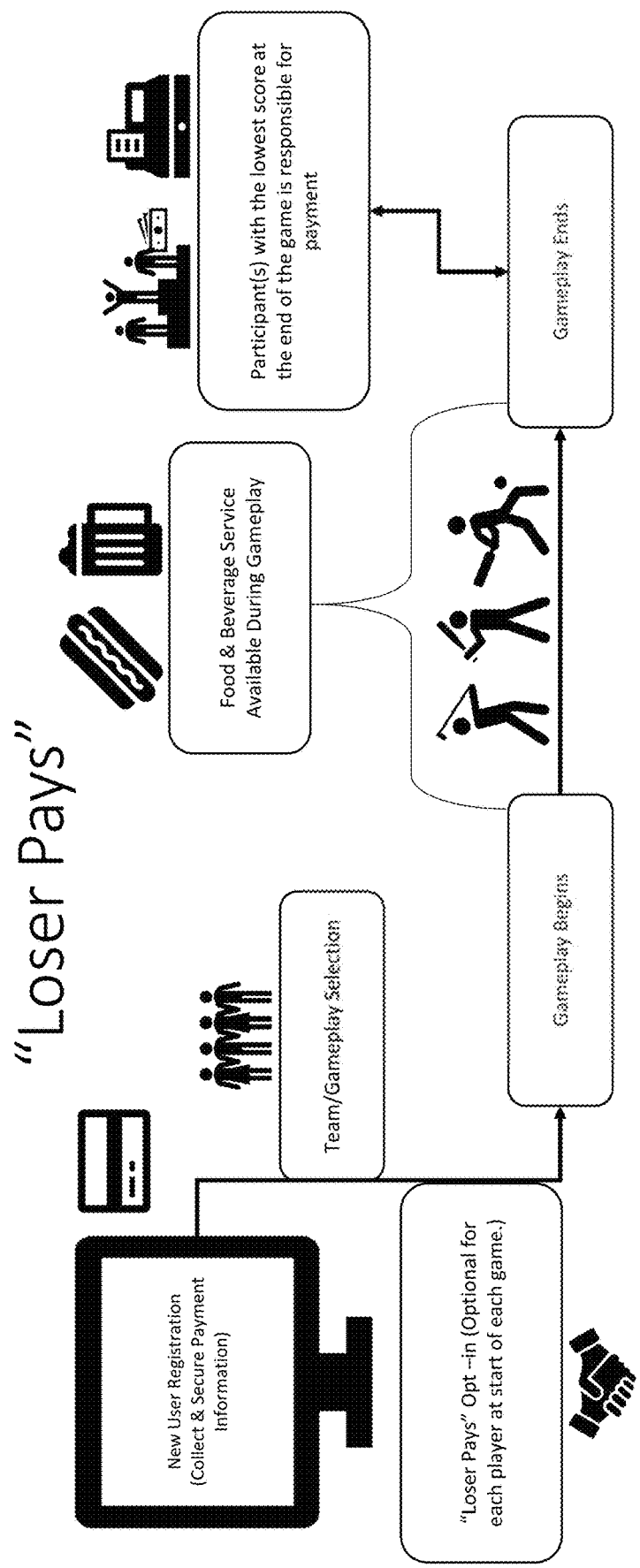
FIG. 38 depicts a process and computer logic for implementing a "Loser Pays" mode of gameplay.
Figure 39:
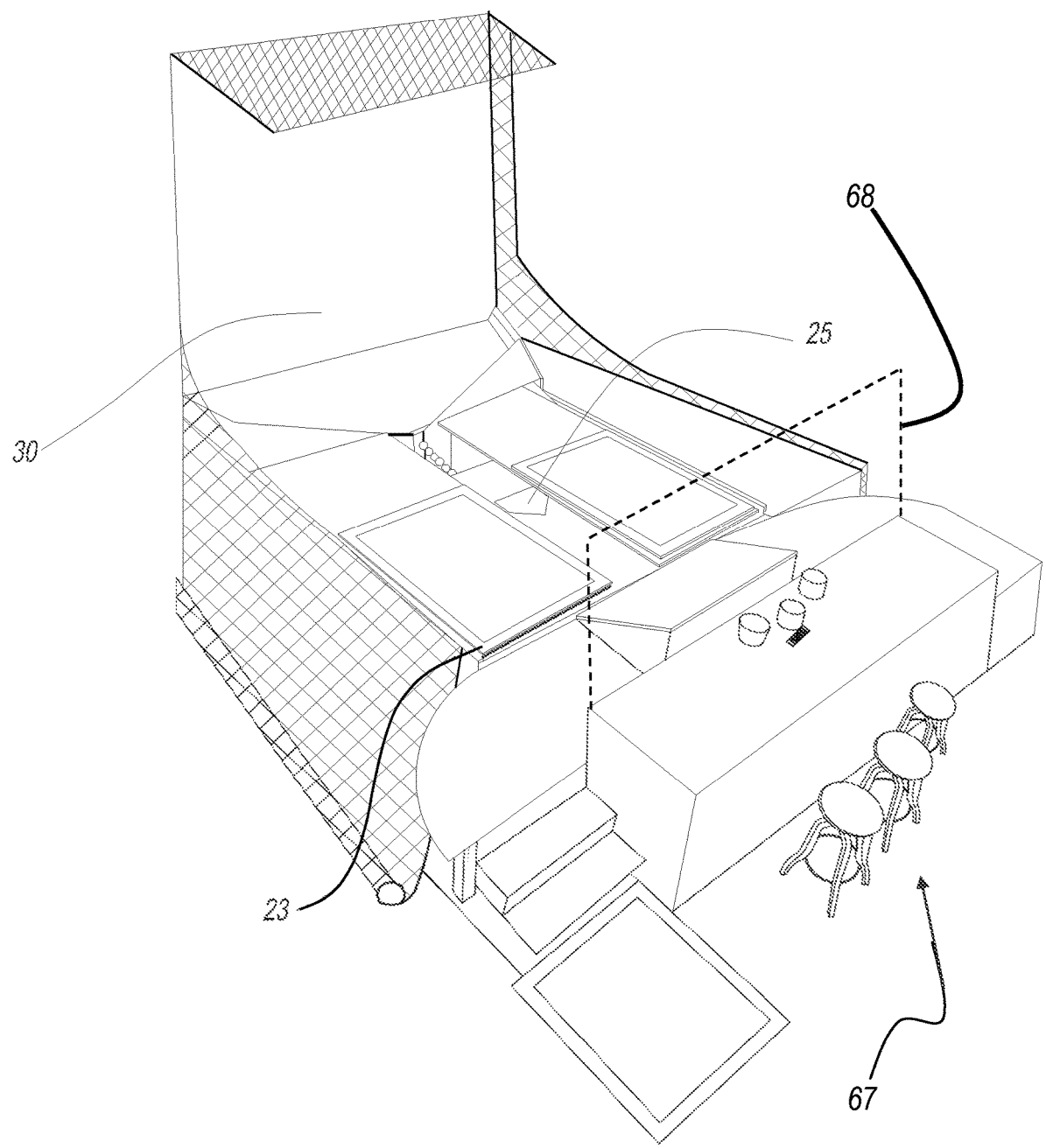
FIG. 39 depicts a perspective view of a batting bay.
Figure 40:
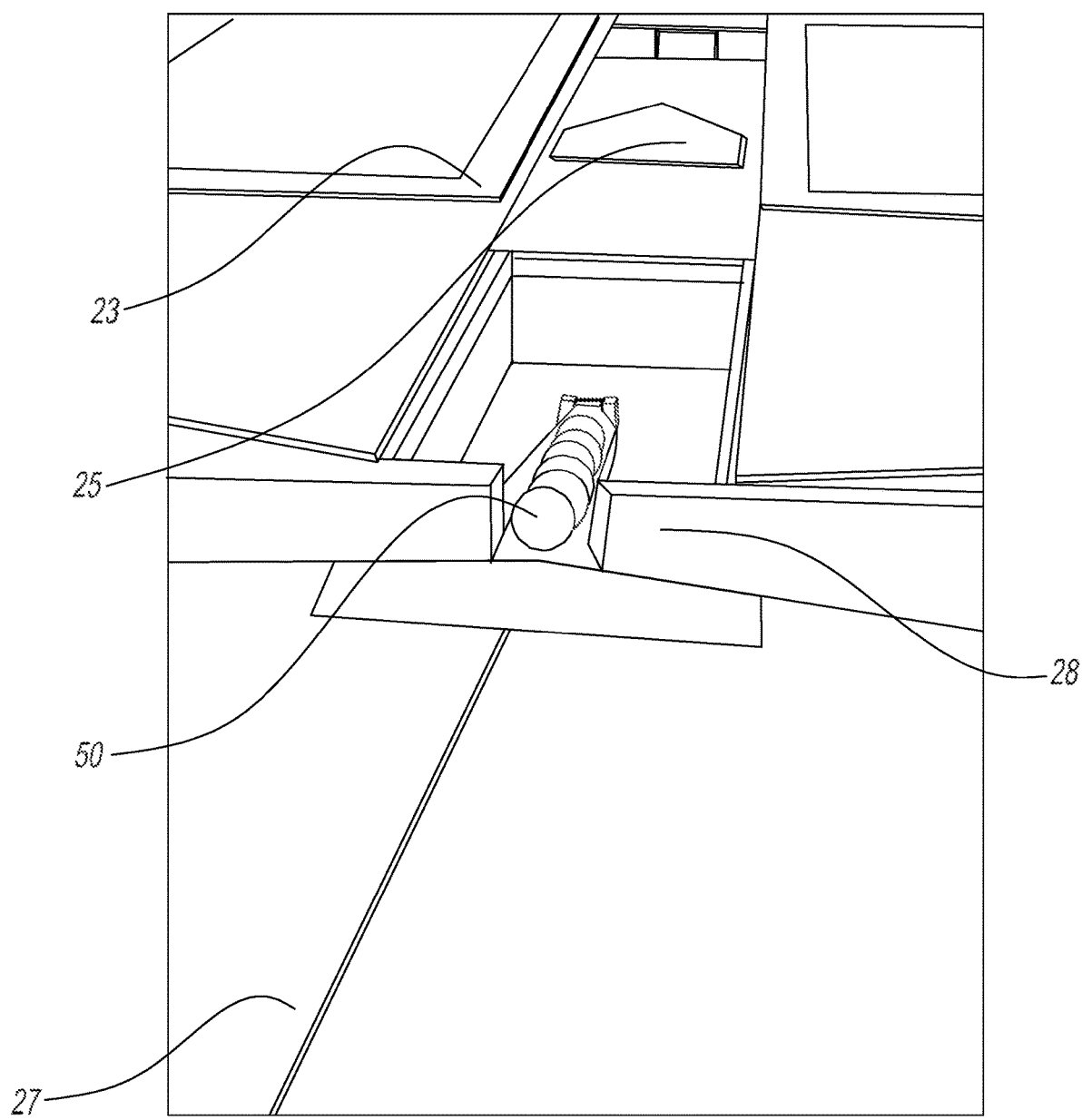
FIG. 40 depicts a close-up view of the trap, funnel and channel of a batting bay, with the channel transporting the balls to a ground-up, soft toss pitching machine.
Figure 41:
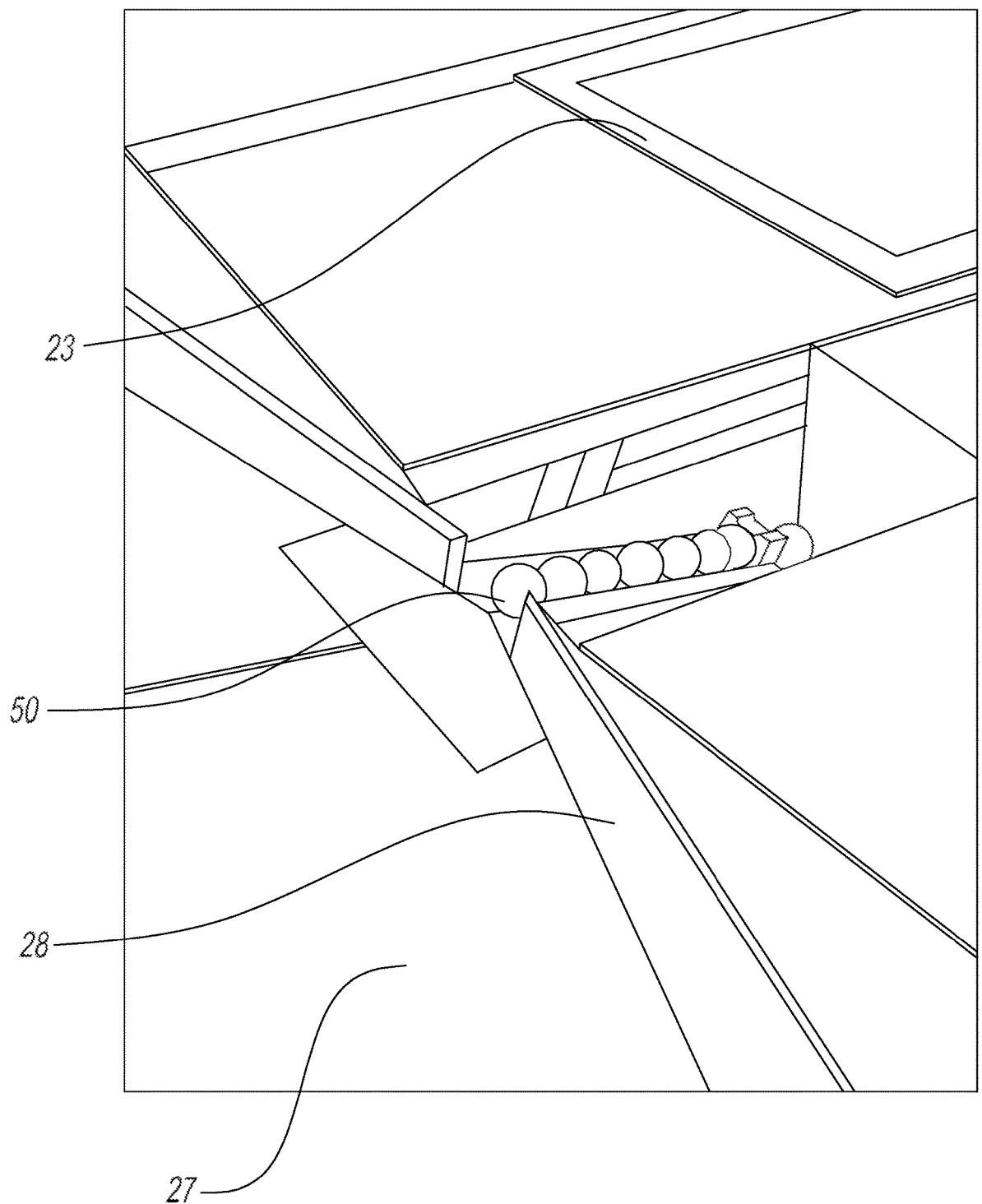
FIG. 41 depicts a close-up, side perspective view of the trap, funnel and channel of a batting bay, with the channel transporting the balls to a ground-up, soft toss pitching machine.

In multi-player mode, players will be able to select "loser pays" mode (FIG. 38), where the losing player or team agrees to be billed for a pre-determined amount or percentage of food and beverages ordered by the group of players or teams or ordered by the winning player or team, after competing in and losing a selected "game of skill". Players may have the ability to select individual items off the menu, or split the total bill as a percent or dollar amount. Additional functionality could be selecting a beverage or food item and quantity (i.e., ten appetizer samplers or ten buckets of beers), which could be automatically ordered and billed to the losing player or team upon completion of competitive gameplay.

Players may enter the "stakes" of the game into the system before the round begins. They will then divide players into teams or select the "every man for himself" mode. Each player will agree to the "friendly competition" by swiping his/her credit card before the game begins, and signing a line on the screen that explains the terms and conditions of the game. If certain player(s) do not want to participate, they can opt out of the competition and will be billed separately for any food or drink they want to order. The system will temporarily store the player's payment information and will track progress of the game. At the end of the selected game, the player with the lowest score will be billed for the pre-determined amount. If a credit card on file is not valid, or there is a controversy over the "winner" the bill may be split evenly between all competitors.

It should be understood that, although specific embodiments have just been described, the claimed subject matter is not intended to be limited in scope to any particular embodiment or implementation. For instance, many of the embodiments described were in reference to or in conjunction with bat-and-ball games. However, it should be understood that many of these features, elements and limitations may also be applied to many of the other sports intended to be covered by and included in the present invention, such as hockey, soccer, football and basketball.

In the preceding description, various aspects of claimed subject matter may have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill in the art were omitted or simplified so as not to obscure claimed subject matter.

While certain features have been illustrated or described herein, many modifications, substitutions, or equivalents may not occur to those skilled in the art. It is, therefore, to be understood that the appended claims are intended to cover all such modifications or changes as fall within the true spirit of the claimed subject mater.

What is claimed is:

1. A batting bay, configured to enable one or more players to play a game or practice a skill, the batting bay comprising:
   a batting area including at least a batter's box and a home plate, wherein the batting area has a surface on which the players stand and from which the players are enabled to hit one or more pitched balls;
   a pitch machine, wherein the pitch machine includes a piston that is located below a height of the surface on which the players stand and within one to ten feet in front of the batting area, and wherein the pitch machine is configured to pitch the balls to the players using the piston, which piston is pivoted at an angle and tilted towards home plate to launch the pitched balls with at least a horizontal launch angle towards a strike zone of the players along a soft toss or underhand pitch trajectory that passes through an opening in the surface on which the players stand; and
   a ball collection system configured to collect the balls and to transport the balls collected to the pitch machine.

2. The batting bay of claim 1, wherein the ball collection system further comprises one or more sloped surfaces, including one or more collection traps and funnels located below a screen and between the screen and the batting area, and is configured to collect the balls.

3. The batting bay of claim 1, wherein the batting bay further comprises a protective shield placed between the batting bay and a spectator lounge area, which is configured to prevent the balls from entering the spectator lounge area.

4. The batting bay of claim 1, wherein the pitch machine further includes a pitch trigger configured to trigger individual pitches or a sequence of pitches and comprising one or more mechanisms selected from a group of mechanisms including at least 1) detection of a specific bat, hand or arm motion by one or more player motion tracking mechanisms including RFID, radar, infrared, optical, high-speed or other cameras and motion sensors, and 2) a software application user interface displayed on a computer screen or a smart device.

5. The batting bay of claim 1, wherein the batting bay further comprises a screen configured to receive the balls hit by the players, and wherein the screen is further configured to display a sports field.

6. The batting bay of claim 1, wherein the pitch machine is a soft-toss pitch machine configured to adjust a speed, spin, arc and apex of a pitch, and to pitch the balls to the players via a pop-up pitch that arcs the balls towards the home plate.

7. The batting bay of claim 1, wherein the pitch machine is configured to direct individual pitches along different pathways and to place each pitched ball within or outside of one or more different sectors of a strike zone of the player.

8. The batting bay of claim 5, wherein the screen comprises a display mechanism configured to display an interactive gameplay interface enabling online gameplay.

9. The batting bay of claim 1, wherein a screen is configured to deploy and retract, and wherein the deployed screen is configured to stop a hit ball and to display an image of a sports field.

10. The batting bay of claim 1, wherein a computer uses sensors to automatically calculate and call one or more of a fair hit, a foul hit, a strike pitch, a ball pitch and a strike zone, based on one or more of a height and a posture or stance of the players.

11. The batting bay of claim 1, wherein a computer uses sensors to automatically calculate a strike zone, based on one or more of a height and a posture or stance of the player, and wherein the pitch machine is configured to place each pitched ball within or near to one or more different sectors of the strike zone calculated by the computer for the player at bat.

12. The batting bay of claim 4, wherein a computer uses sensors to automatically calculate a strike zone, based on one or more of a height and a posture or stance of the player, and wherein the pitch trigger mechanism is configured to trigger delivery of a single pitch or a sequence of pitches, and also placement of individual pitches within specific sectors of the strike zone calculated for the players at bat.

13. The batting bay of claim 1, wherein the pitch machine further comprises one or more sensory indicators, including one or more of lights, sounds and vibrations, configured to indicate one or more of pitch readiness, pitch difficulty, pitch apex location, location or direction of targets and a current status of the player.

14. A batting bay, comprising:
one or more batting areas, from which a player is enabled to hit a ball pitched to the player while standing at bat, including at least a batter's box and a home plate in each of the batting areas;
a pitch machine including a piston that is located below a height of a surface of the batting area on which the player stands at bat and within one to ten feet in front of the batting areas, and wherein the pitch machine is configured to pitch the ball to the player standing at bat using the piston pivoted at an angle and tilted towards the batting area to launch the ball with a vertical launch angle and a horizontal launch angle towards the player; and
a ball collection system configured to collect the ball and to transport the ball to the pitch machine.

15. A batting bay, comprising:
one or more batting areas, each batting area having a home plate and one or more batter's boxes from which a batter is enabled to hit one or more pitched balls;
a pitch machine configured to launch the balls to the batters, wherein the pitch machine includes a piston located within one to ten feet in front of and below a height of the batter's box, and wherein the piston is pivoted at an angle and tilted towards the batting area to launch the balls with a vertical launch angle and a horizontal launch angle towards the home plate; and
a ball collection system configured to collect and transport the balls to the pitch machine.

16. The batting bay of claim 15, wherein the ball collection system further comprises one or more sloped surfaces, including one or more collection traps and funnels located below a screen and between the screen and the batting area, and is configured to collect the balls.

17. The batting bay of claim 15, wherein the batting bay further comprises a protective shield placed between the batting bay and a spectator lounge area, which is configured to prevent the balls from entering the spectator lounge area.

18. The batting bay of claim 15, wherein the pitch machine further includes a pitch trigger configured to trigger individual pitches or a sequence of pitches and comprising one or more mechanisms selected from a group of mechanisms including at least 1) detection of a specific bat, hand or arm motion by one or more player motion tracking mechanisms including RFID, radar, infrared, optical, high-speed or other cameras and motion sensors, and 2) a software application user interface displayed on a computer screen or a smart device.

19. The batting bay of claim 18, wherein a computer uses sensors to automatically calculate a strike zone, based on one or more of a height and a posture or stance of the player, and wherein the pitch trigger mechanism is configured to trigger delivery of a single pitch or a sequence of pitches, and also placement of individual pitches within specific sectors of the strike zone calculated for the players at bat.

20. The batting bay of claim 15, wherein the batting bay further comprises a screen configured to receive the balls hit by the players, and wherein the screen is further configured to display a sports field.

21. The batting bay of claim 20, wherein the screen comprises a display mechanism configured to display an interactive gameplay interface enabling online gameplay.

22. The batting bay of claim 15, wherein the pitch machine is a soft-toss pitch machine configured to adjust a speed, spin, arc and apex of a pitch, and to pitch the balls to the players via a pop-up pitch that arcs the balls towards the home plate.

23. The batting bay of claim 15, wherein the pitch machine is configured to direct individual pitches along different pathways and to place each pitched ball within or outside of one or more different sectors of a strike zone of the player.

24. The batting bay of claim 15, wherein a screen is configured to deploy and retract, and wherein the deployed screen is configured to stop a hit ball and to display an image of a sports field.

25. The batting bay of claim 15, wherein a computer uses sensors to automatically calculate and call one or more of a fair hit, a foul hit, a strike pitch, a ball pitch and a strike zone, based on one or more of a height and a posture or stance of the players.

26. The batting bay of claim 15, wherein a computer uses sensors to automatically calculate a strike zone, based on one or more of a height and a posture or stance of the player, and wherein the pitch machine is configured to place each pitched ball within or near to one or more different sectors of the strike zone calculated by the computer for the player at bat.

27. The batting bay of claim 15, wherein the pitch machine further comprises one or more sensory indicators, including one or more of lights, sounds and vibrations, configured to indicate one or more of pitch readiness, pitch difficulty, pitch apex location, location or direction of targets and a current status of the player.

* * * * *